US012075222B2

(12) United States Patent
Wu et al.

(10) Patent No.: US 12,075,222 B2
(45) Date of Patent: Aug. 27, 2024

(54) PROCESS OF FABRICATING CAPACITIVE MICROPHONE COMPRISING MOVEABLE SINGLE CONDUCTOR AND STATIONARY COMPOSITE CONDUCTOR

(71) Applicant: GMEMS TECH SHENZHEN LIMITED, Shenzhen (CN)

(72) Inventors: Guanghua Wu, Dublin, CA (US); Xingshuo Lan, San Jose, CA (US); Zhixiong Xiao, Fremont, CA (US)

(73) Assignee: GMEMS TECH SHENZHEN LIMITED, Shenzhen (CN)

( * ) Notice: Subject to any disclaimer, the term of this patent is extended or adjusted under 35 U.S.C. 154(b) by 450 days.

(21) Appl. No.: 17/305,515

(22) Filed: Jul. 9, 2021

(65) Prior Publication Data

US 2021/0337333 A1 Oct. 28, 2021

Related U.S. Application Data

(60) Continuation-in-part of application No. 17/120,169, filed on Dec. 13, 2020, now Pat. No. 11,765,533, which is a continuation-in-part of application No. 17/008,638, filed on Sep. 1, 2020, now Pat. No. 11,546,711, which is a division of application No. 15/730,732, filed on Oct. 12, 2017, now Pat. No. 10,798,508, which is a continuation-in-part of application No. 15/623,339, filed on Jun. 14, 2017, now Pat. No. 10,244,330, which is a continuation-in-part of application No. 15/393,831, filed on Dec. 29, 2016, now Pat. No. 10,171,917.

(51) Int. Cl.
*H04R 31/00* (2006.01)
*H04R 19/04* (2006.01)

(52) U.S. Cl.
CPC ............. *H04R 31/00* (2013.01); *H04R 19/04* (2013.01); *H04R 2201/003* (2013.01); *H04R 2410/03* (2013.01)

(58) Field of Classification Search
CPC .. H04R 31/00; H04R 19/04; H04R 2201/003; H04R 2410/03; H04R 19/005
See application file for complete search history.

(56) References Cited

U.S. PATENT DOCUMENTS 4,403,163 A * 9/1983 Armerding .............. H02K 3/40 310/201
10,273,150 B2 * 4/2019 Sun ........................ H04R 31/00
2003/0094047 A1 * 5/2003 Torkkeli ................ G01L 9/0073 73/716

(Continued)

*Primary Examiner* — S M Sohel Imtiaz
(74) *Attorney, Agent, or Firm* — George Guosheng Wang; Upstream Research and Patent LLC

(57) ABSTRACT

The present invention provides a process of fabricating a capacitive microphone such as a MEMS microphone with two capacitors. The two capacitors may be so fabricated that the signal output from the first capacitor is additive inverse of that from the second capacitor, and a total signal output is a difference between the two outputs. In at least one of the two capacitors, a movable or deflectable membrane/diaphragm moves in a lateral manner relative to the fixed capacitor plate, instead of moving toward/from the fixed plate. The squeeze film damping, and the noise are substantially avoided, and the performances of the microphone are significantly improved.

14 Claims, 87 Drawing Sheets

(56) References Cited

U.S. PATENT DOCUMENTS

| | | | | |
|---|---|---|---|---|
| 2007/0284682 | A1* | 12/2007 | Laming | H04R 19/005 257/E21.526 |
| 2008/0226217 | A1* | 9/2008 | Kilic | G01H 9/004 385/12 |
| 2008/0247573 | A1* | 10/2008 | Pedersen | H04R 19/005 381/174 |
| 2012/0213400 | A1* | 8/2012 | Kasai | H04R 19/04 381/369 |
| 2014/0264662 | A1* | 9/2014 | Cheng | B81B 7/02 257/419 |
| 2015/0274506 | A1* | 10/2015 | Feyh | B81C 1/00301 257/416 |
| 2016/0037266 | A1* | 2/2016 | Uchida | H04R 7/06 381/174 |
| 2016/0130137 | A1* | 5/2016 | Huang | B81B 7/02 438/51 |
| 2016/0167946 | A1* | 6/2016 | Jenkins | H04R 19/005 257/416 |
| 2017/0166437 | A1* | 6/2017 | Klein | H04R 19/005 |
| 2017/0265009 | A1* | 9/2017 | Sridharan | H04R 7/26 |
| 2018/0086624 | A1* | 3/2018 | Cheng | B81B 3/007 |
| 2018/0359571 | A1* | 12/2018 | Zhan | B81C 1/00158 |

* cited by examiner

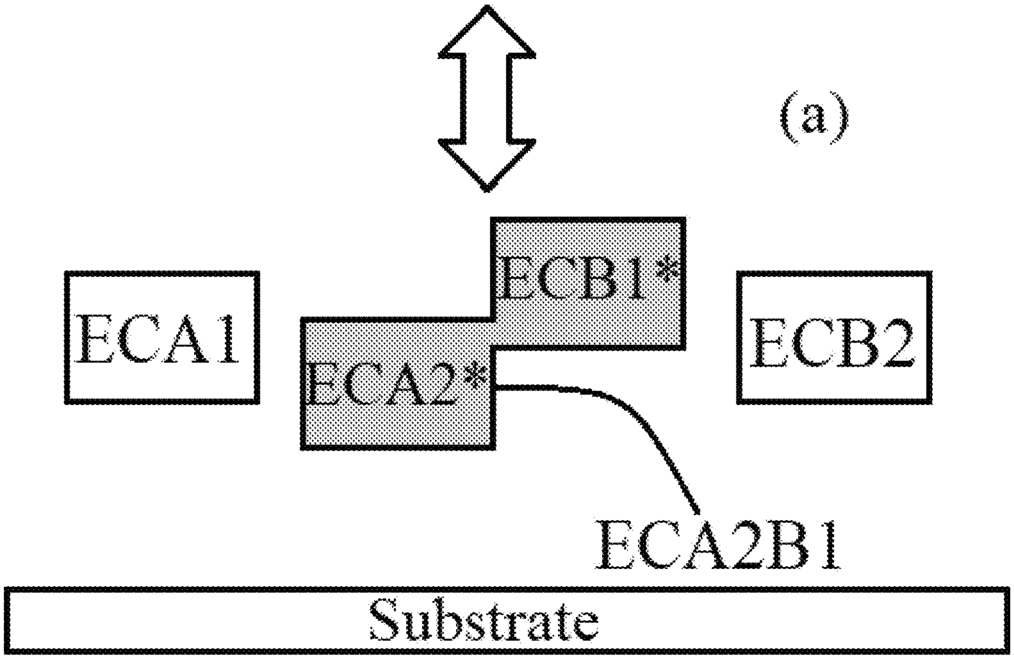
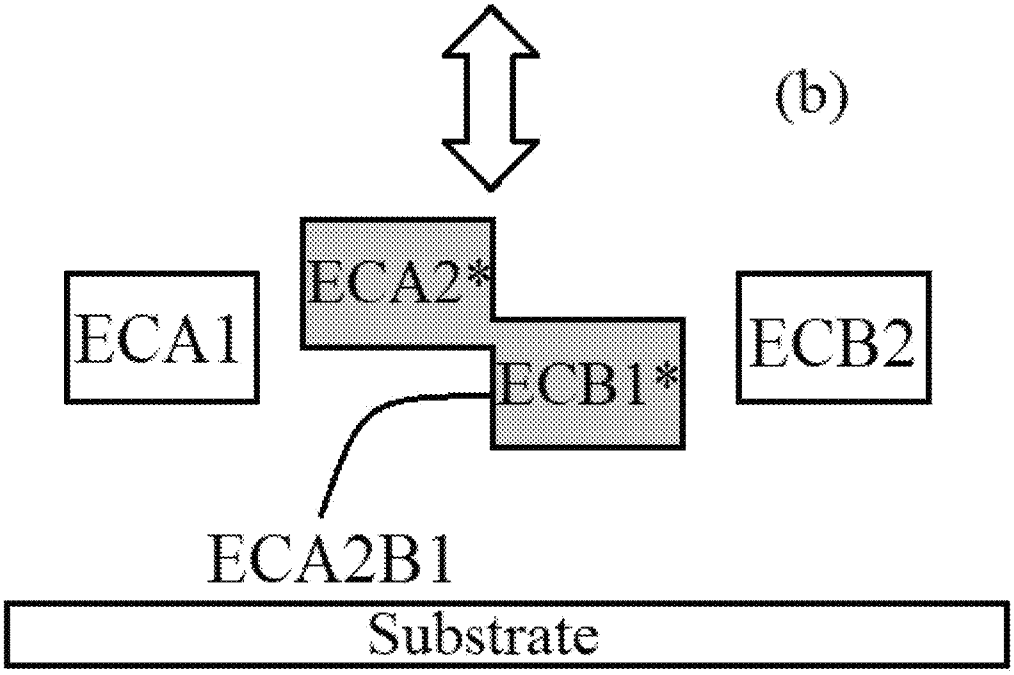
Figure 10

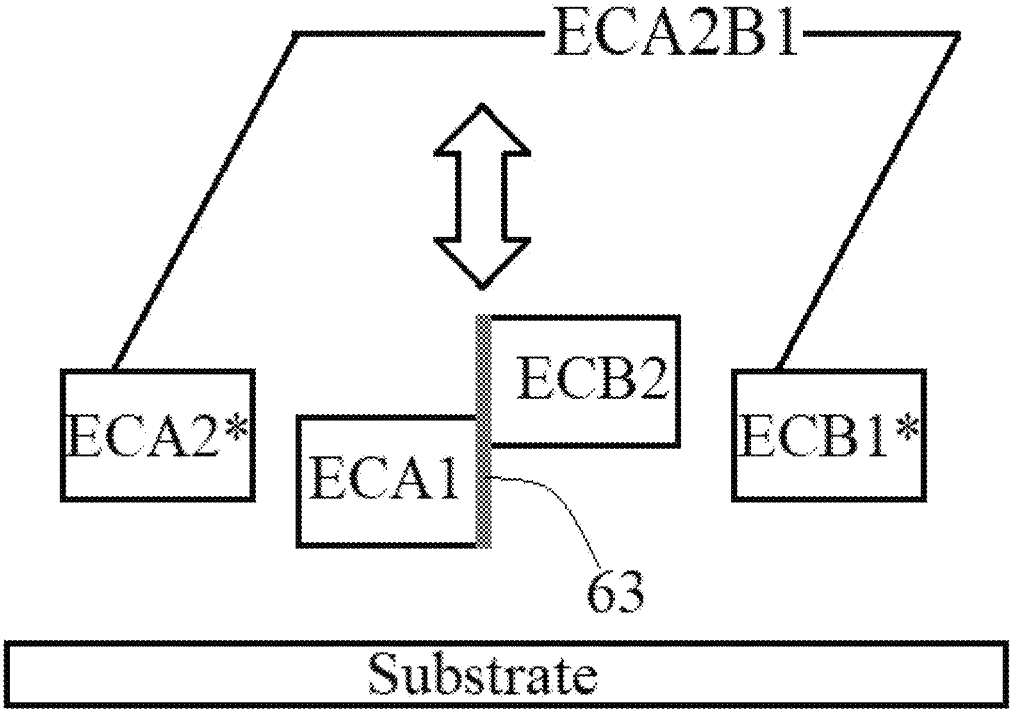
(a)
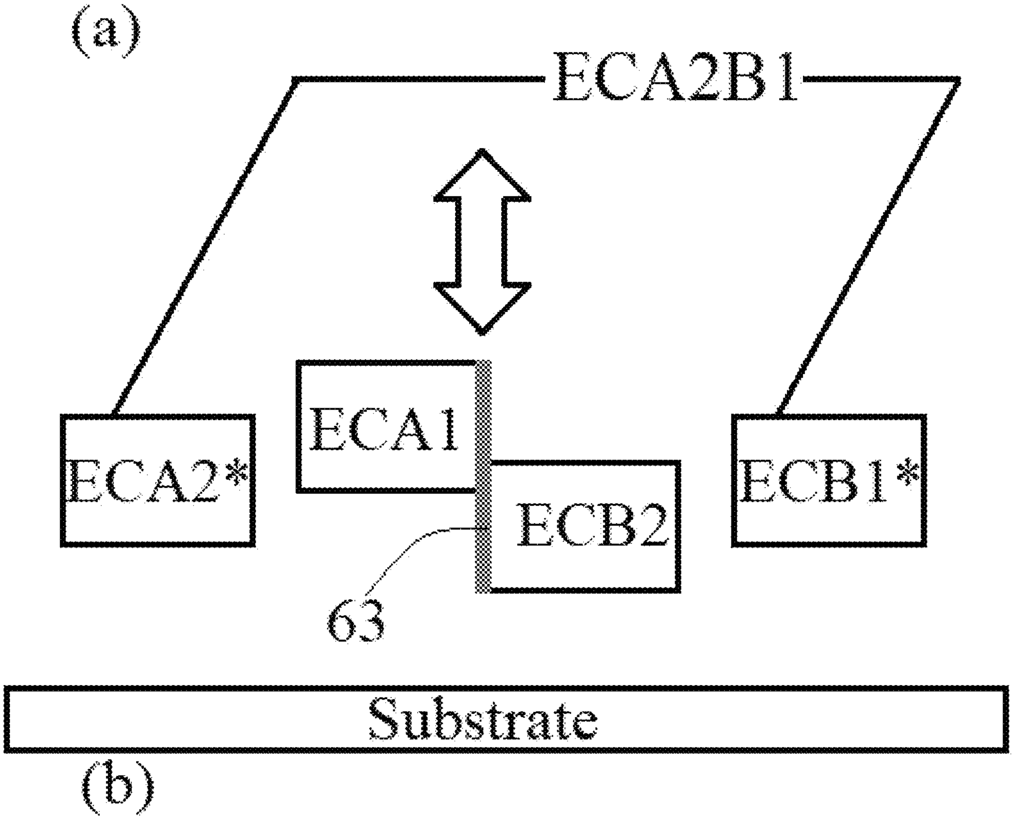
(b)
Figure 19

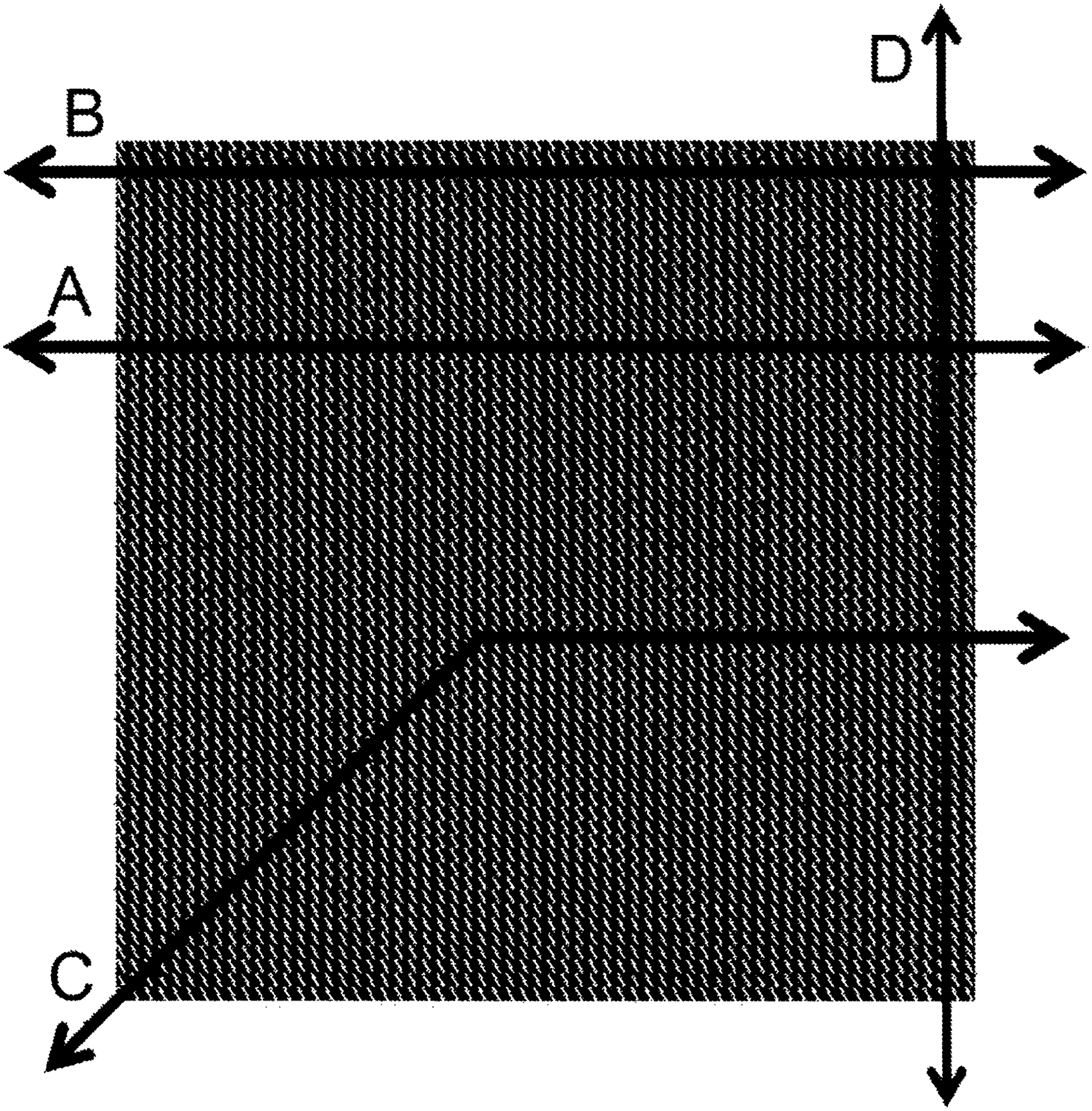
Figure 36A (Step 1)

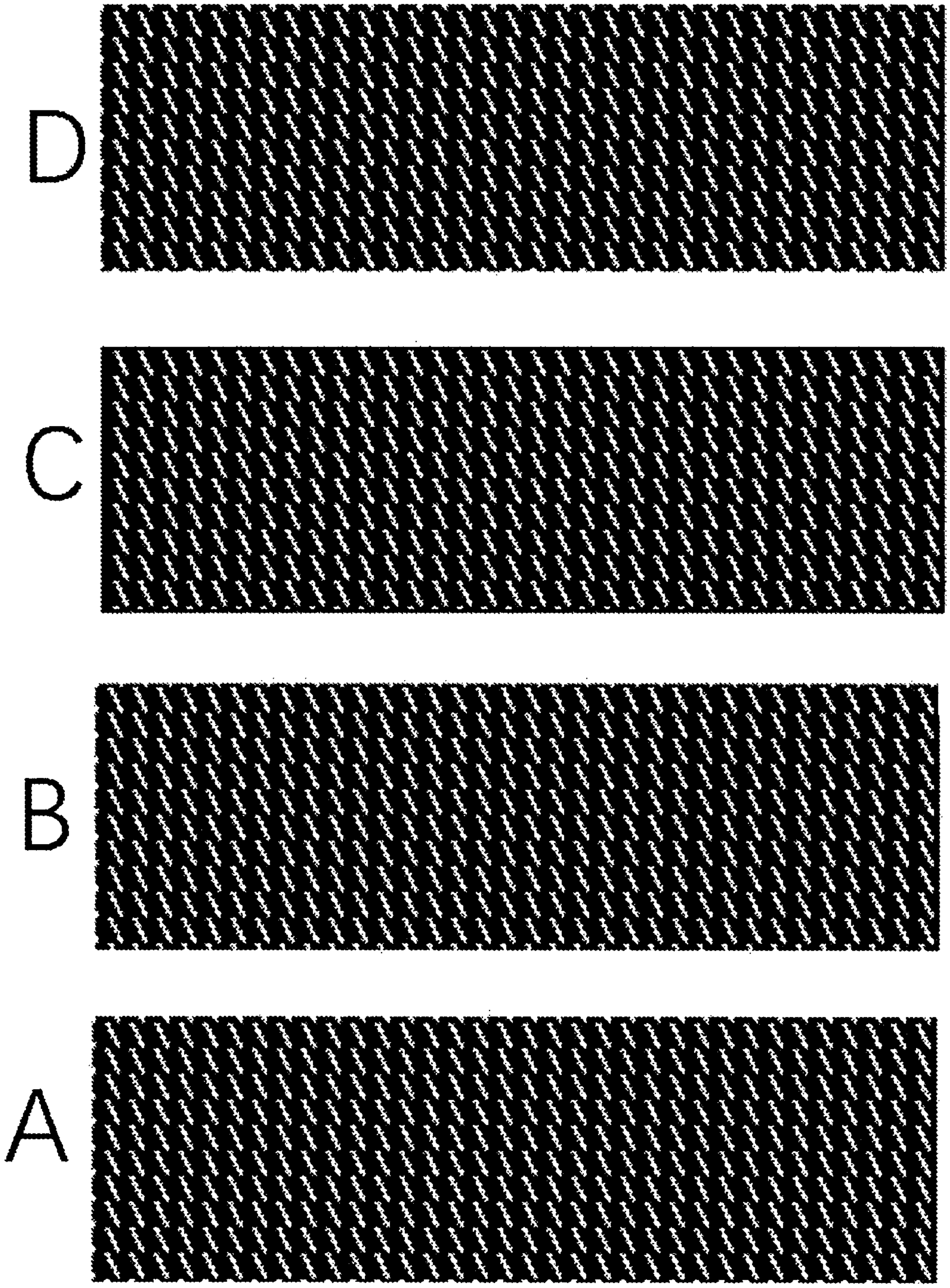
Figure 36B (Step 1)

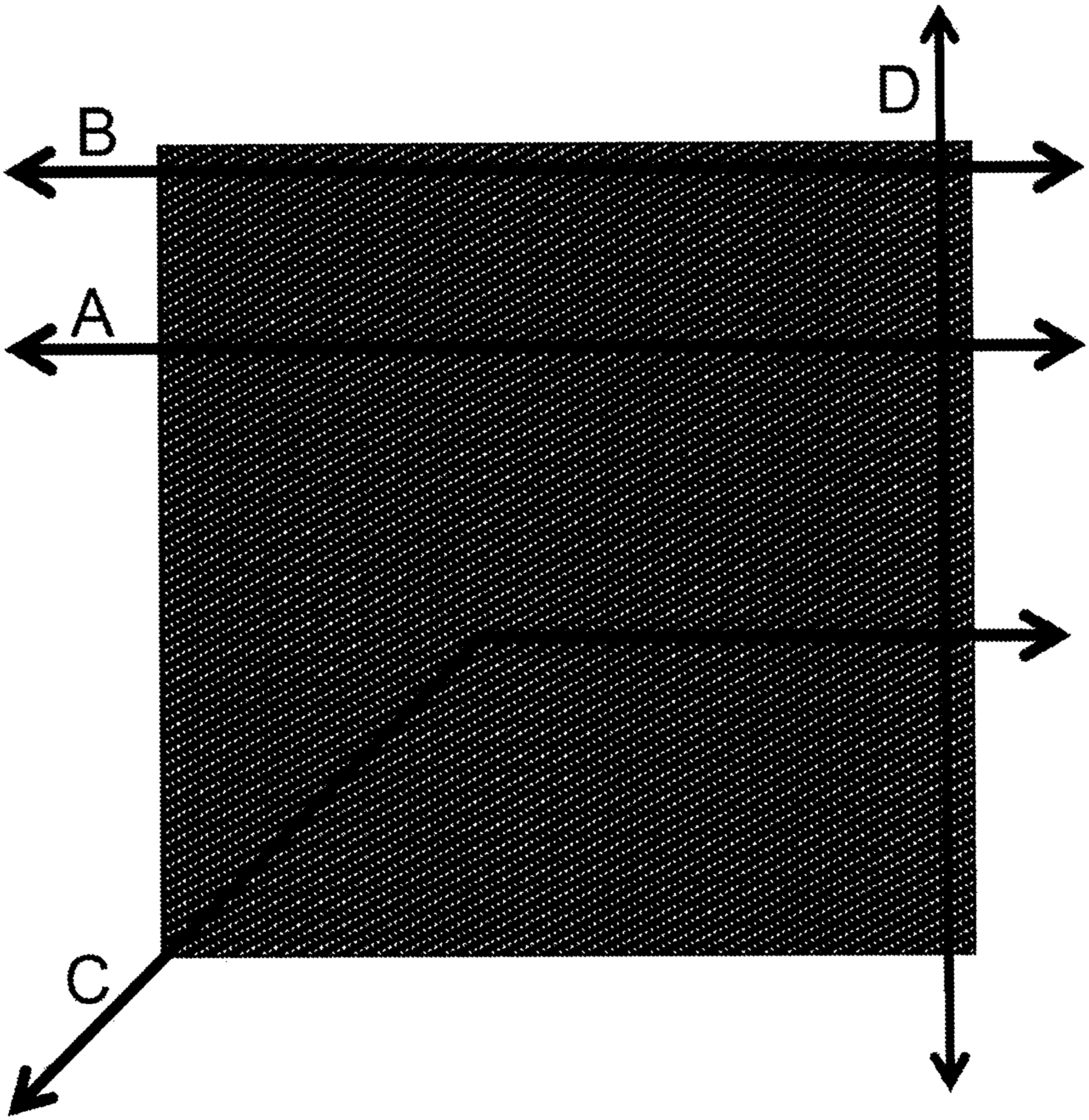
Figure 37A (Step 2)

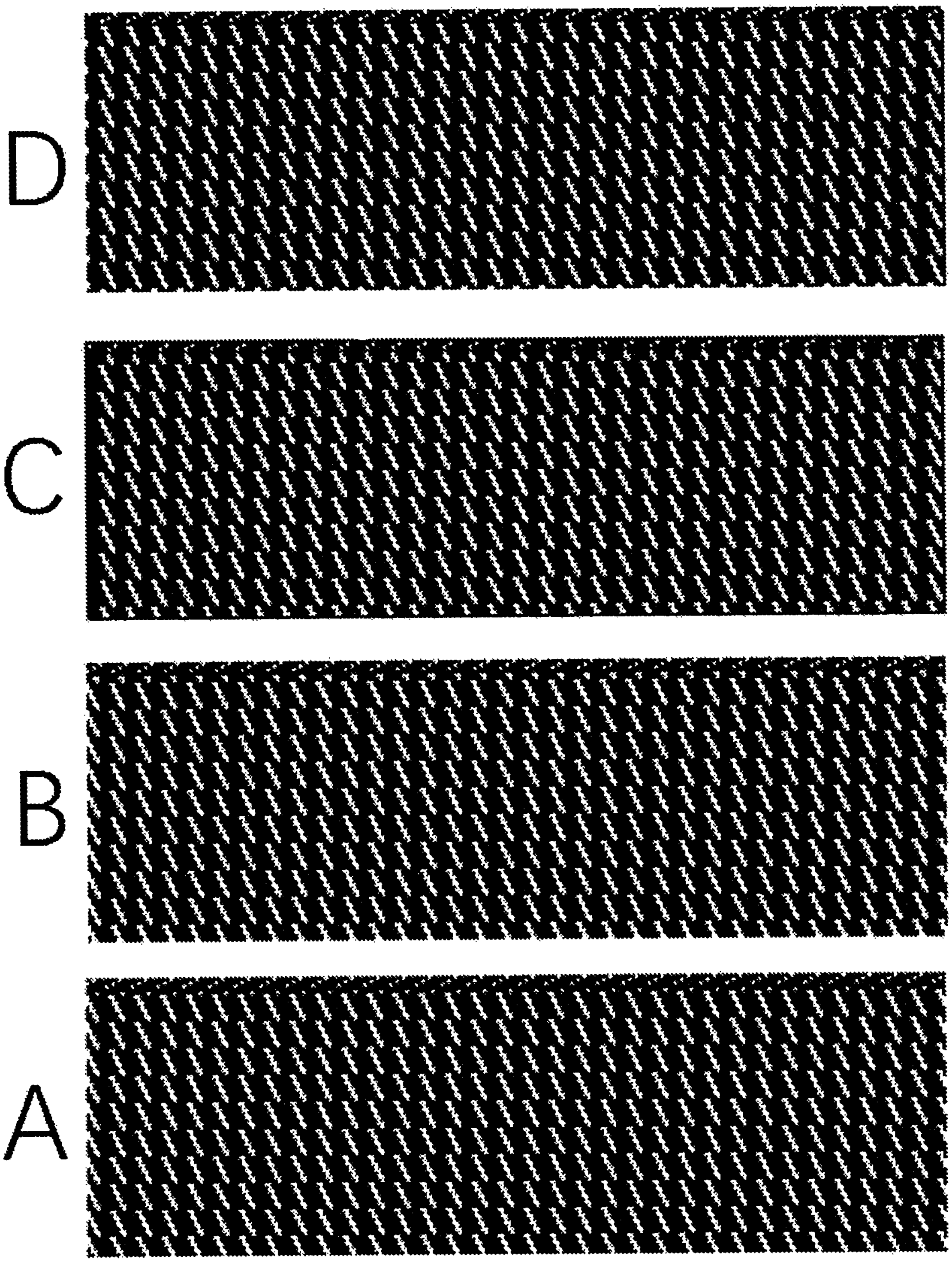
Figure 37B (Step 2)

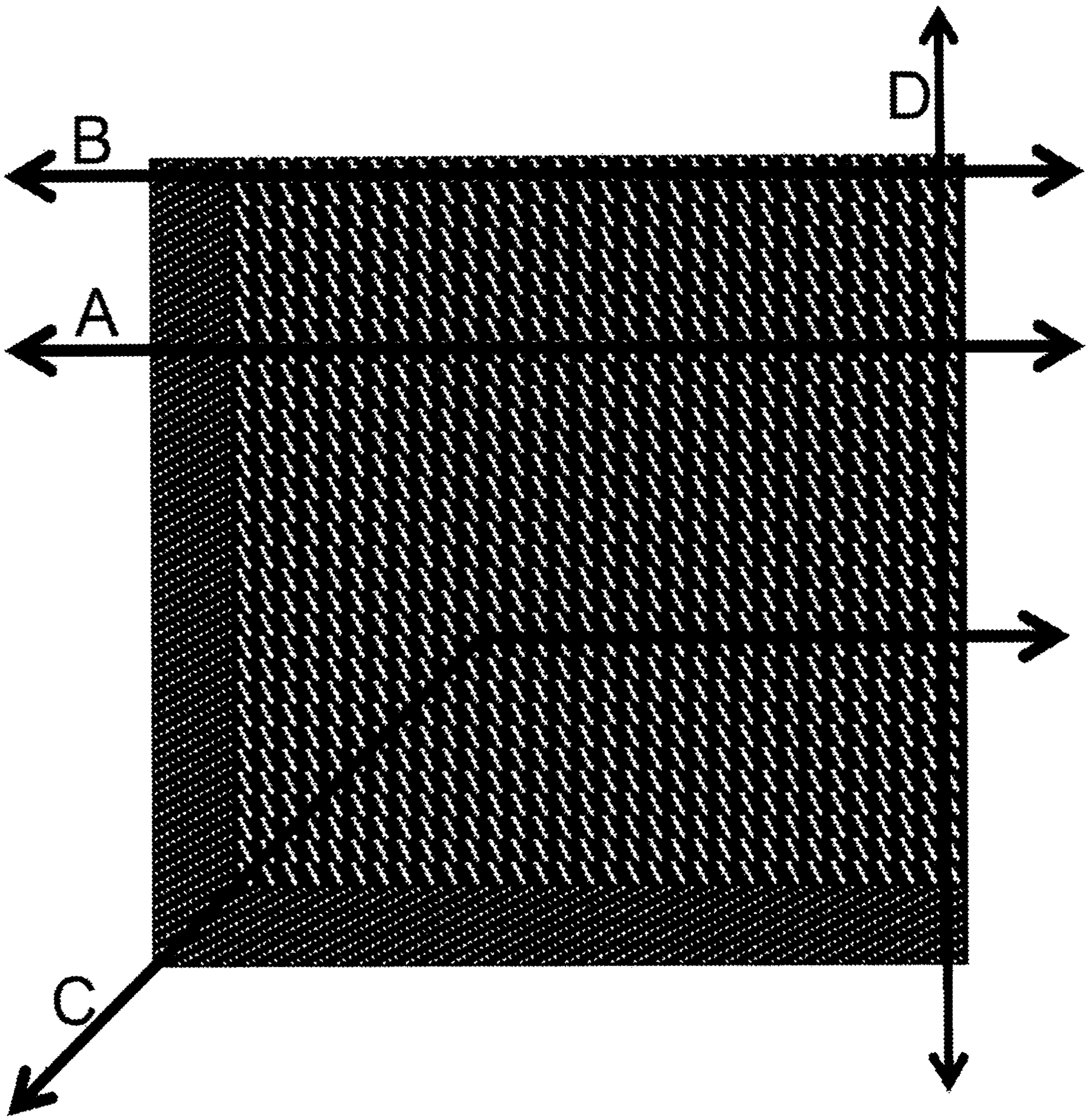
Figure 38A (Step 3)

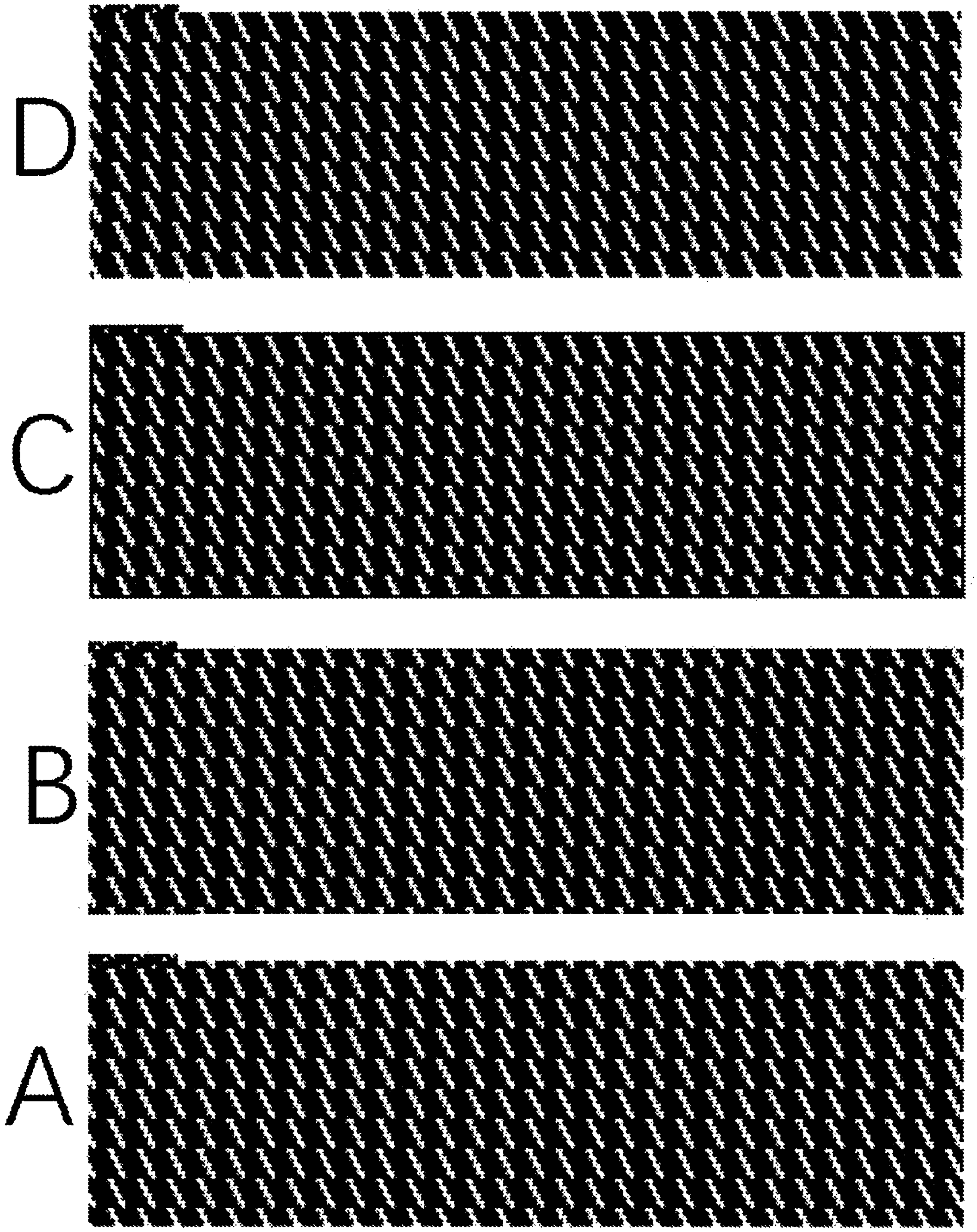
Figure 38B (Step 3)

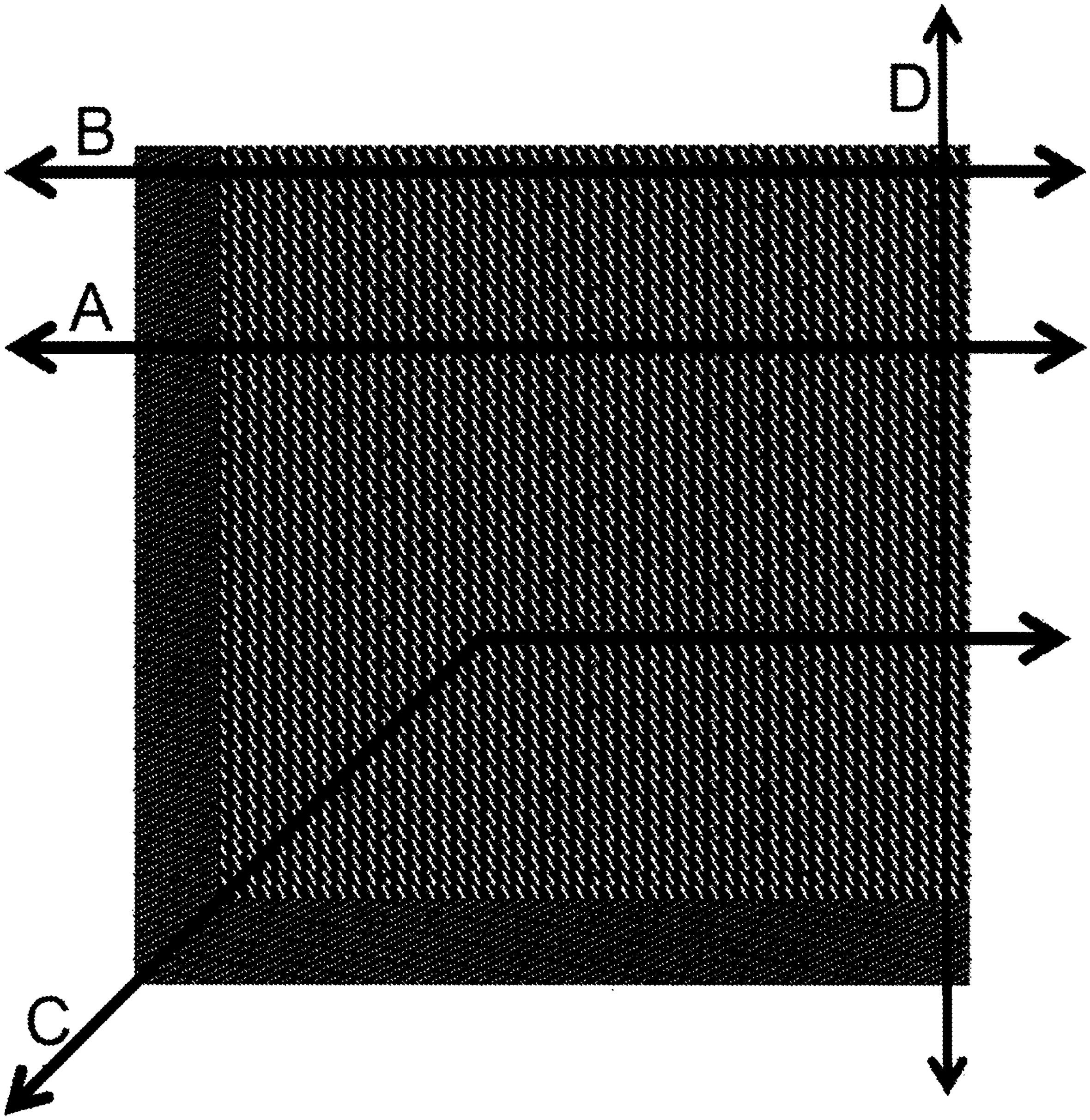
Figure 39A (Step 4)

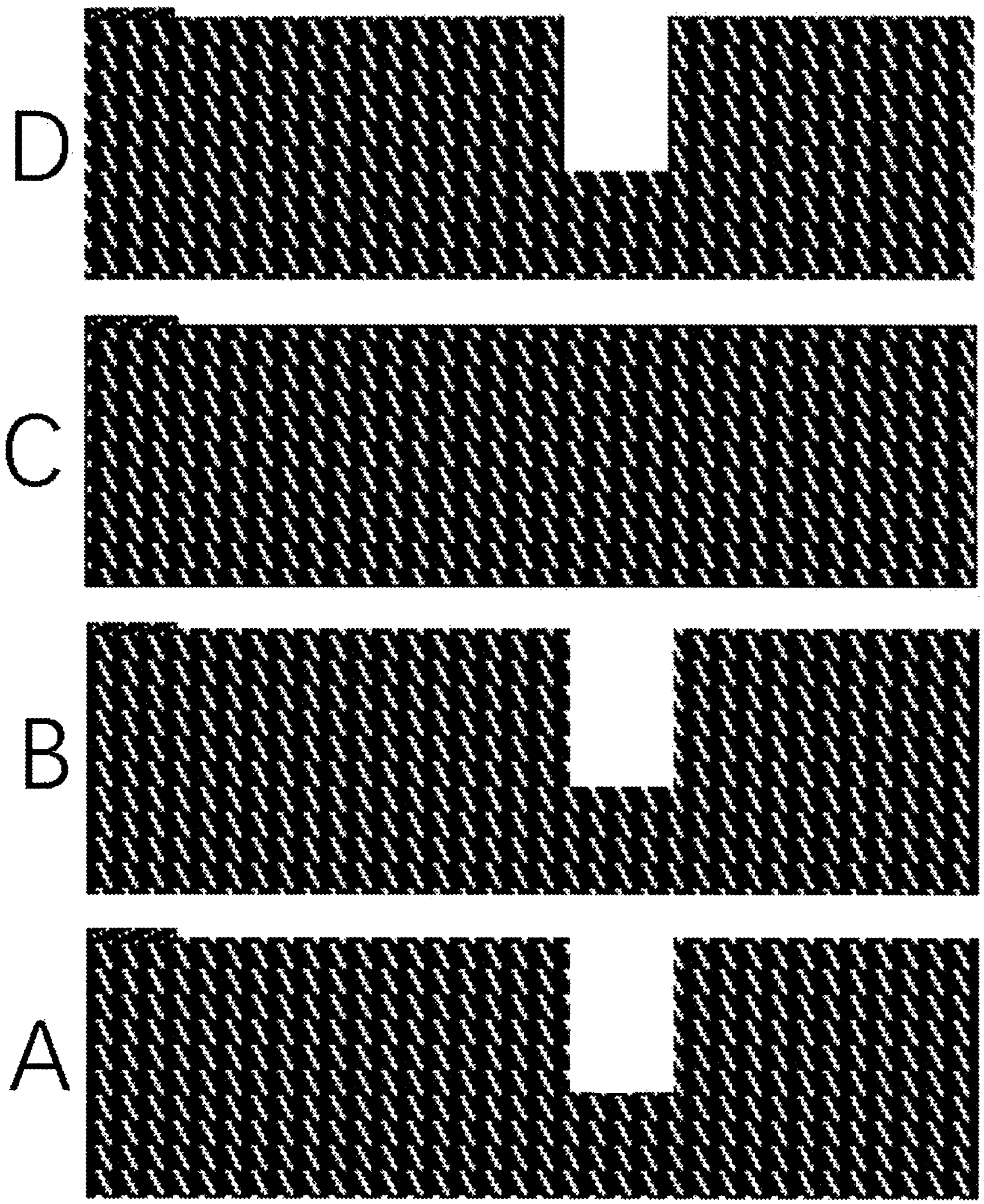
Figure 39B (Step 4)

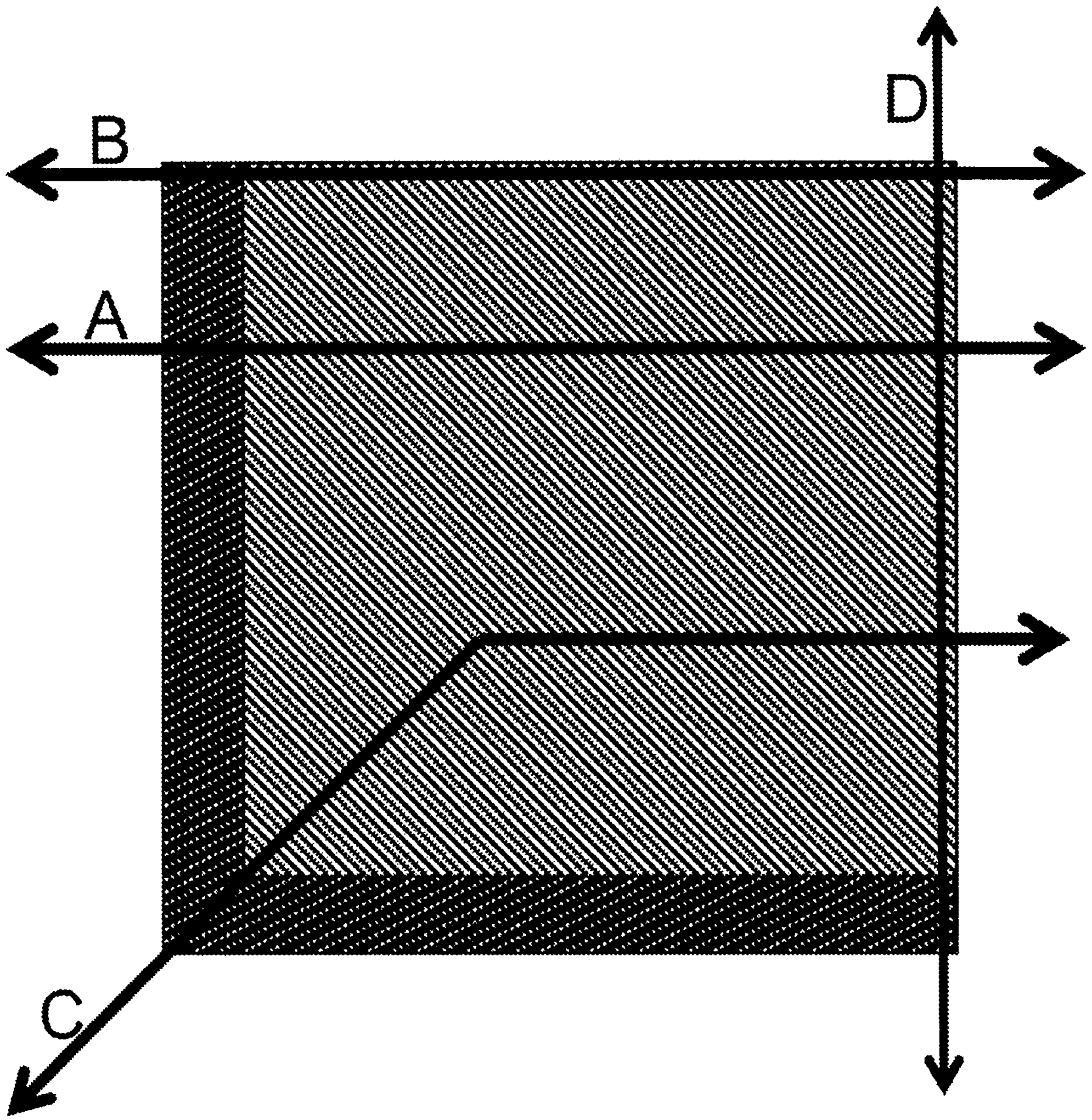
Figure 40A (Step 5)

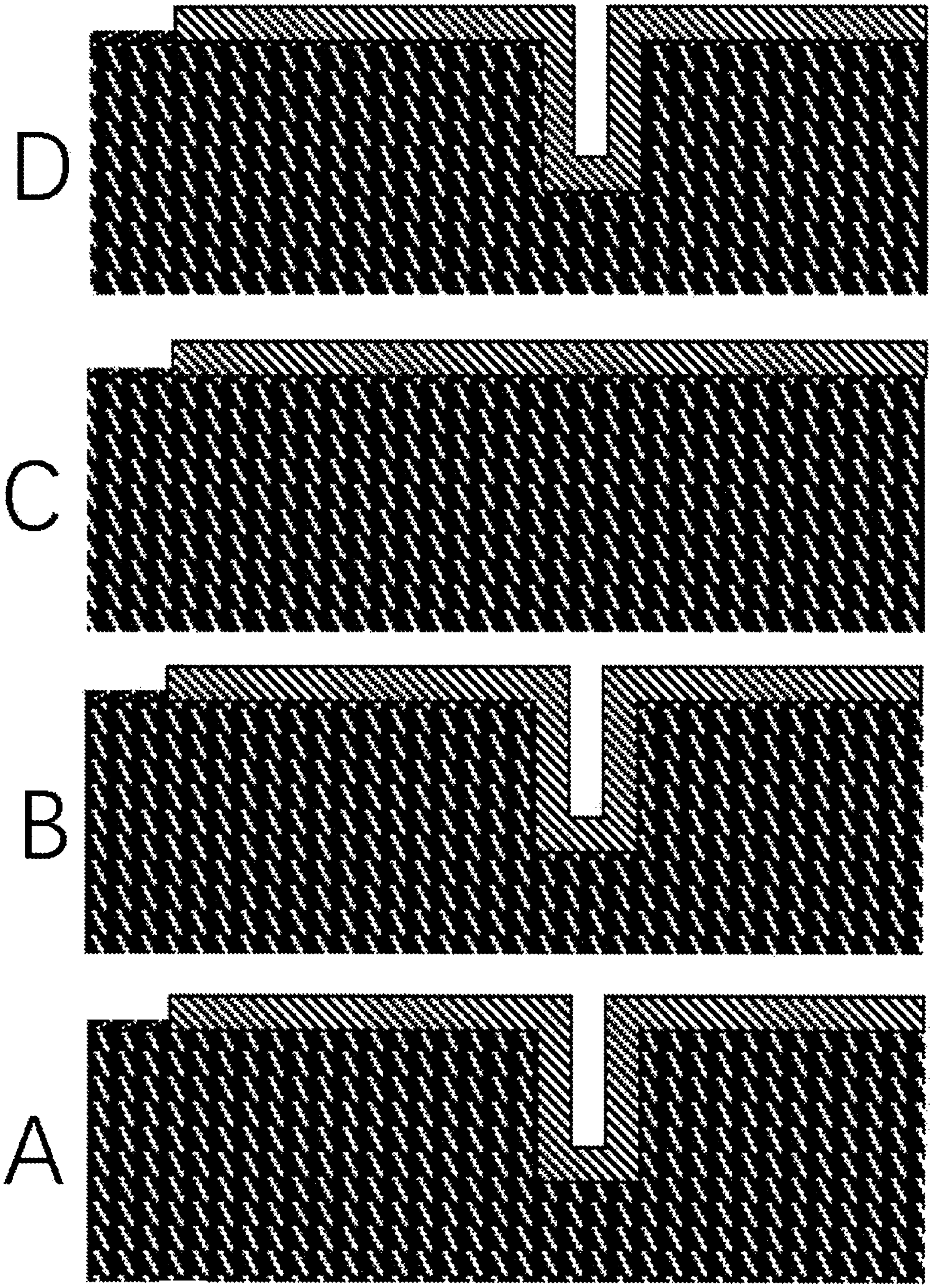
Figure 40B (Step 5)

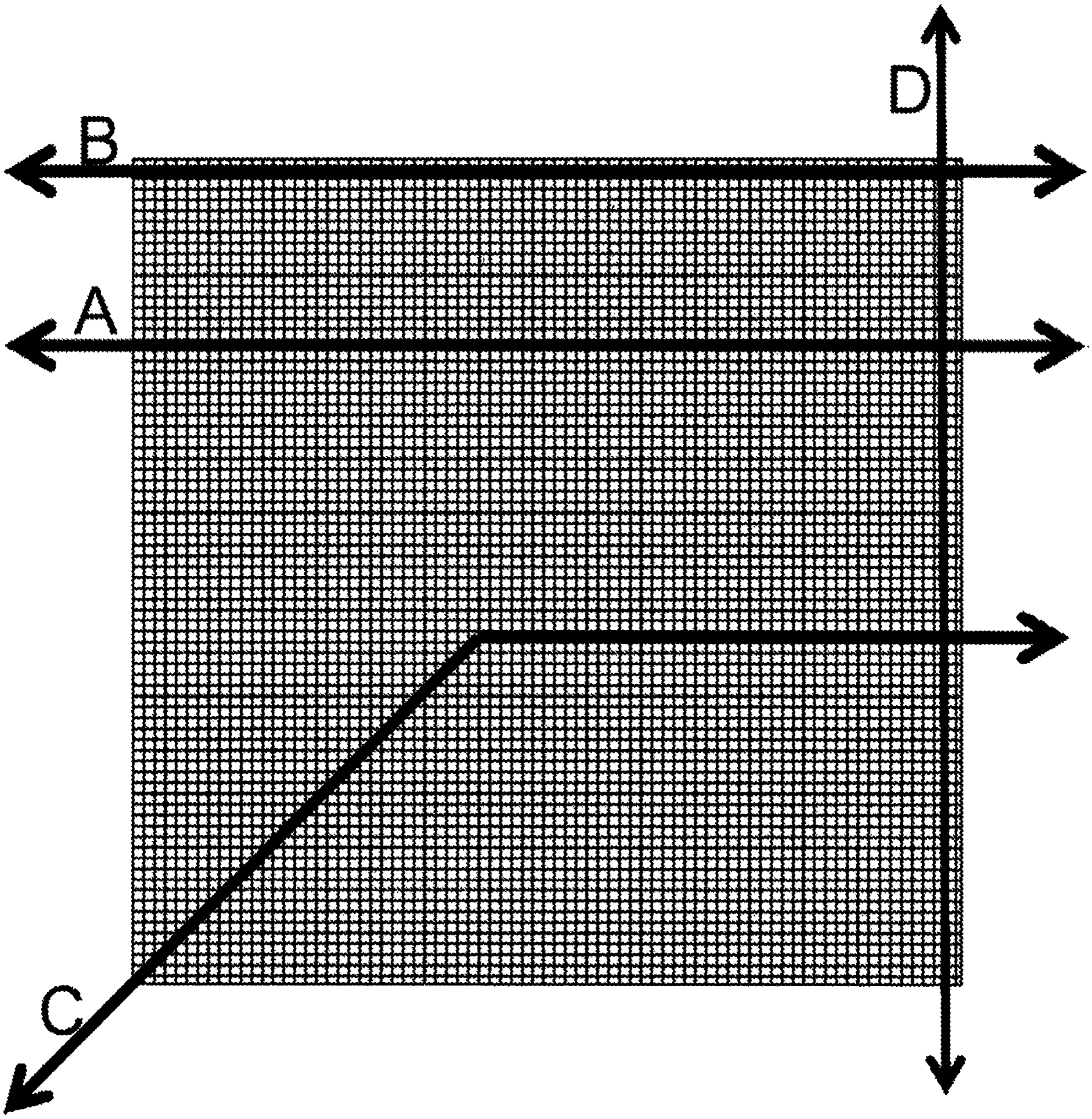
Figure 41A (Step 6)

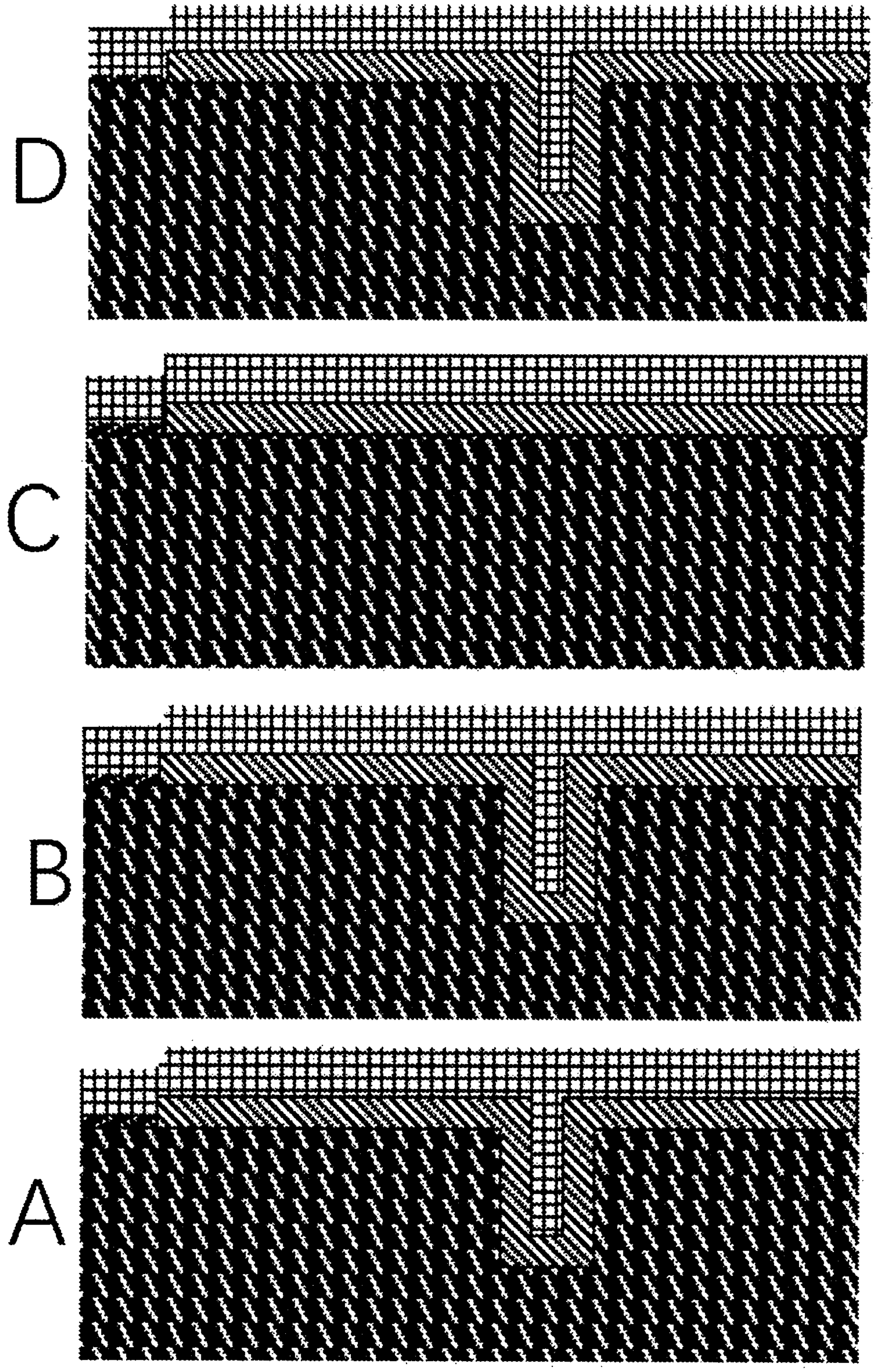
Figure 41B (Step 6)

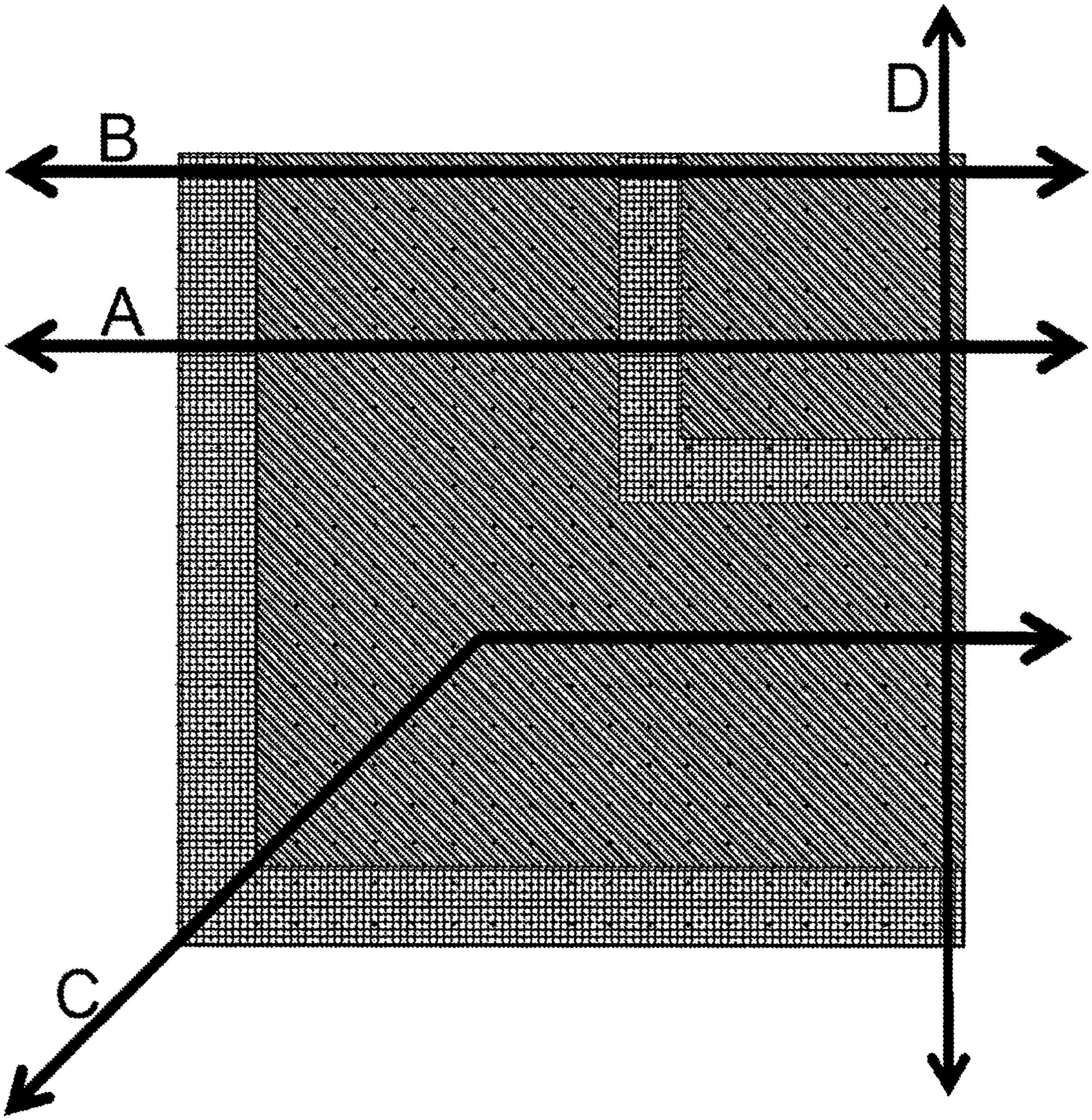
Figure 42A (Step 7)

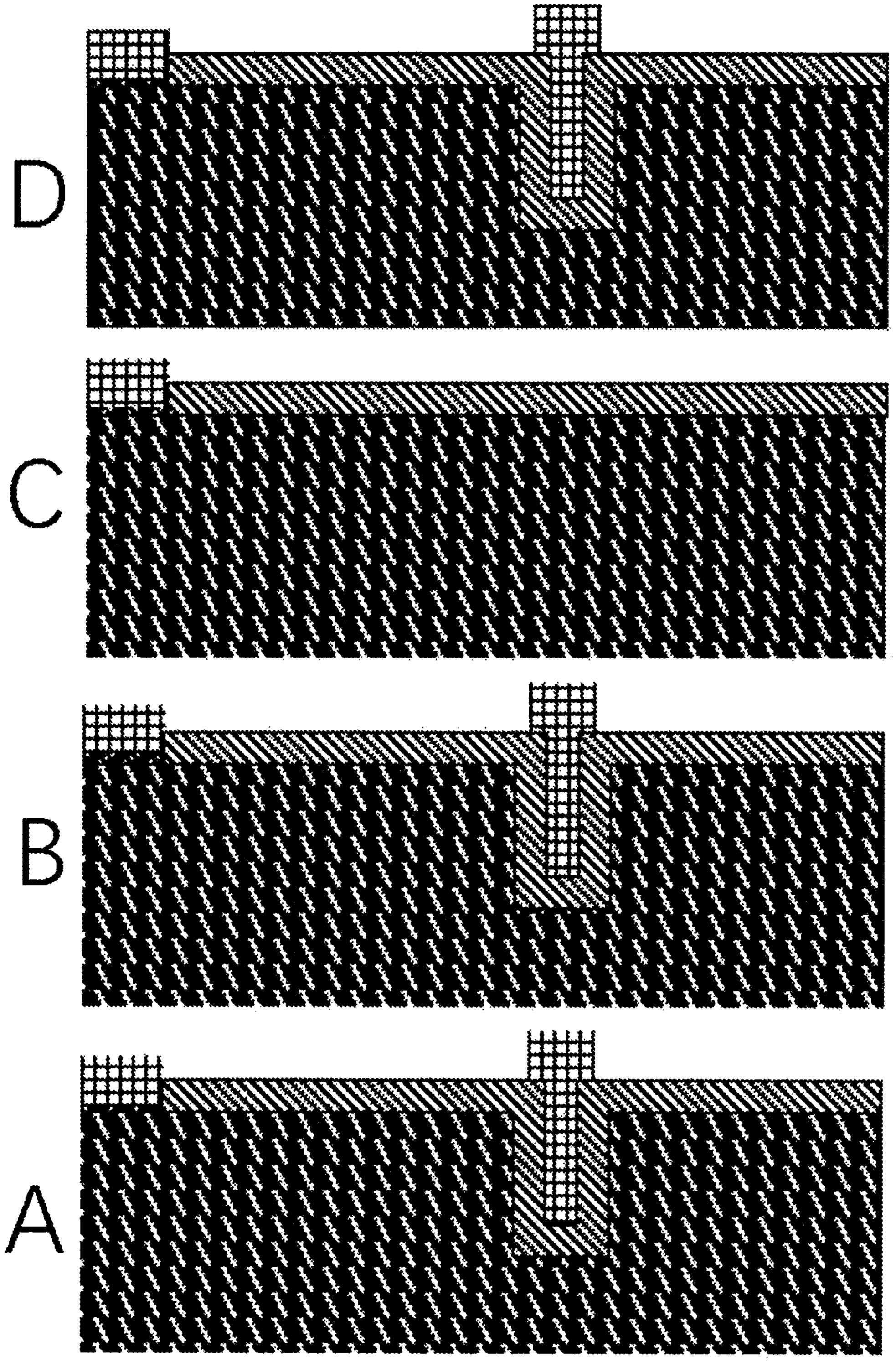
Figure 42B (Step 7)

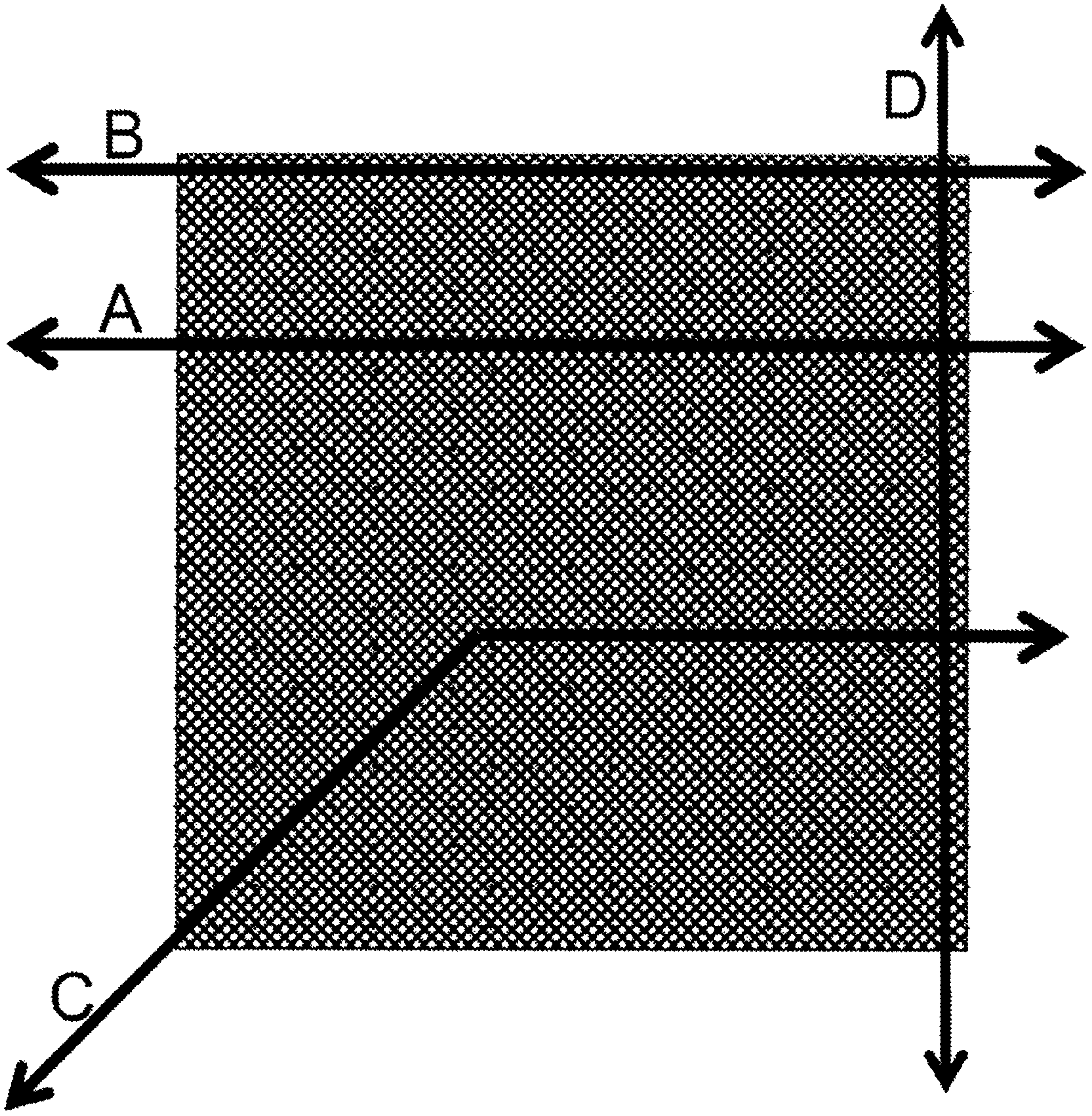
Figure 43A (Step 8)

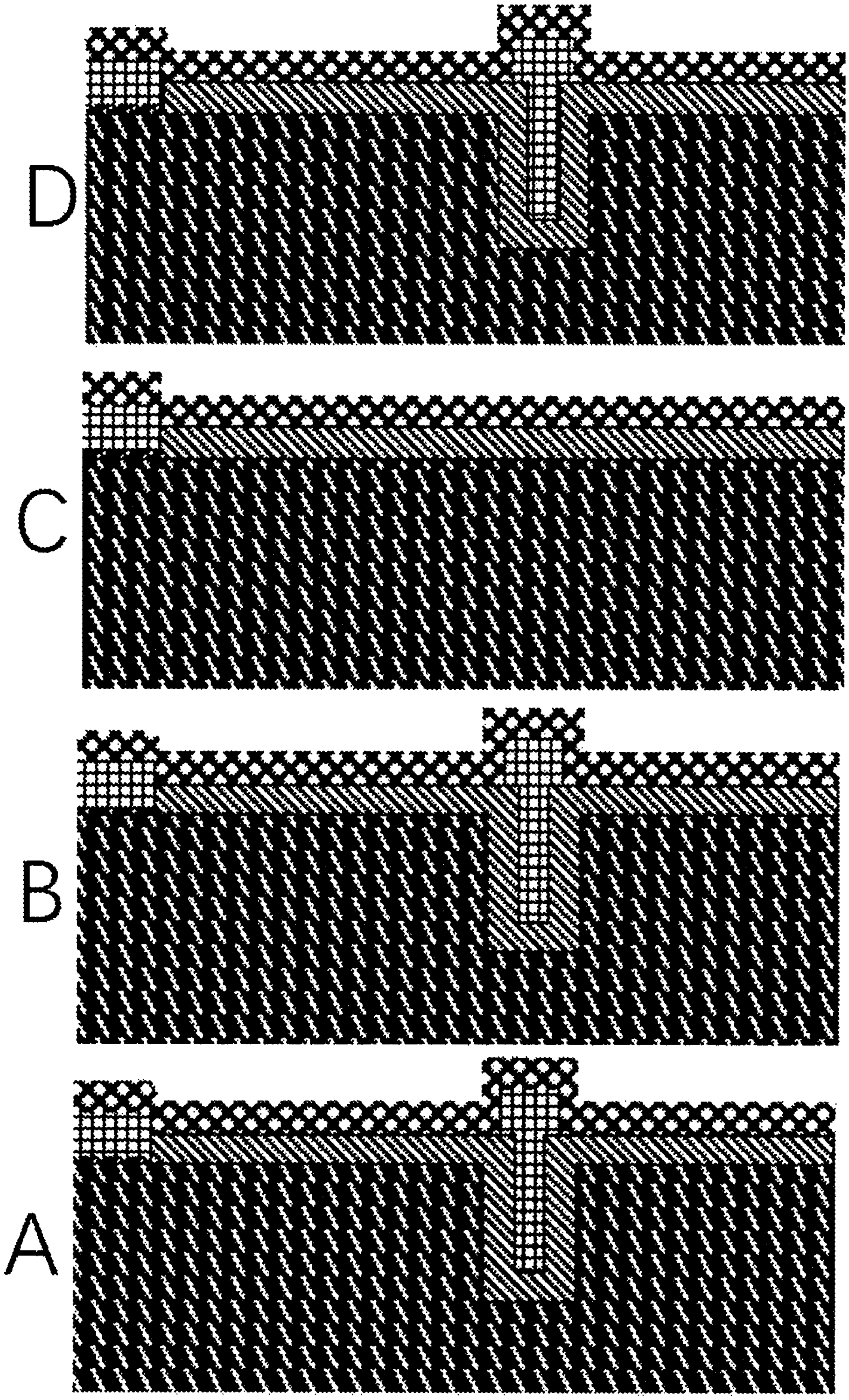
Figure 43B (Step 8)

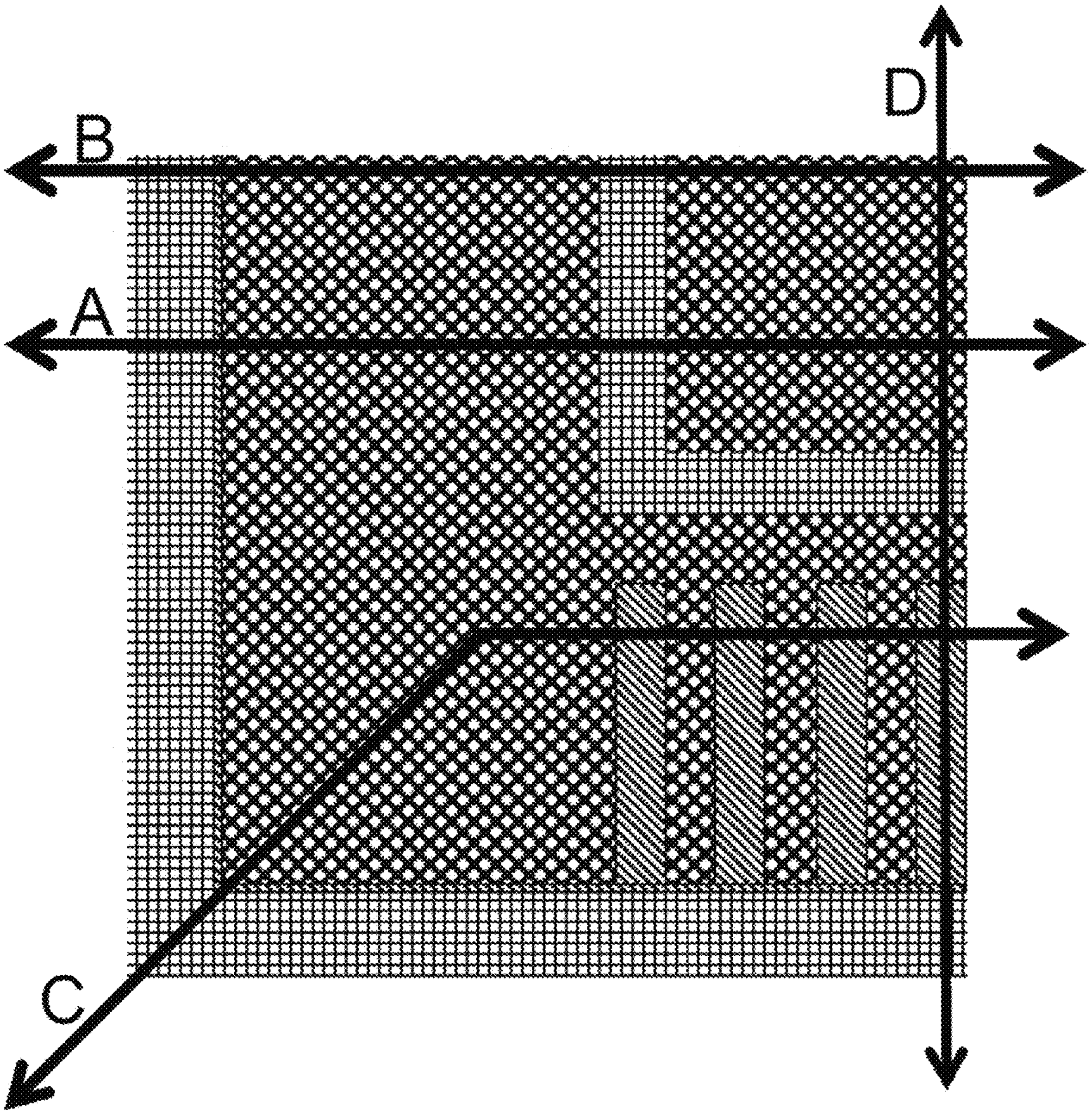
Figure 44A (Step 9)

D
C
B
A
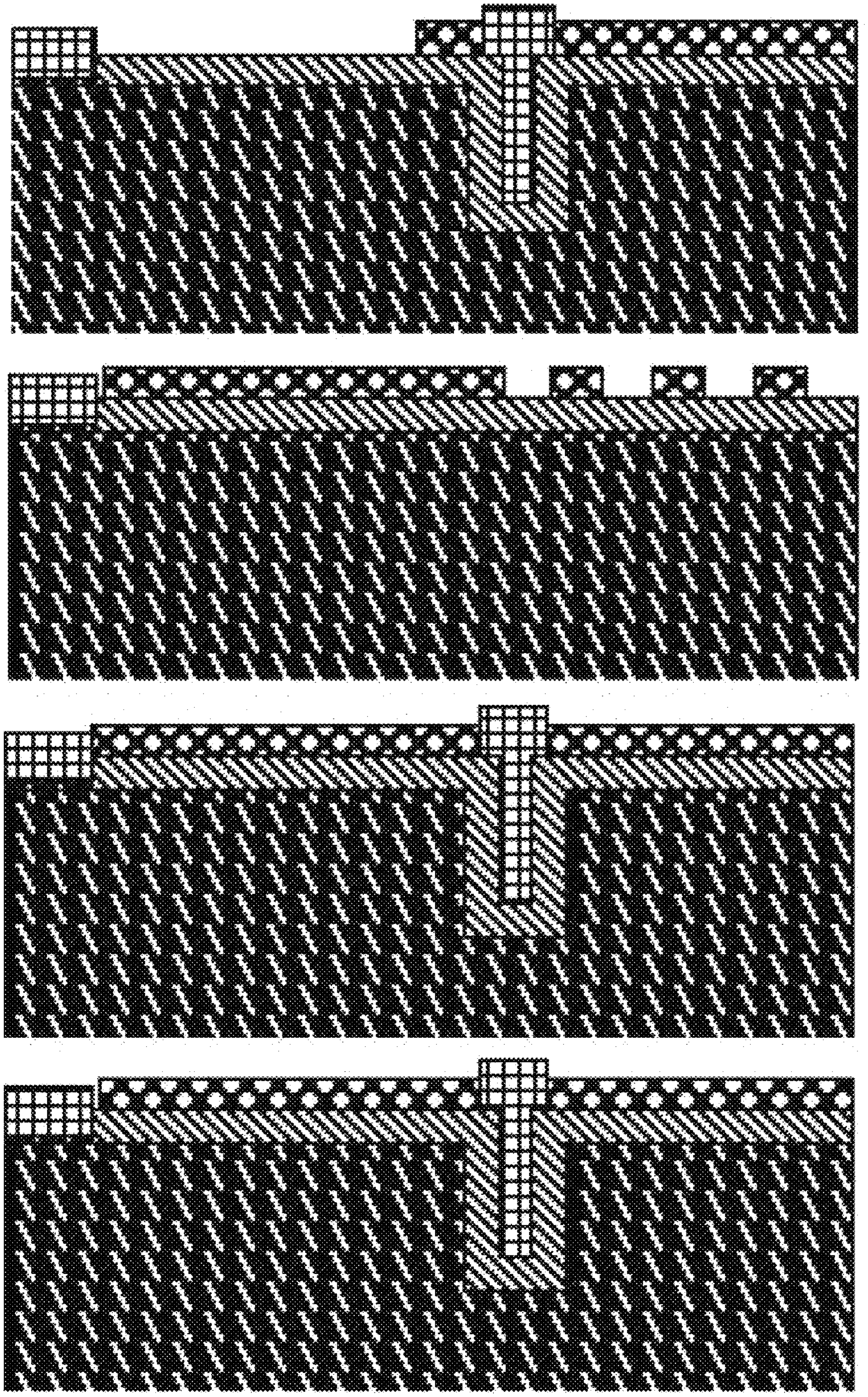
Figure 44B (Step 9)

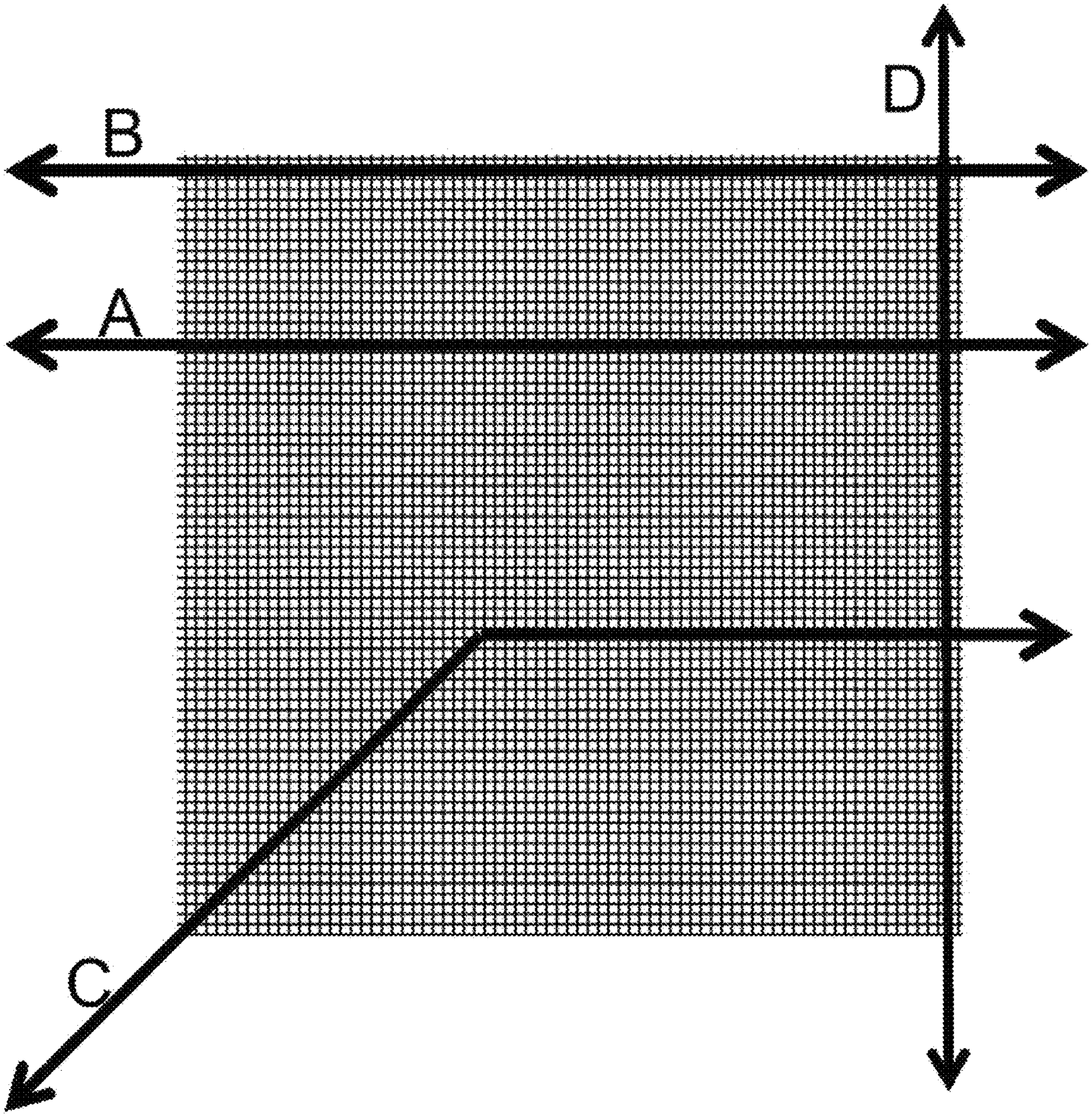
Figure 45A (Step 10)

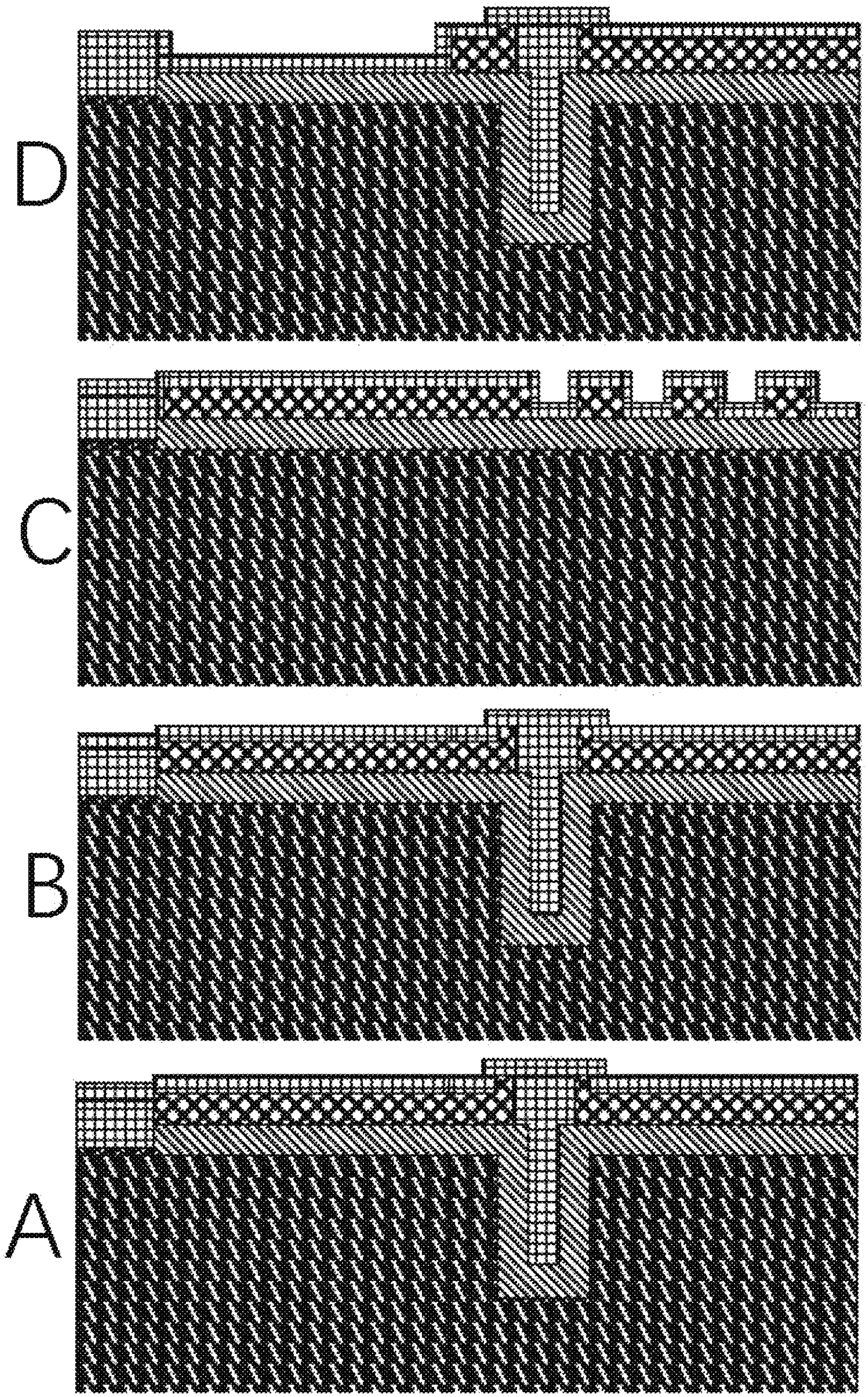
Figure 45B (Step 10)

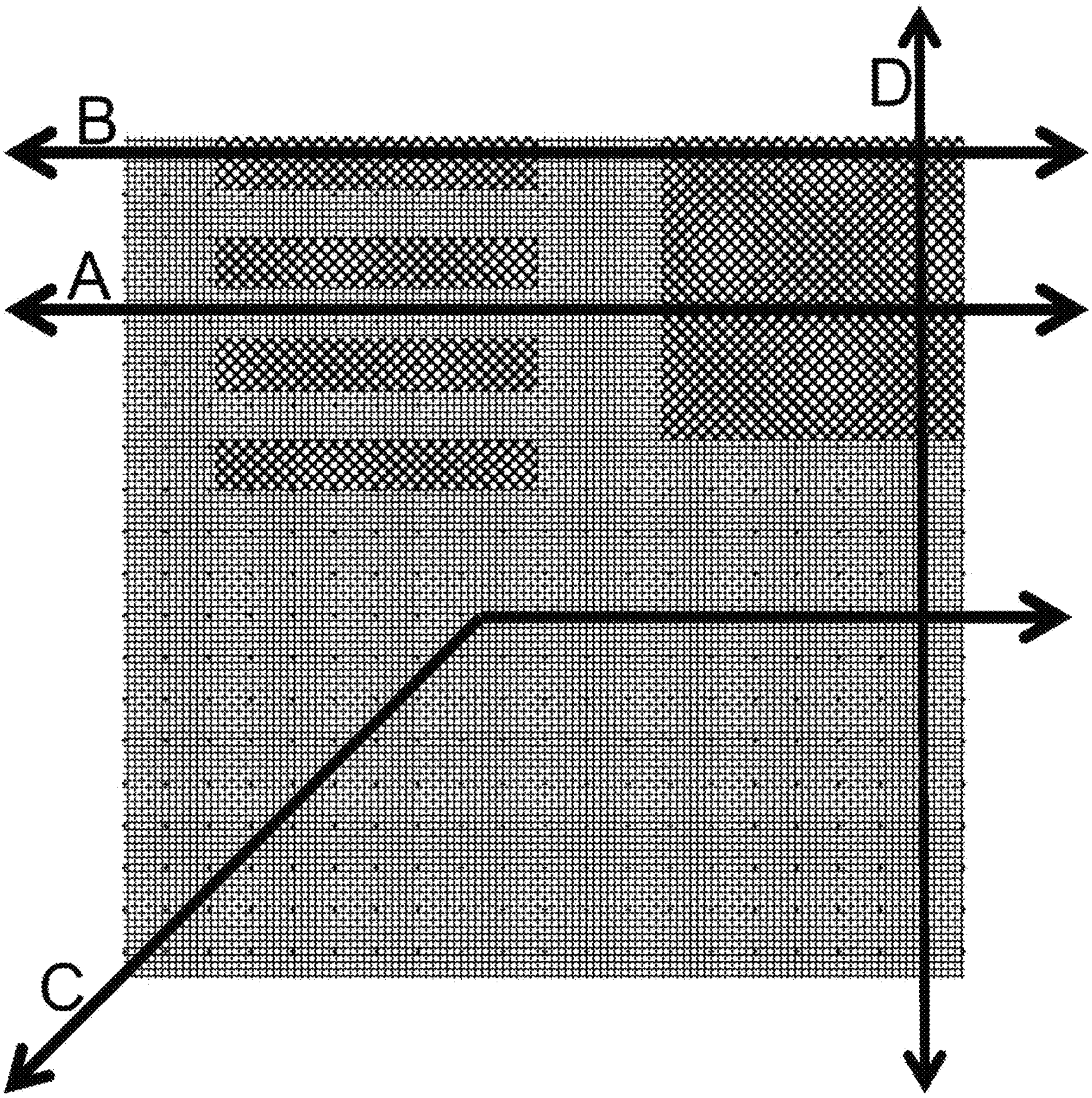
Figure 46A (Step 11)

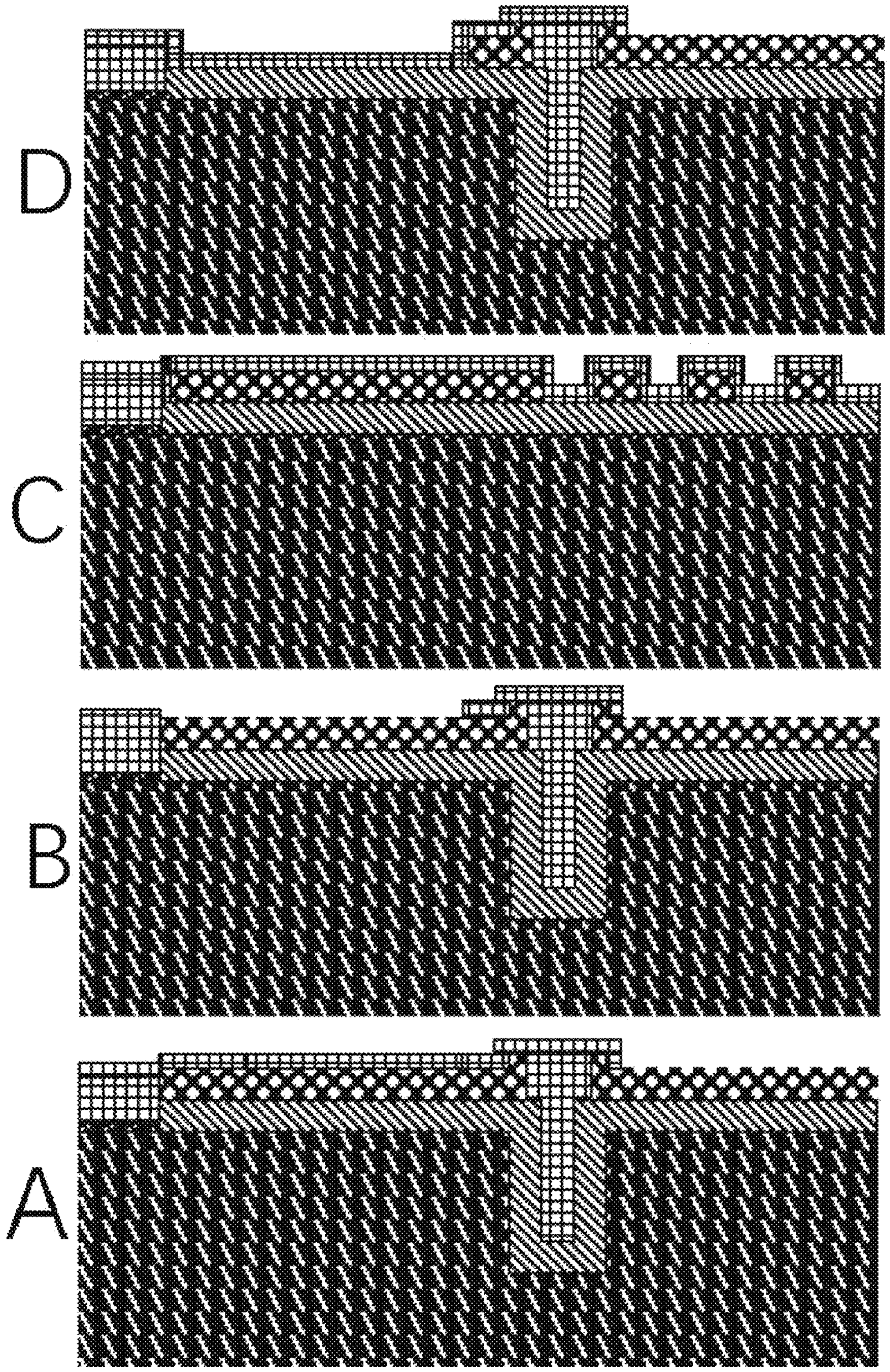
Figure 46B (Step 11)

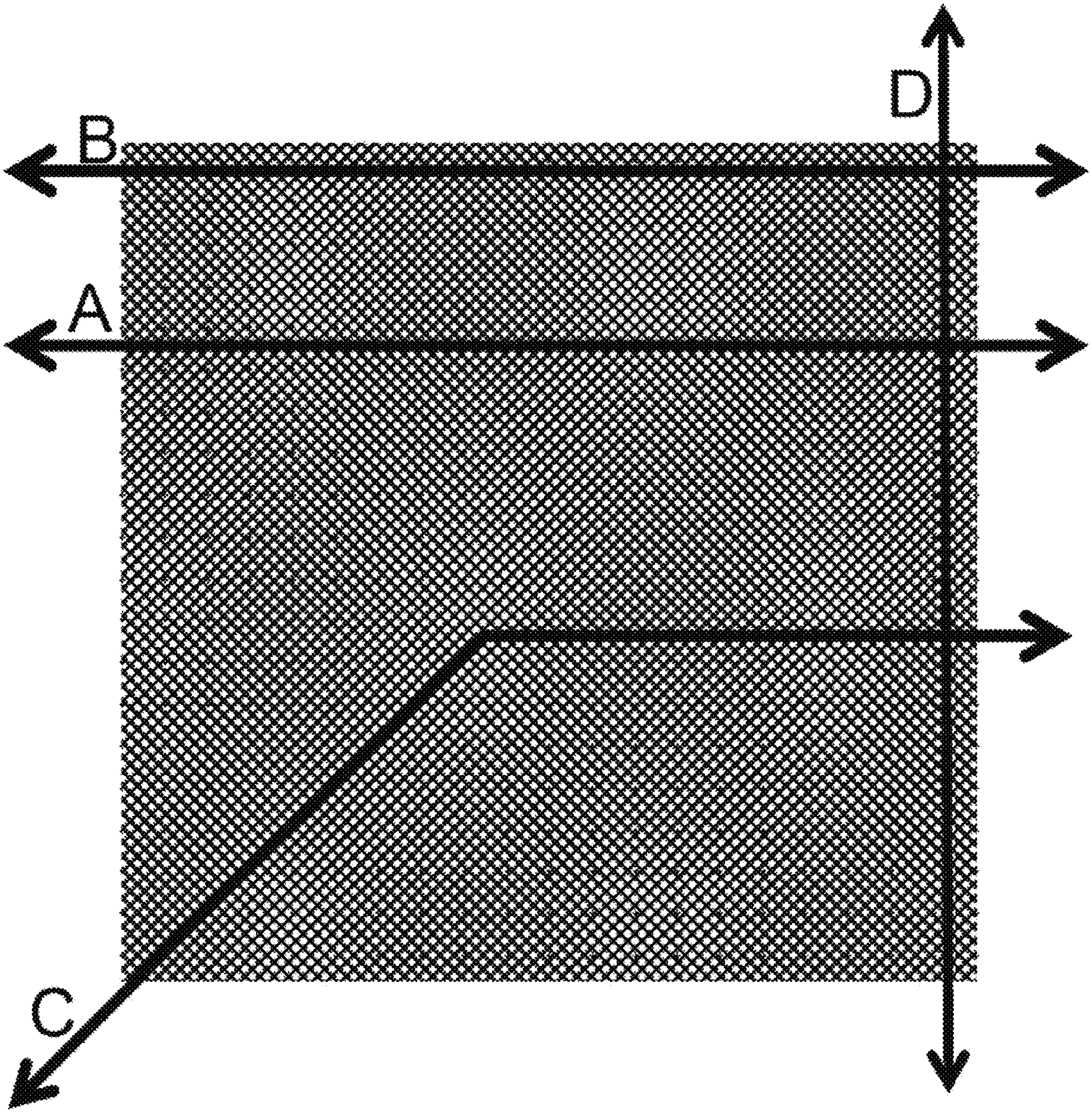
Figure 47A (Step 12)

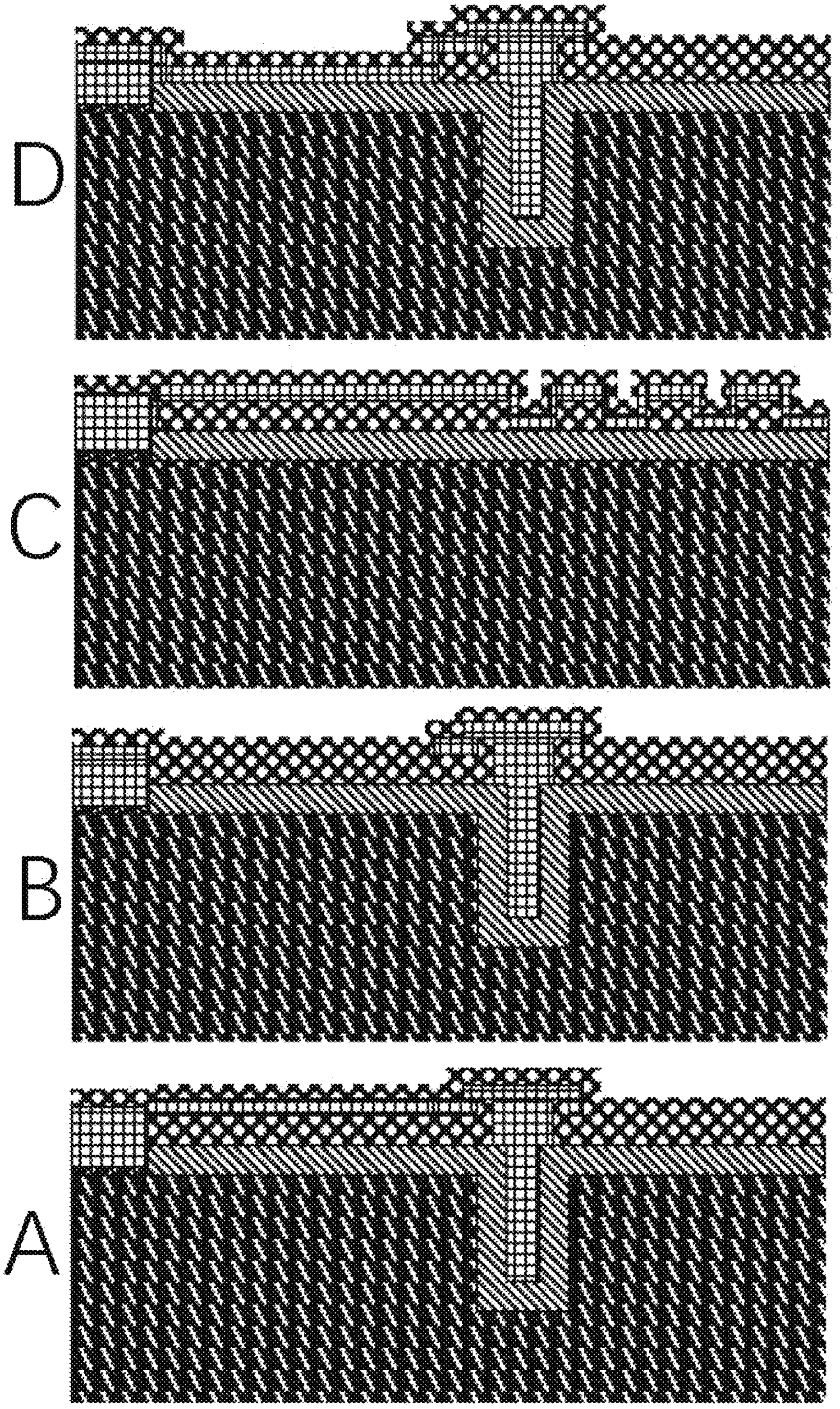
Figure 47B (Step 12)

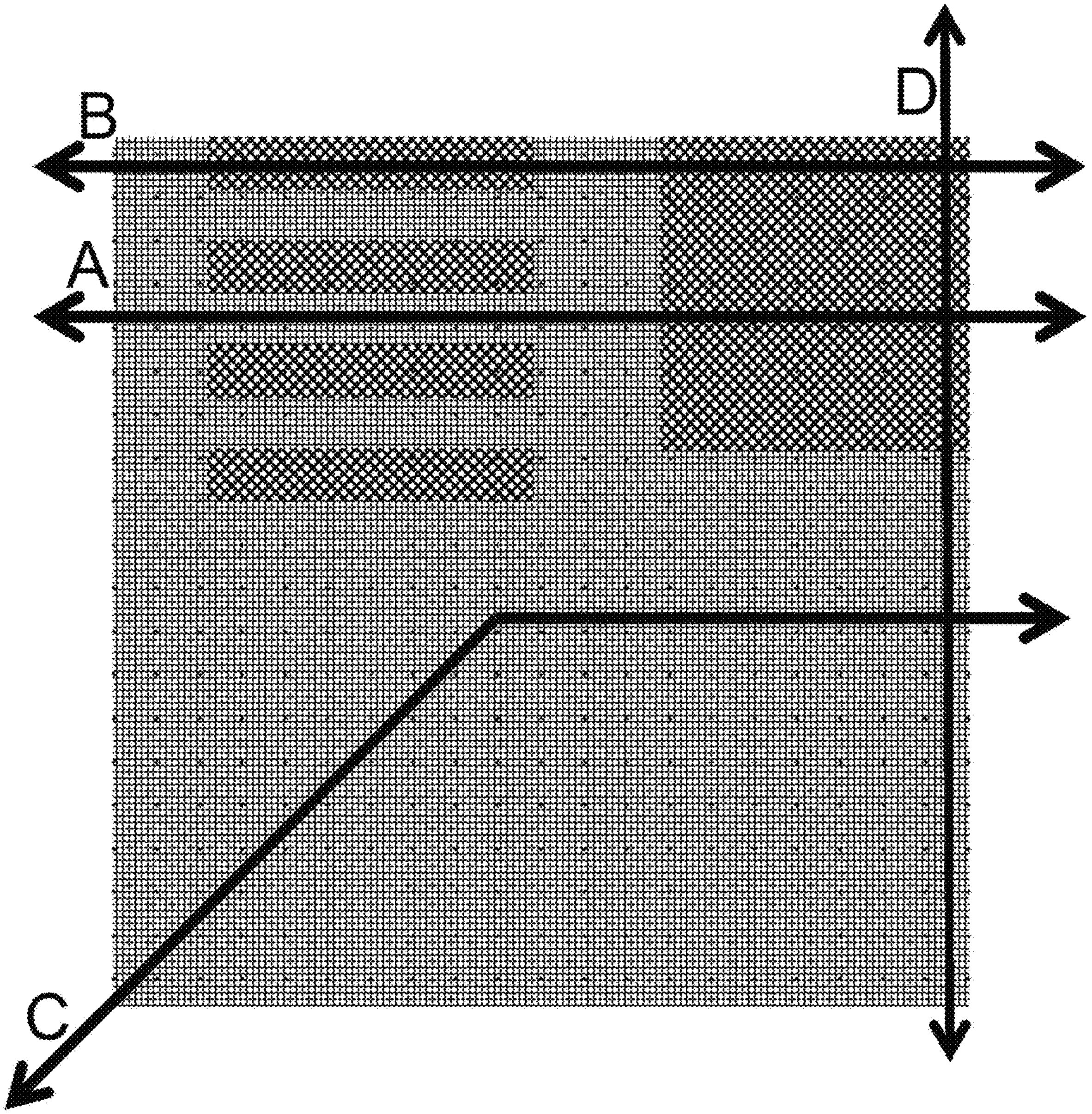
Figure 48A (Step 13)

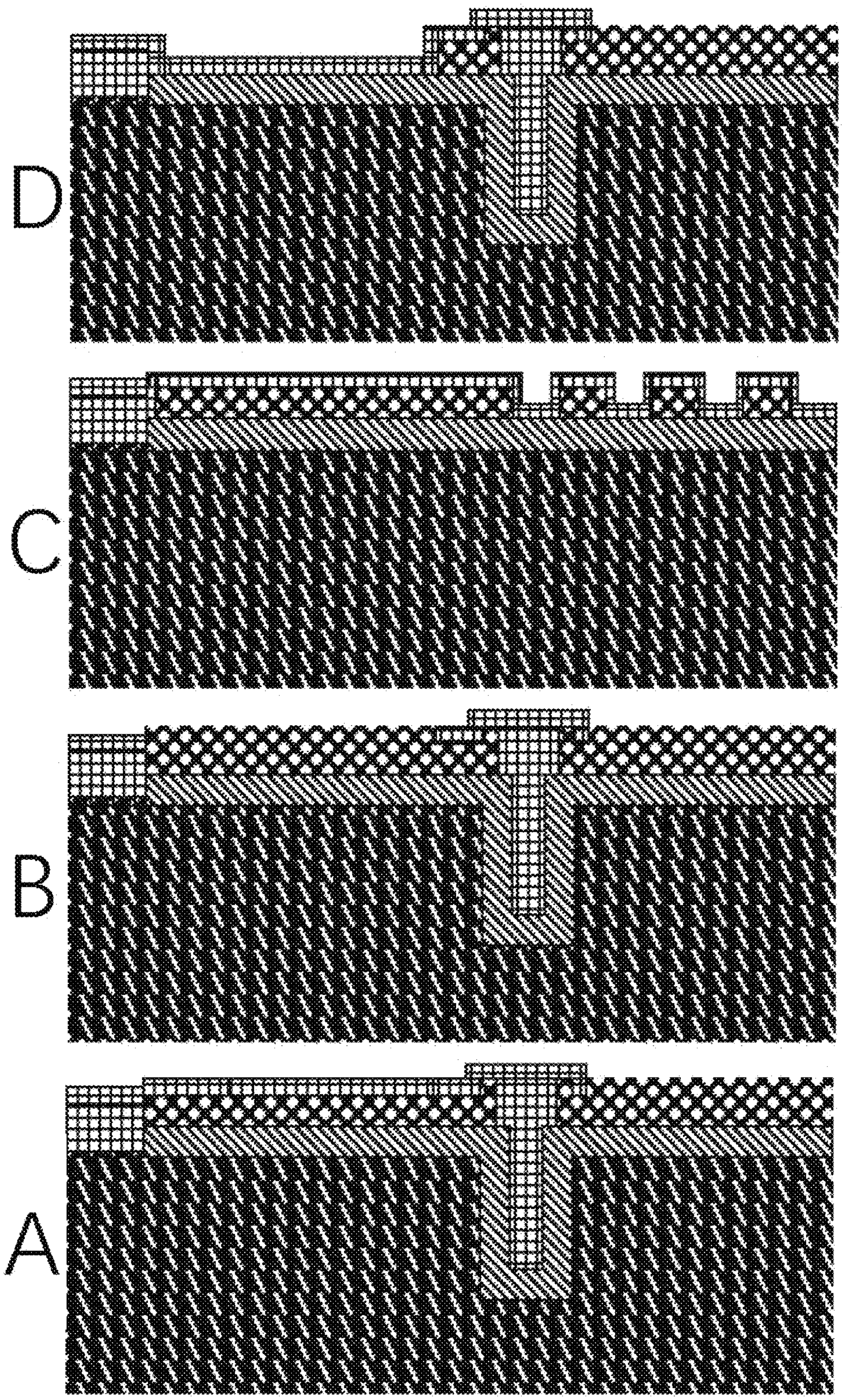
Figure 48B (Step 13)

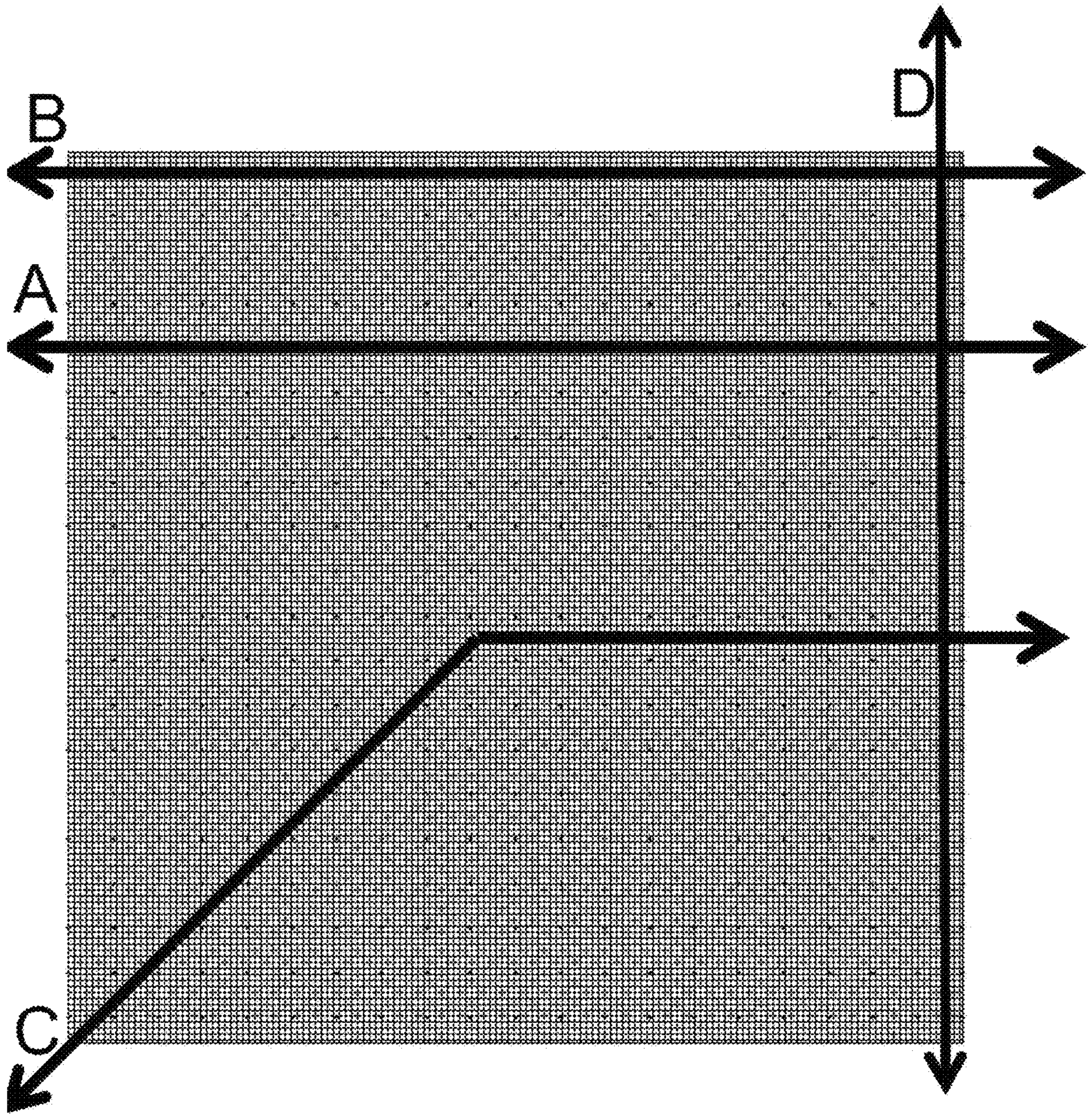
Figure 49A (Step 14)

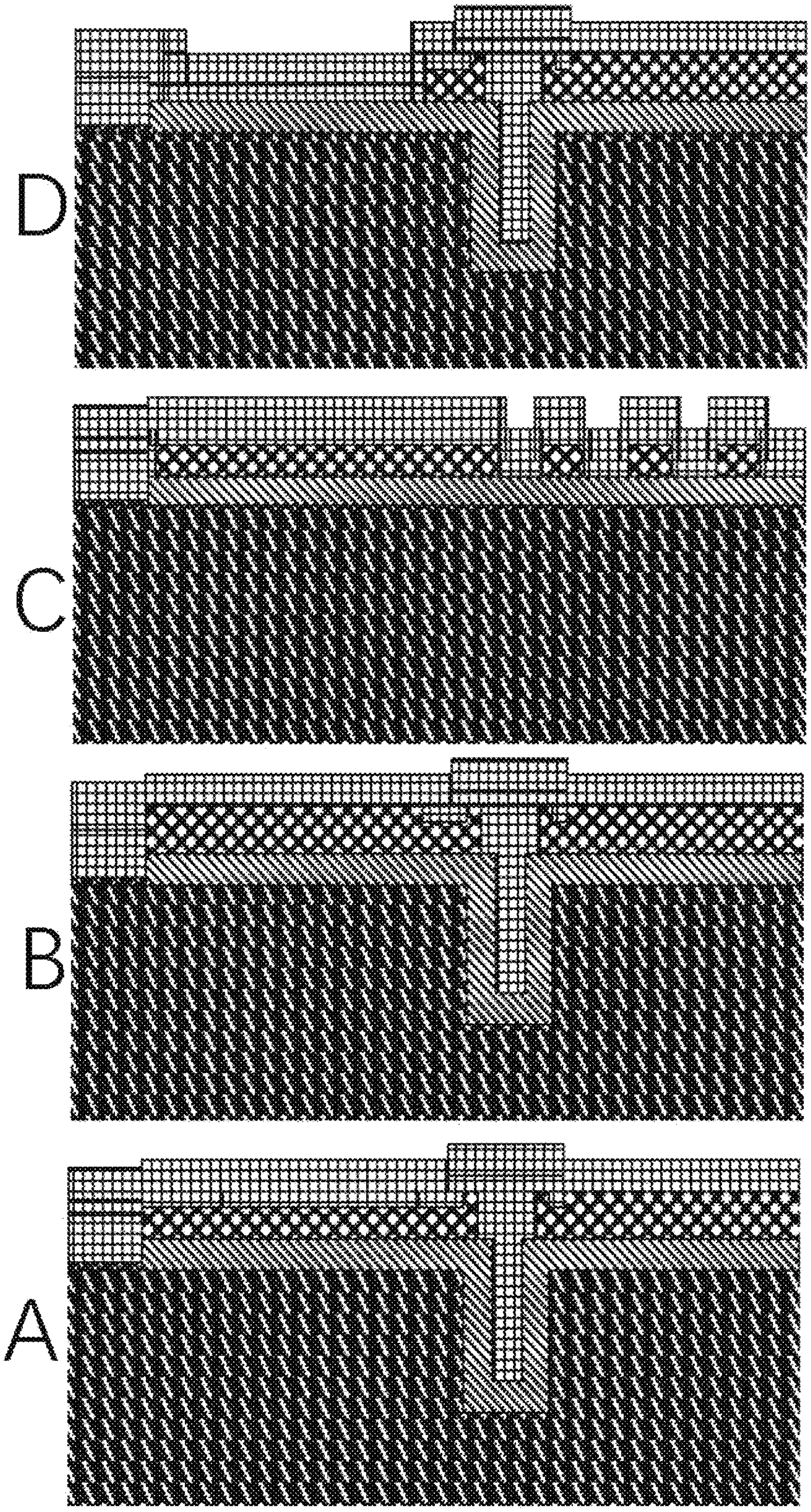
Figure 49B (Step 14)

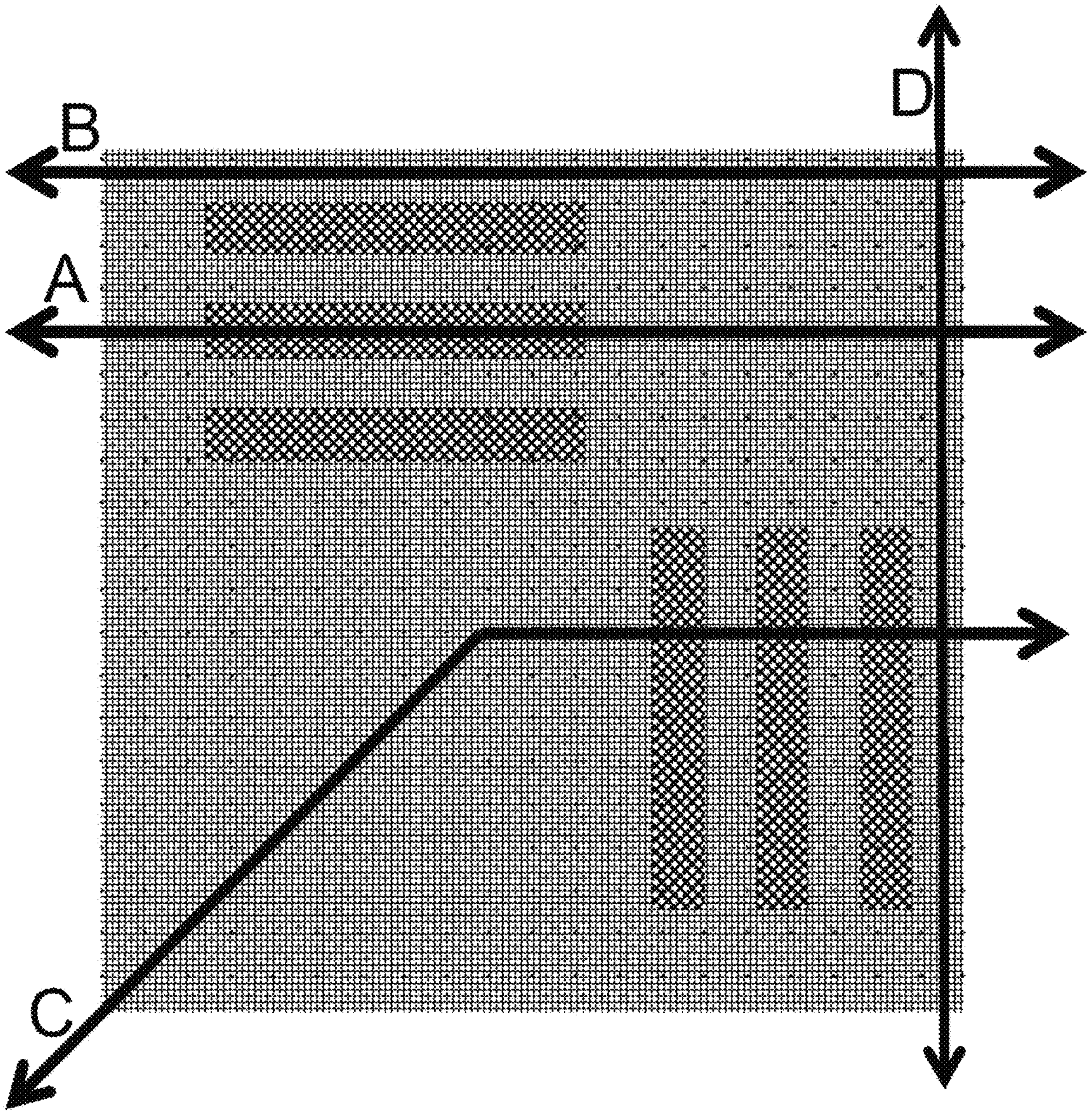
Figure 50A (Step 15)

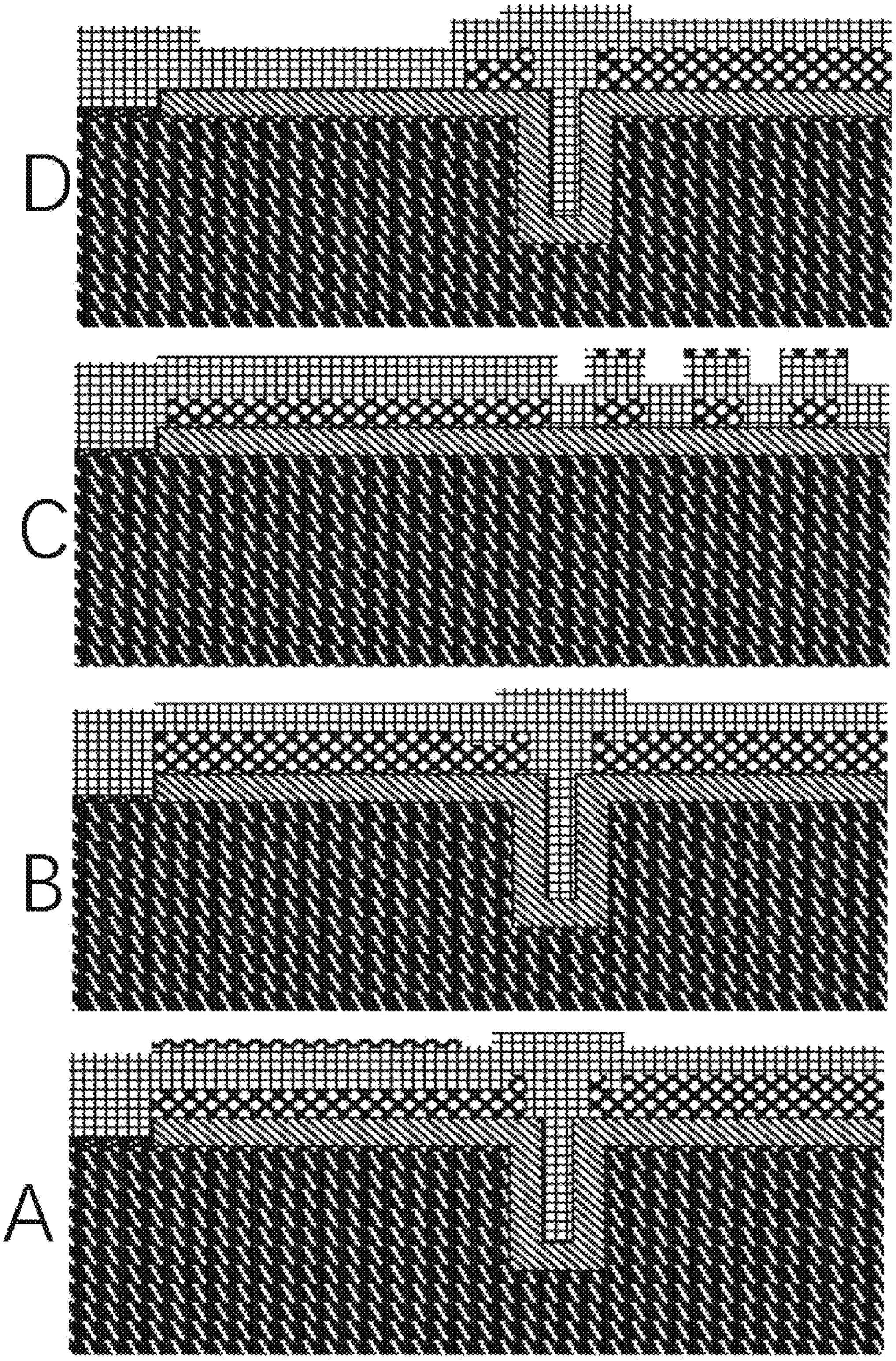
Figure 50B (Step 15)

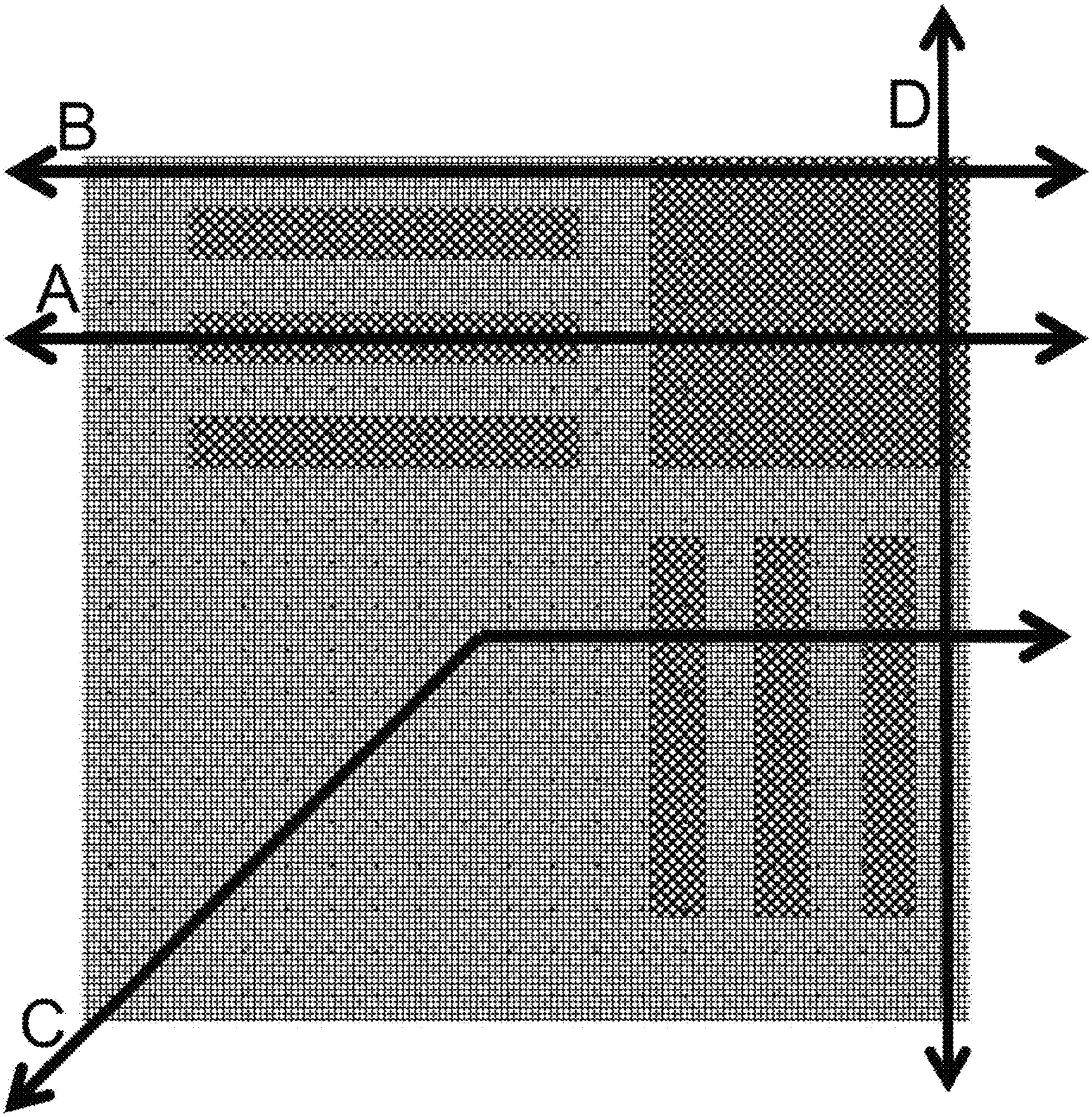
Figure 51A (Step 16)

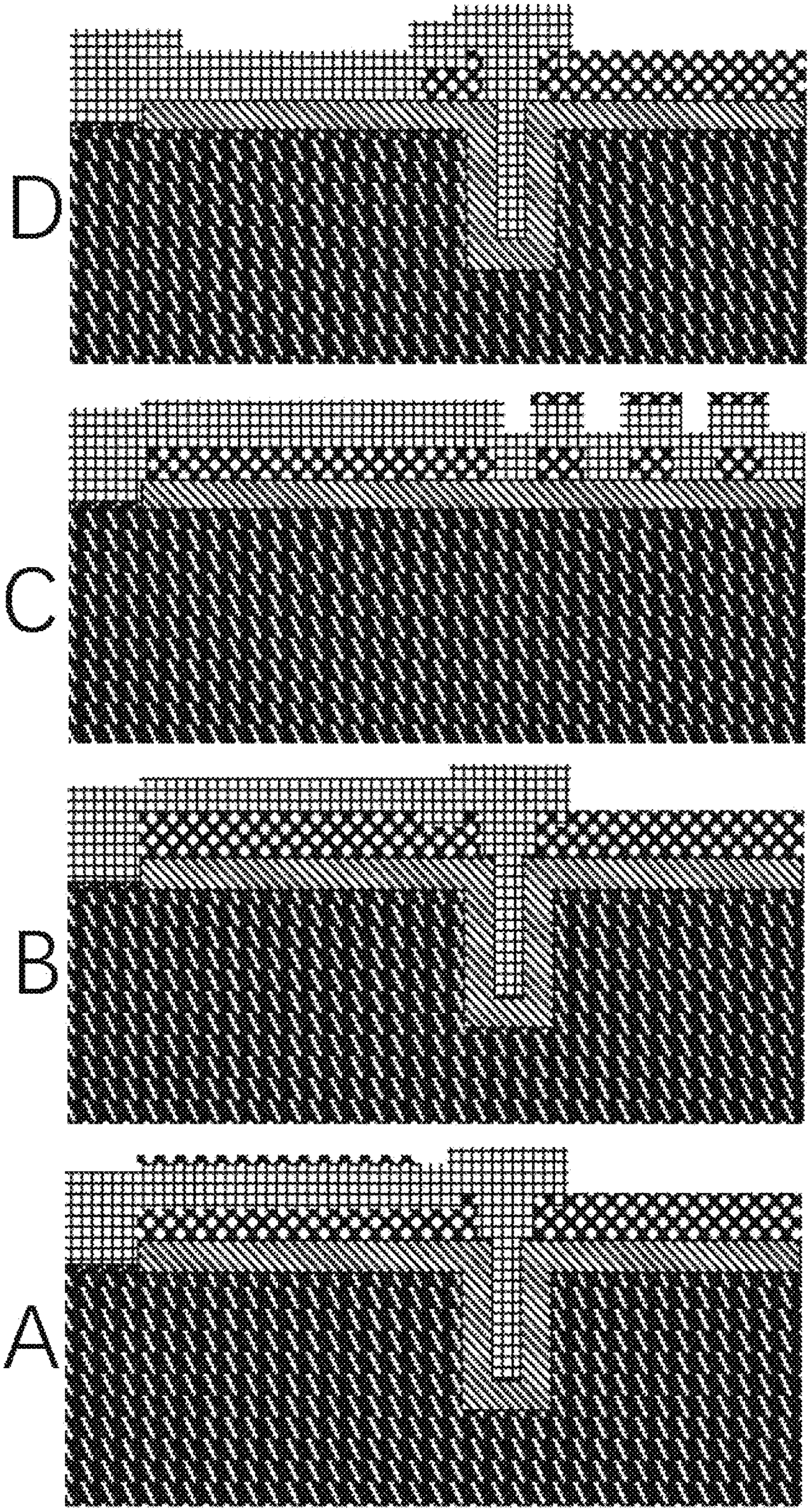
Figure 51B (Step 16)

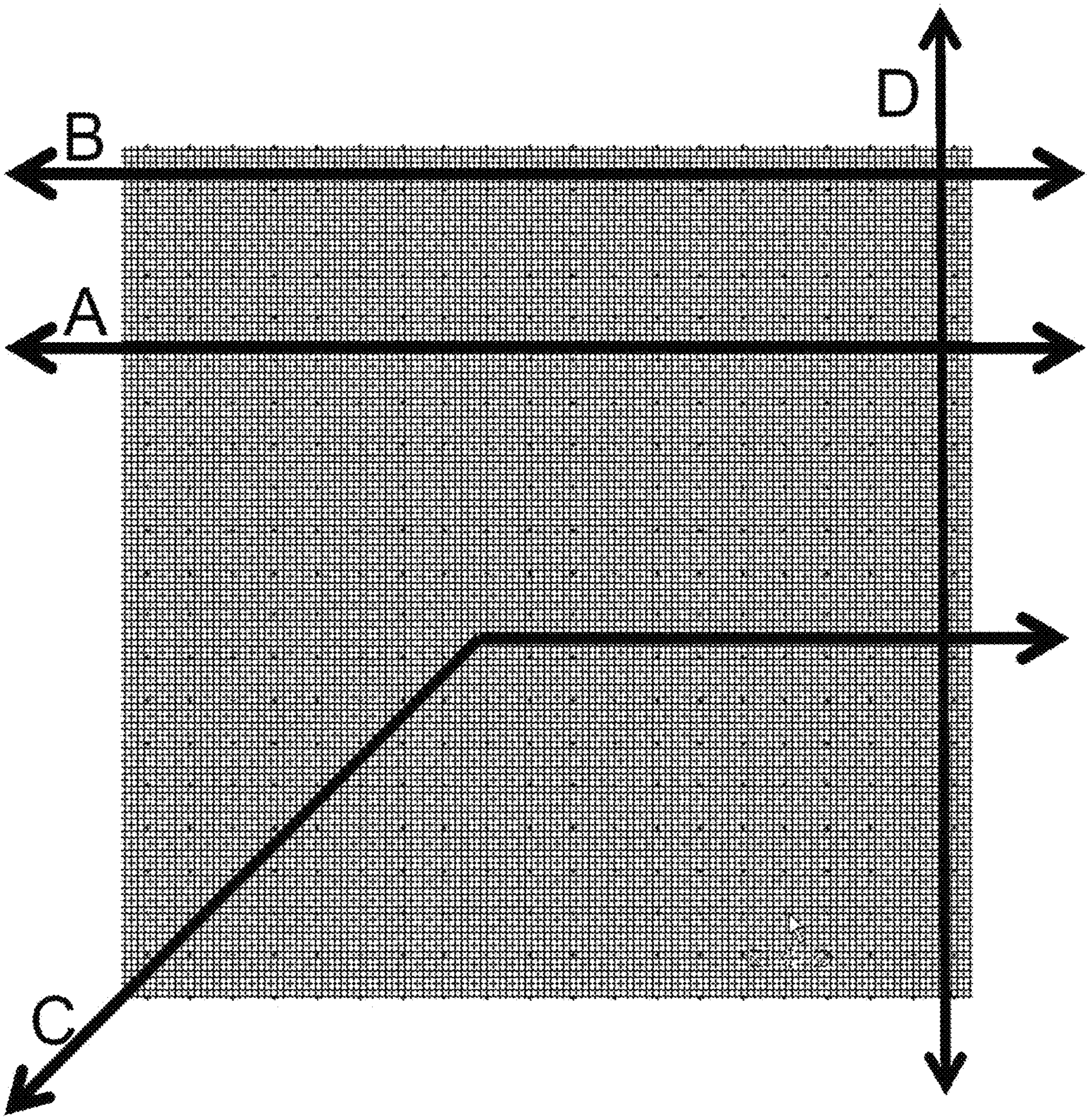
Figure 52A (Step 17)

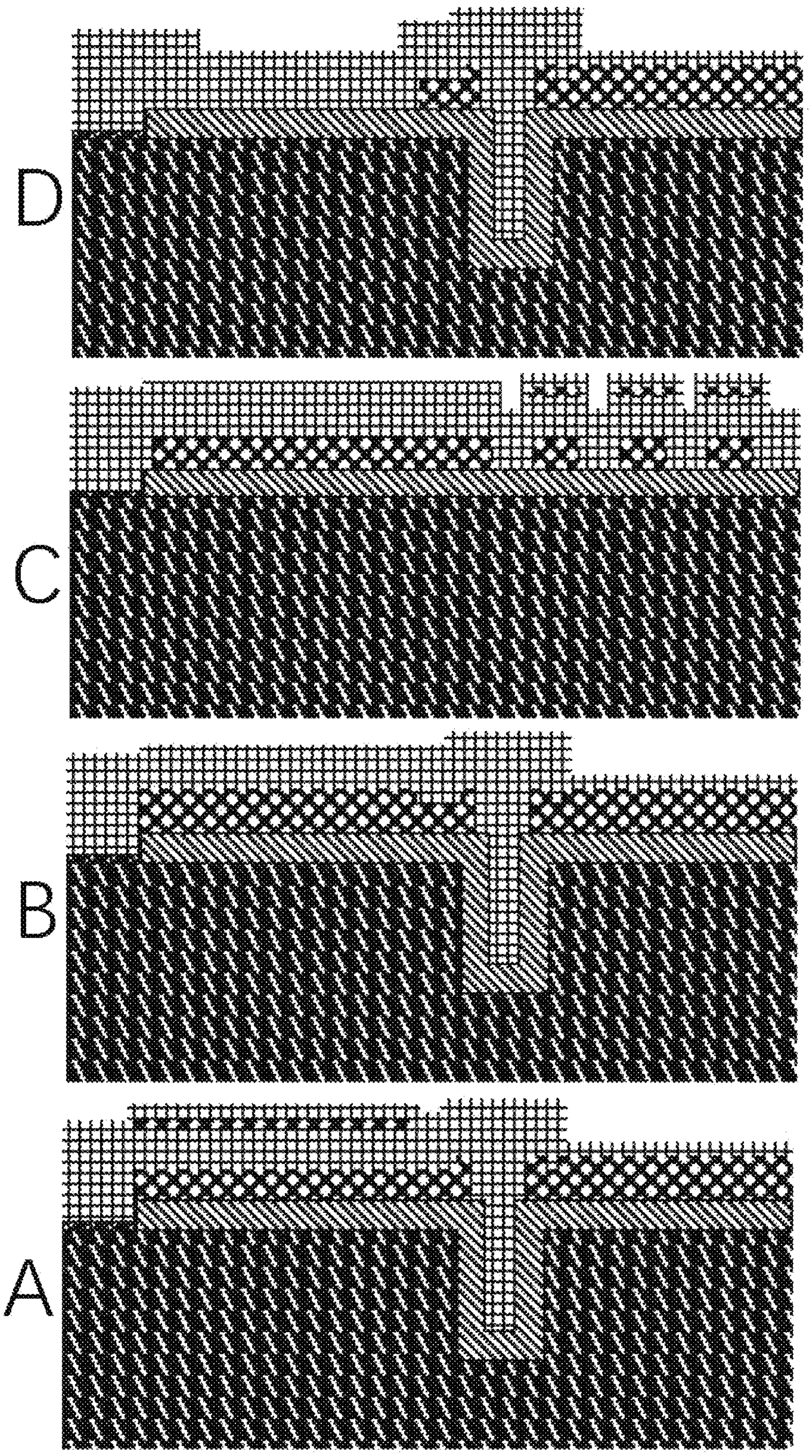
Figure 52B (Step 17)

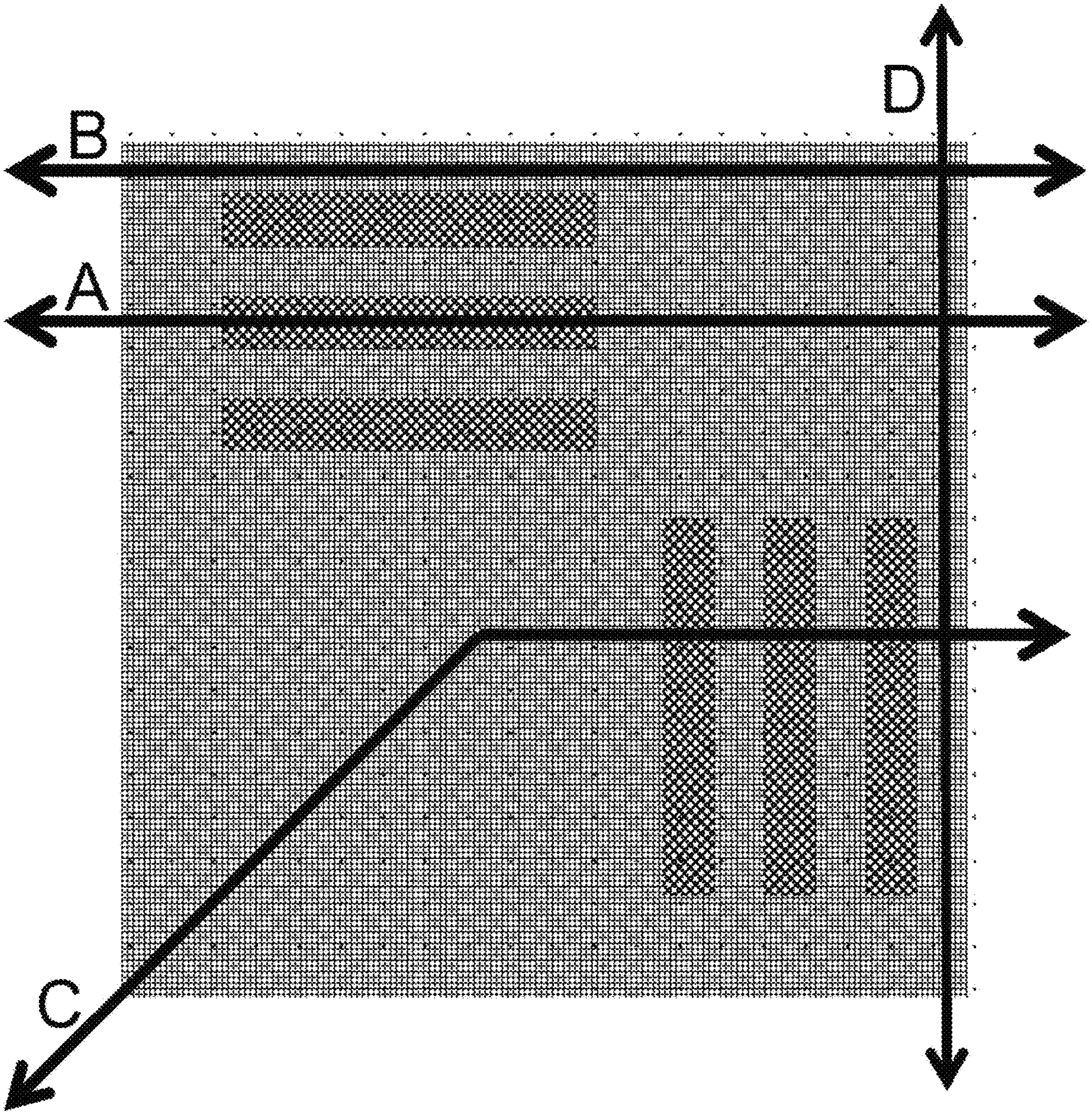
Figure 53A (Step 18)

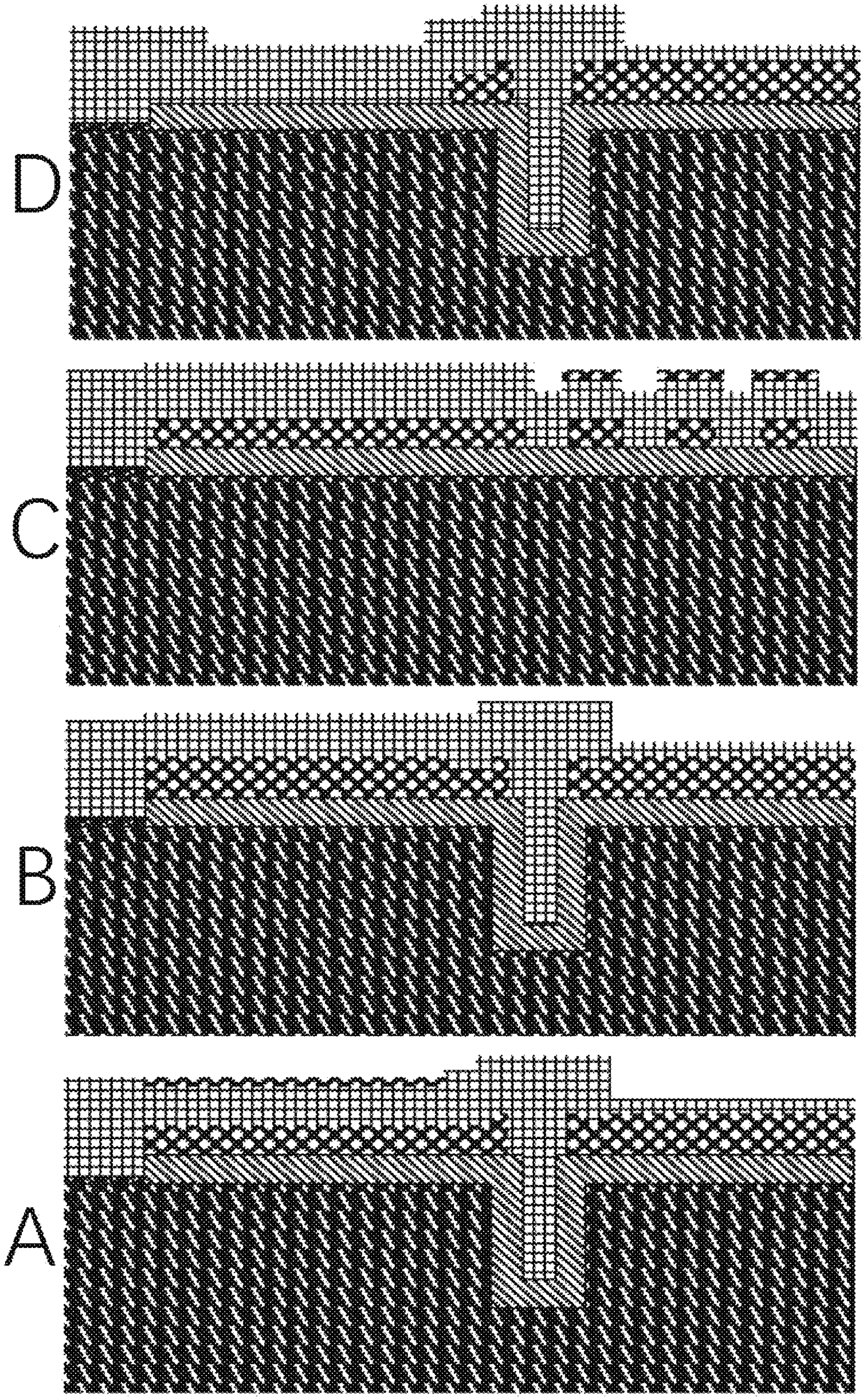
Figure 53B (Step 18)

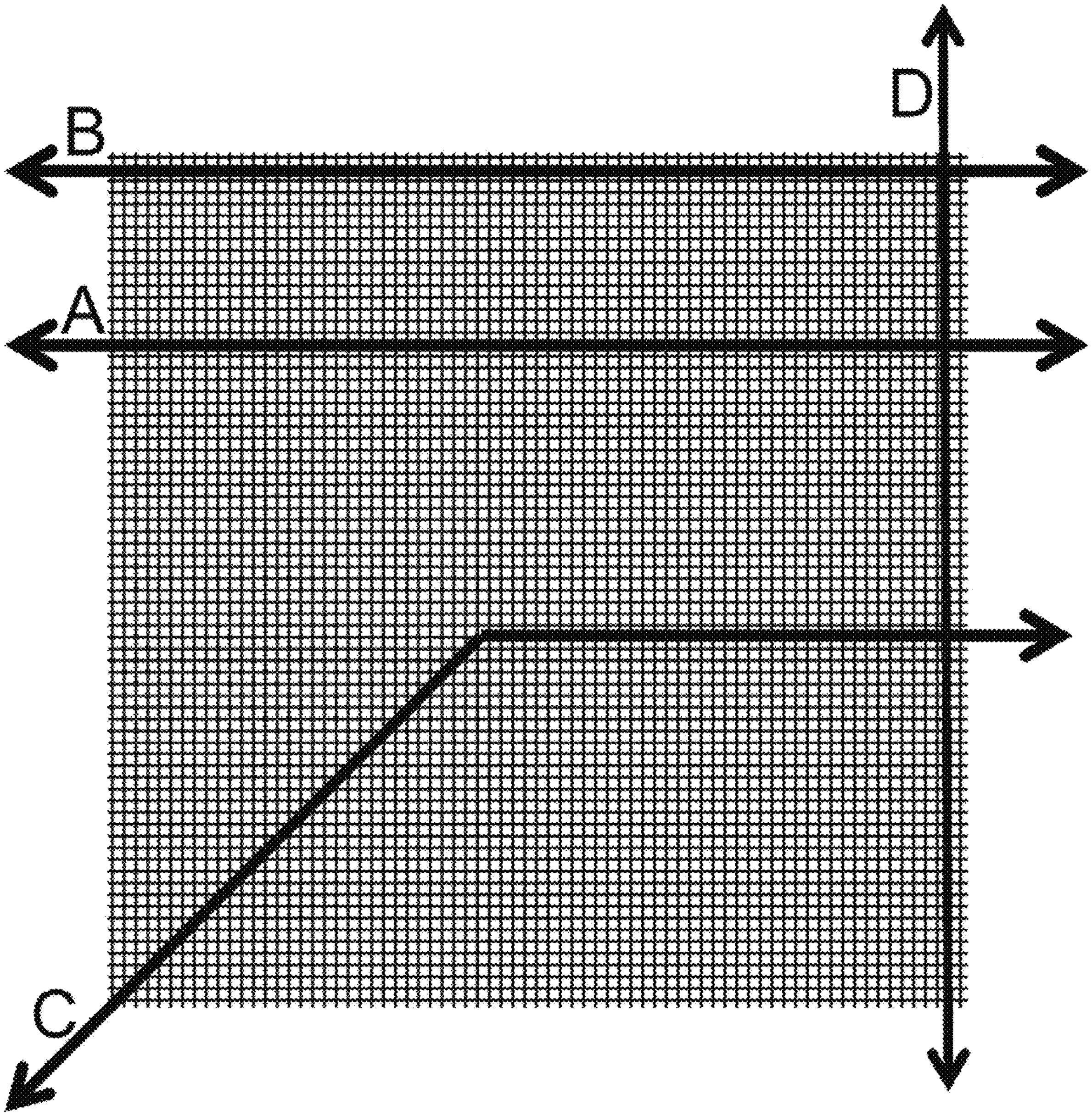
Figure 54A (Step 19)

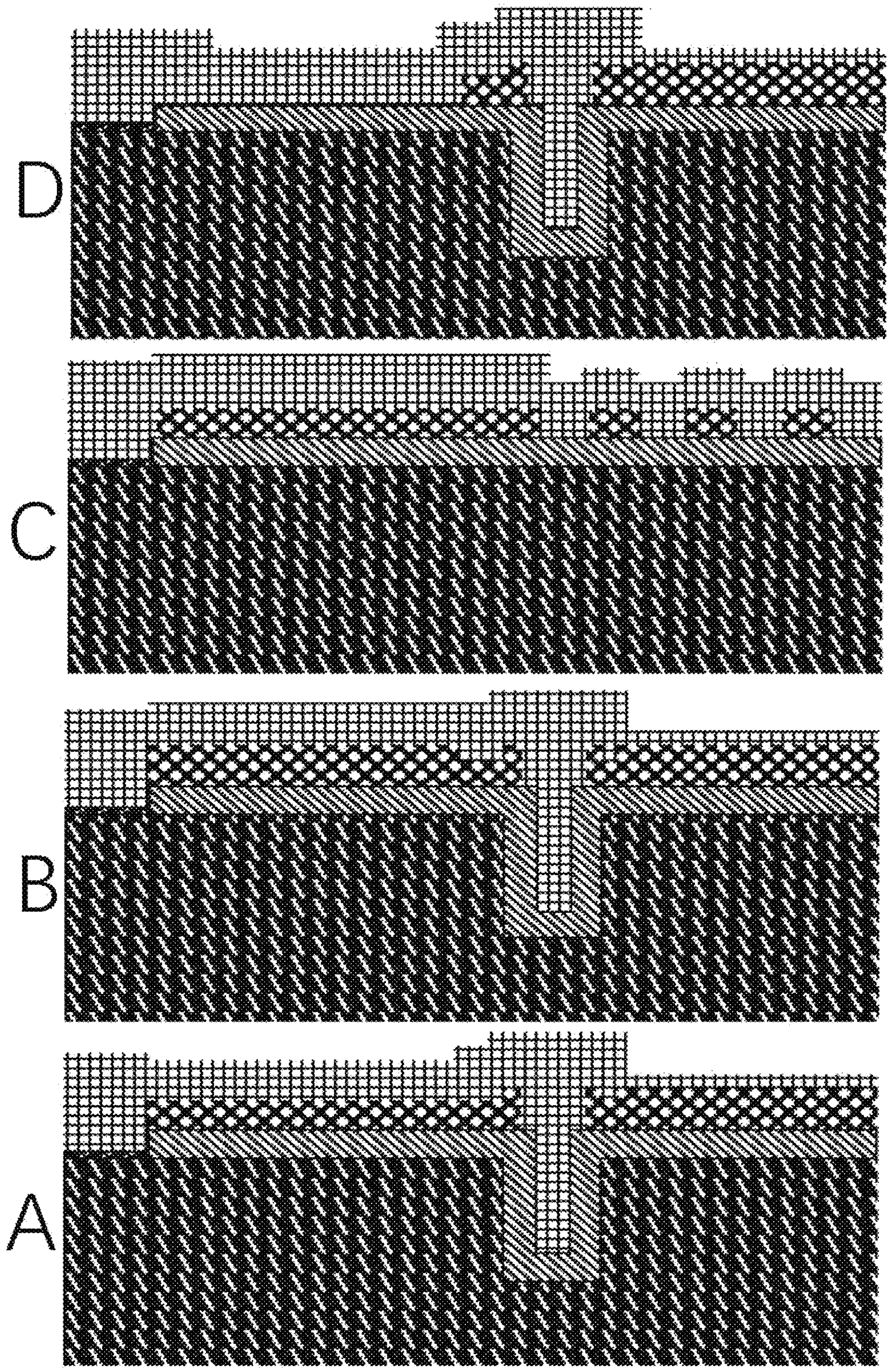
Figure 54B (Step 19)

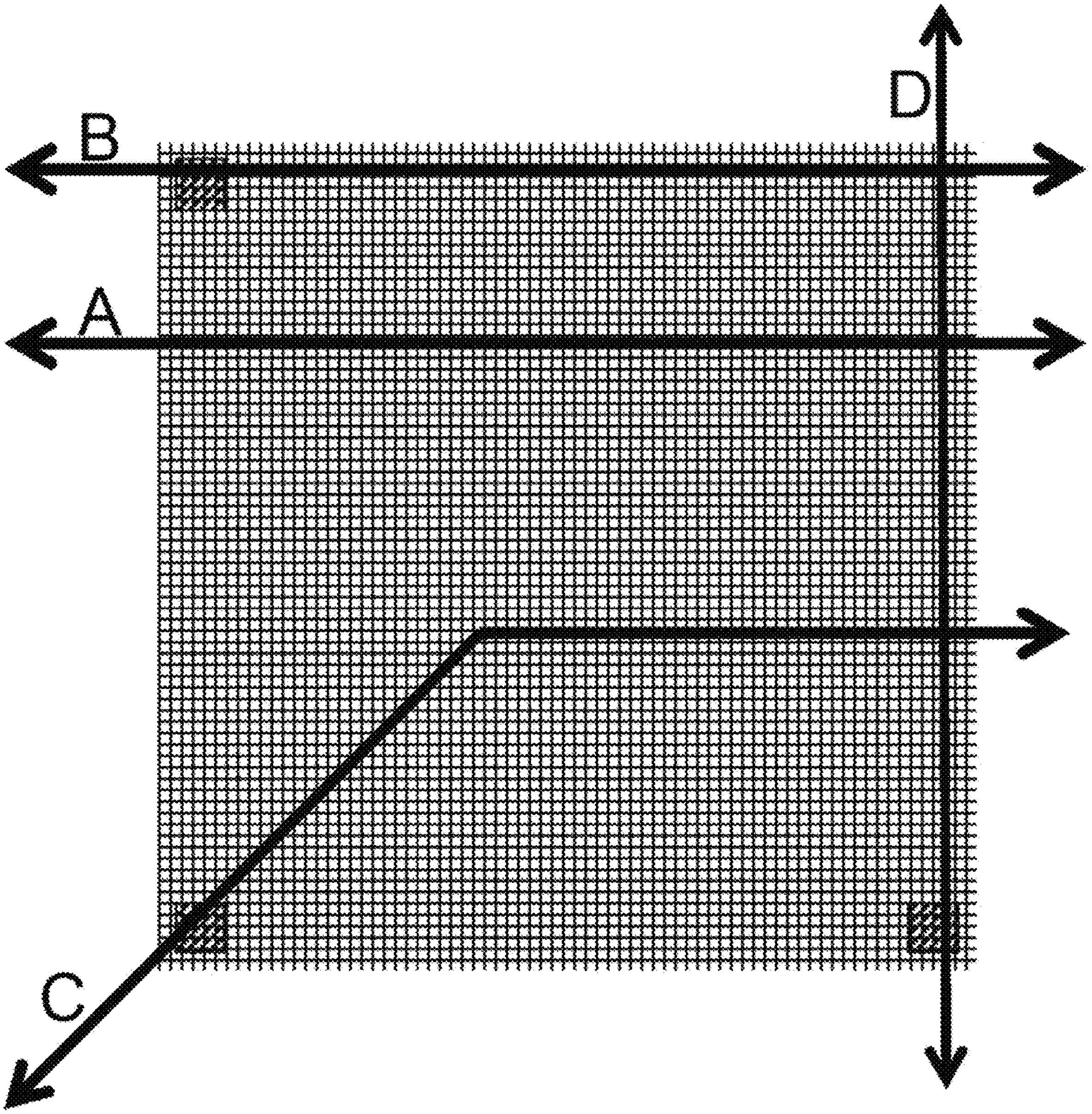
Figure 55A (Step 20)

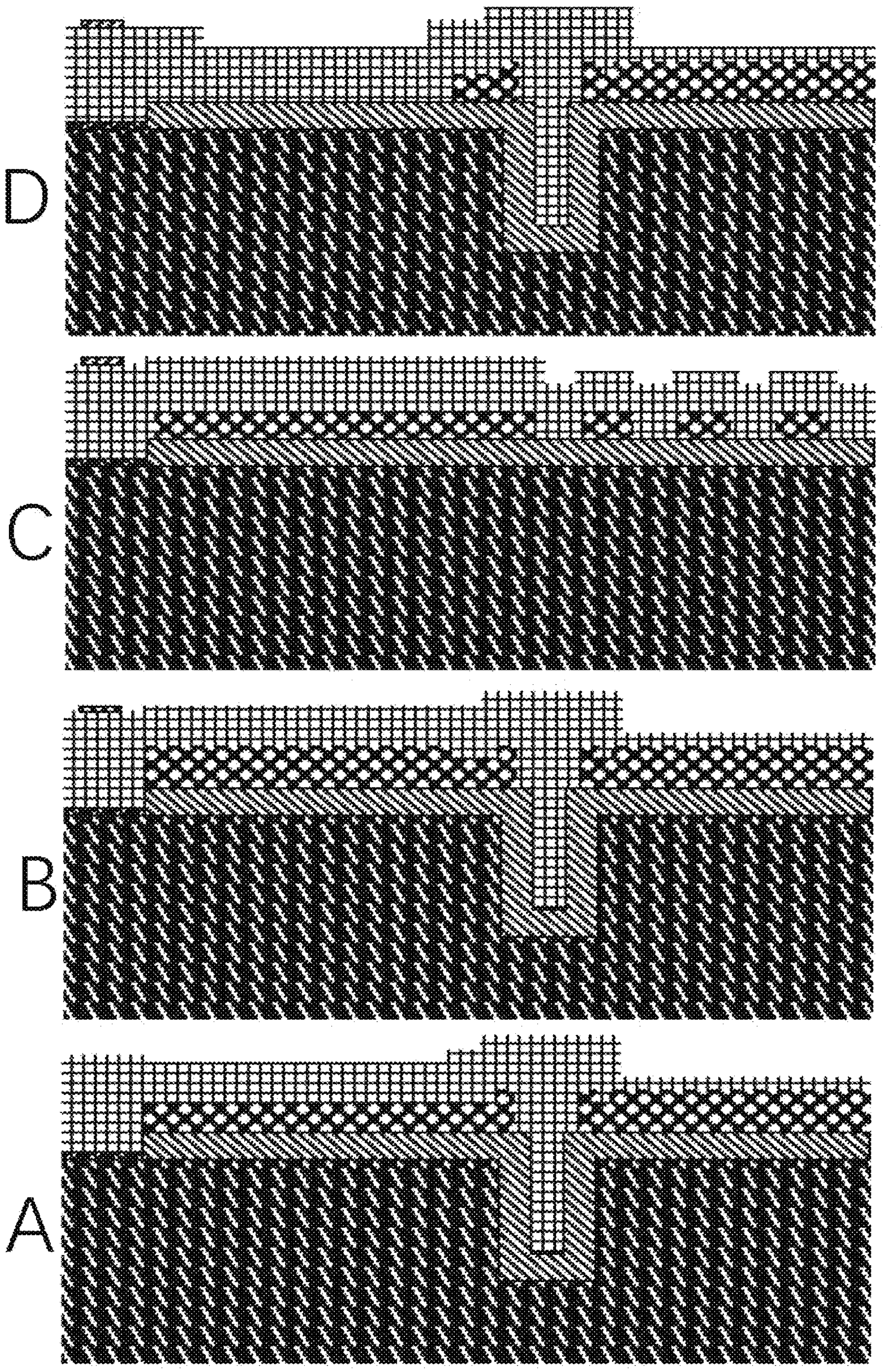
Figure 55B (Step 20)

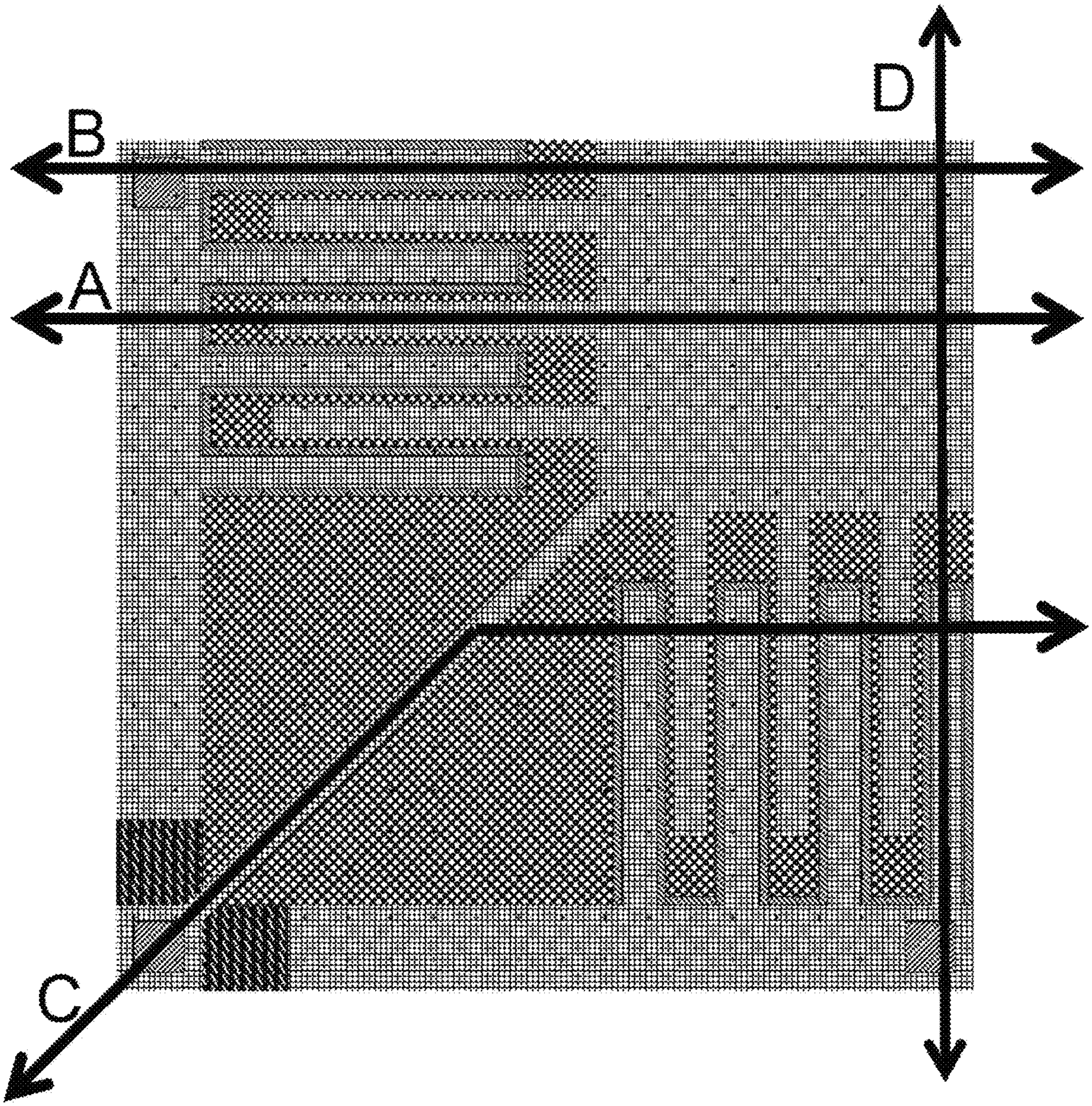
Figure 56A (Step 21)

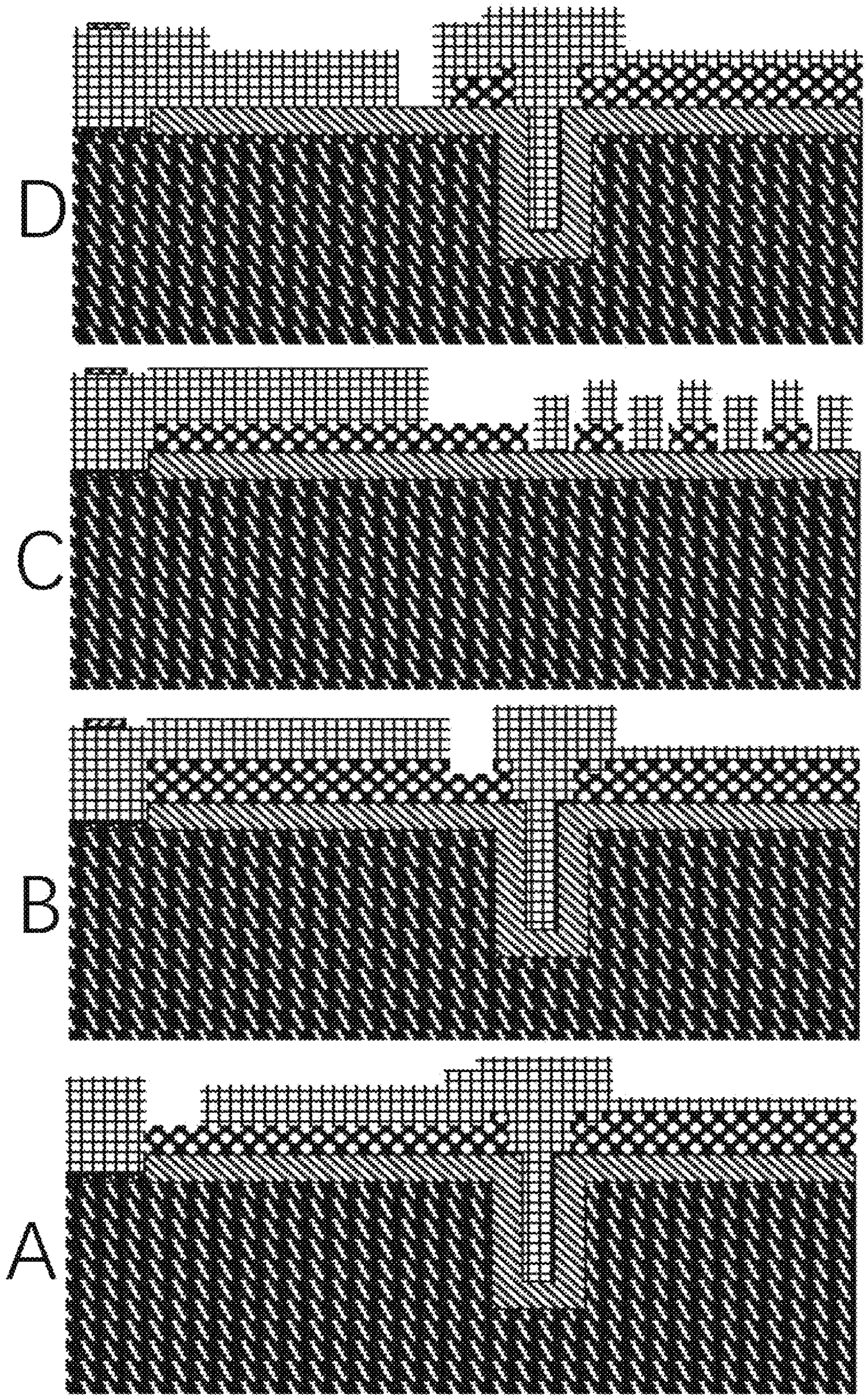
Figure 56B (Step 21)

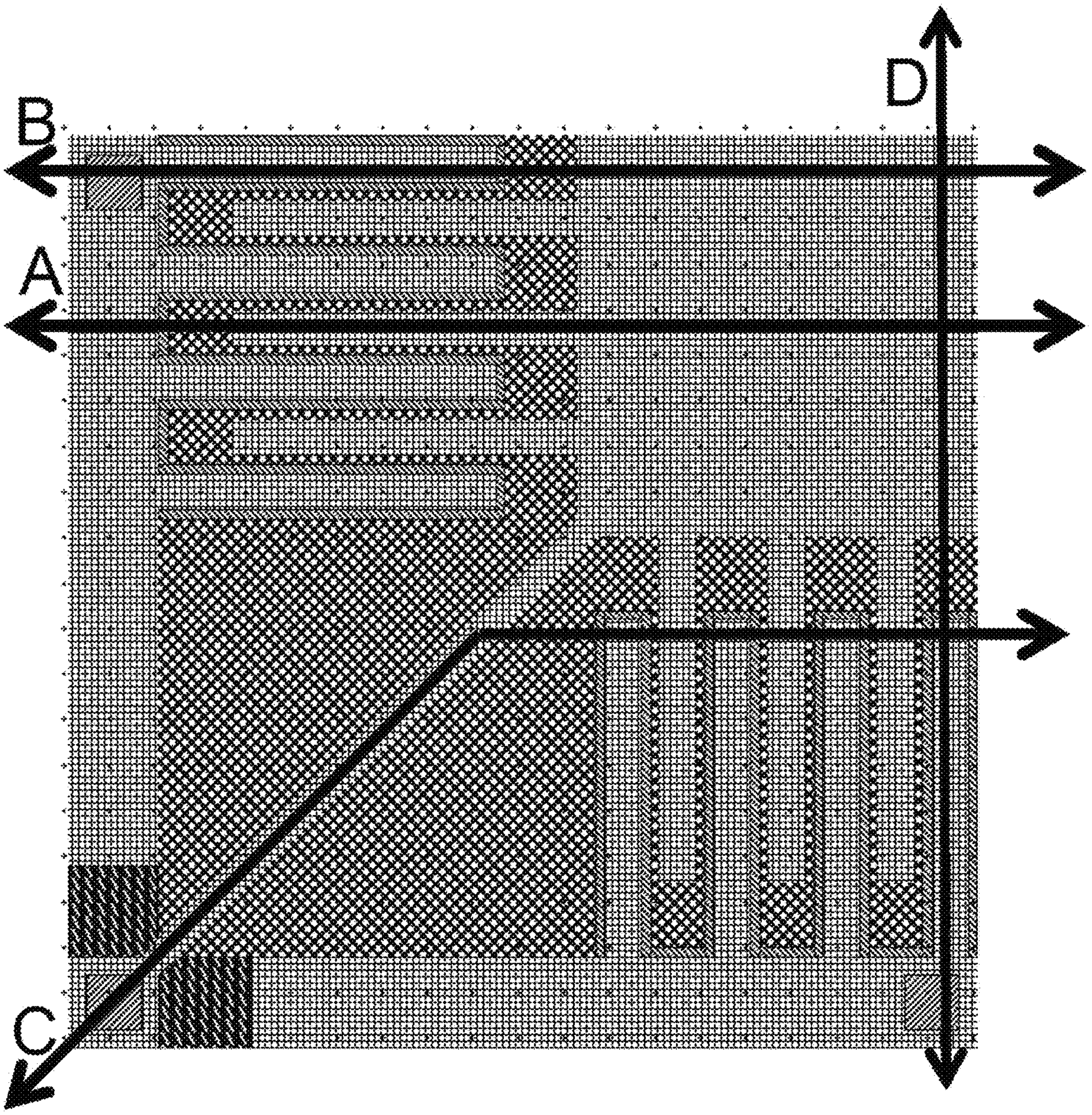
Figure 57A (Step 22)

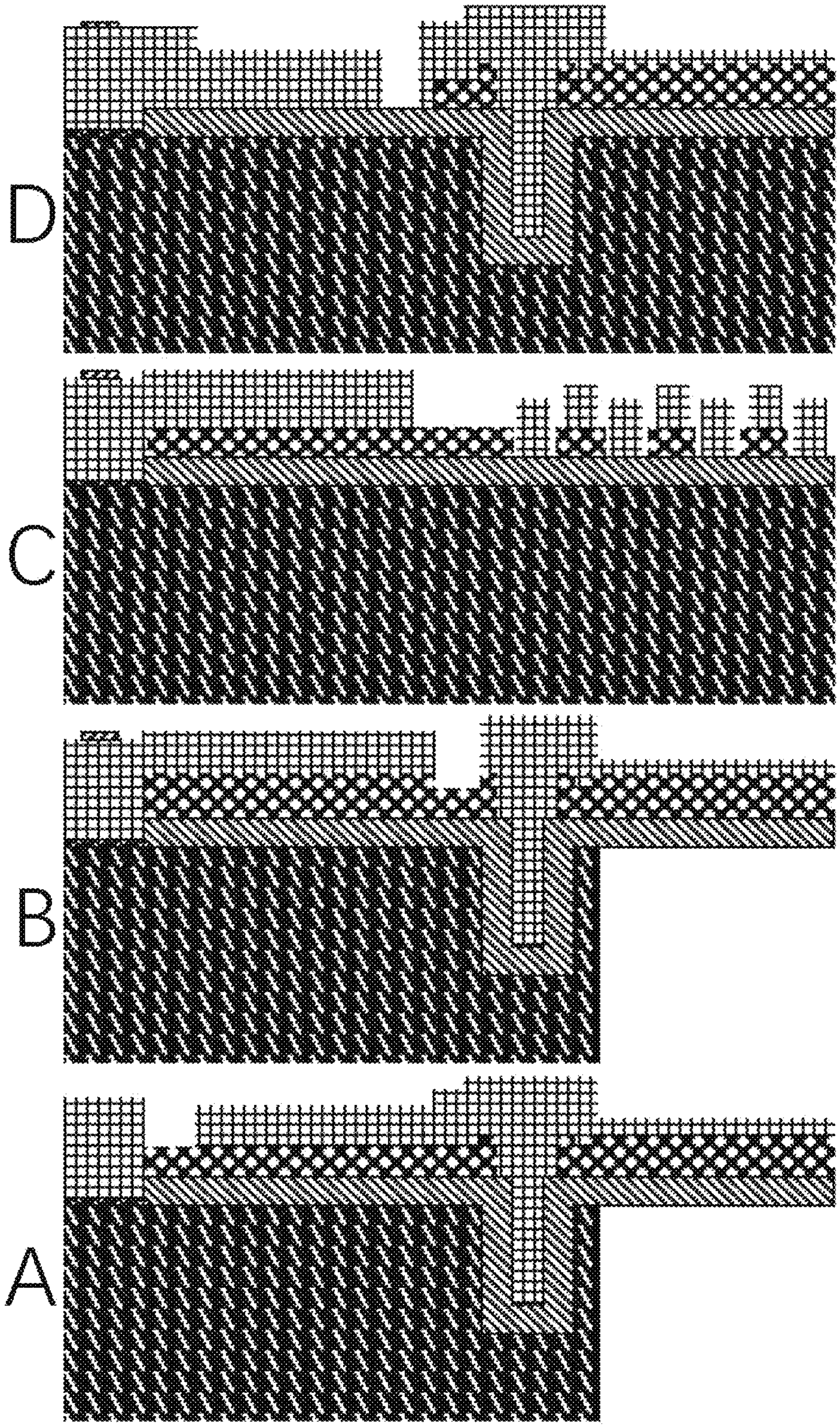
Figure 57B (Step 22)

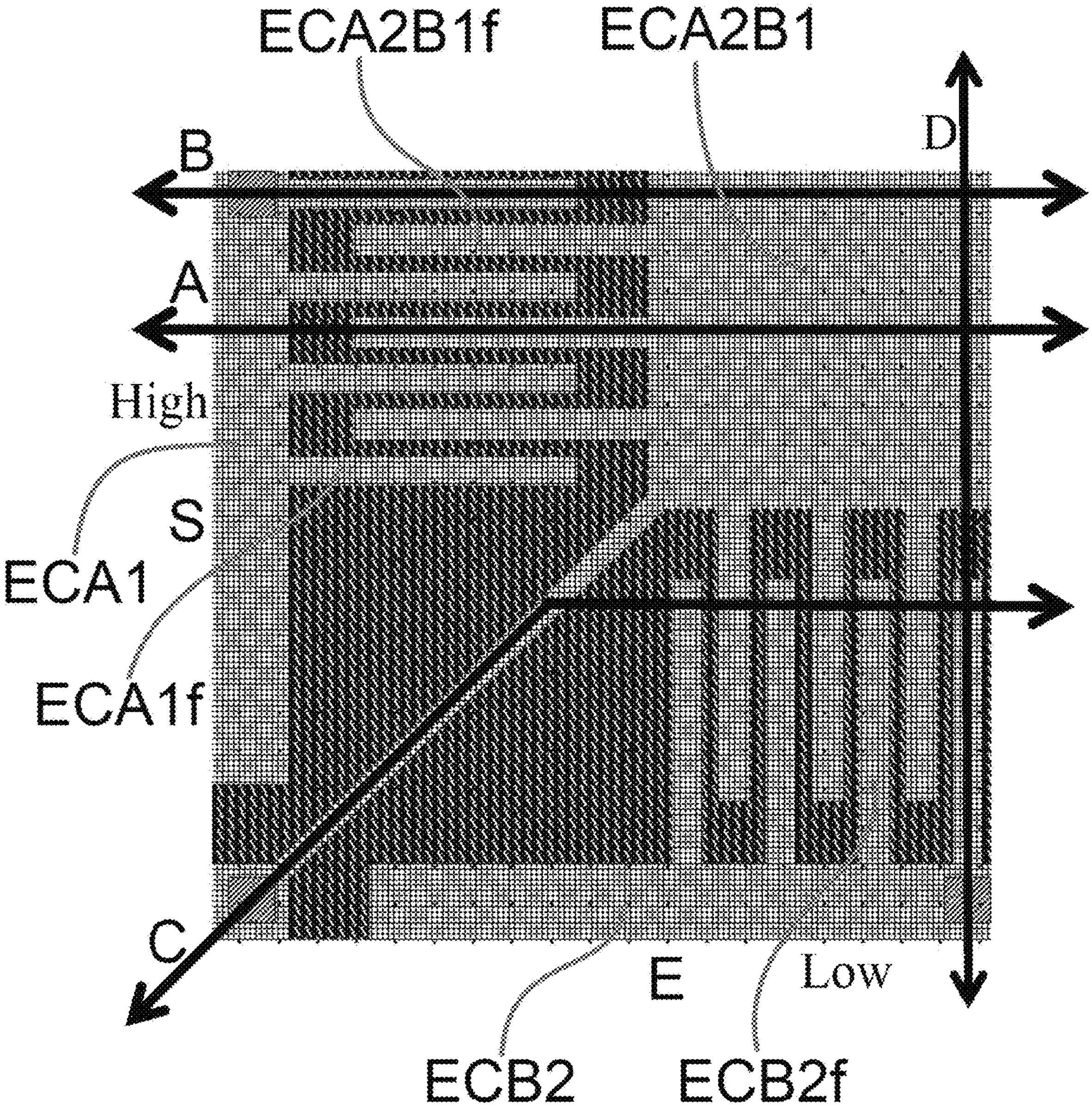
Figure 58A (Step 23)

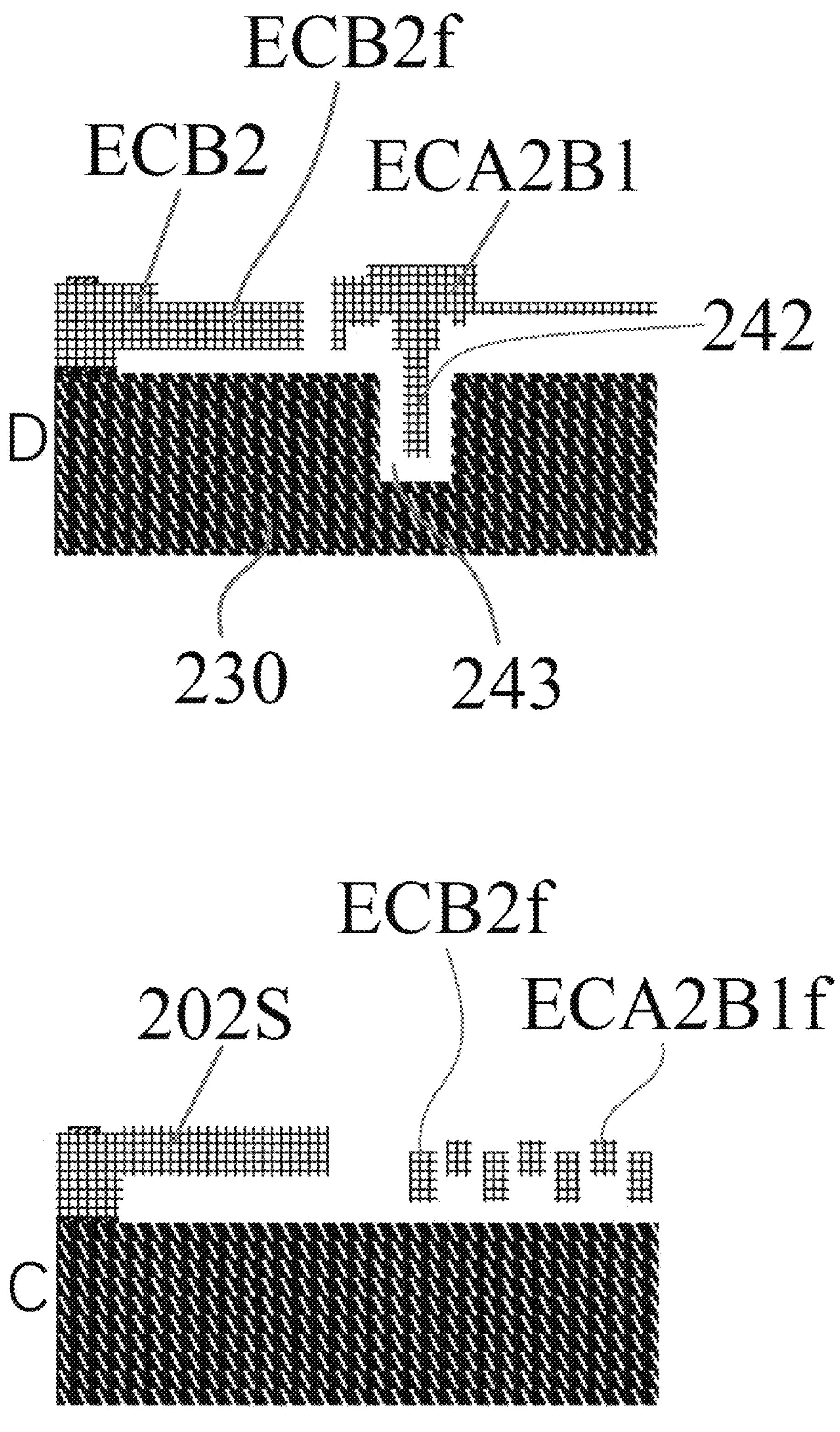
Figure 58B (Step 23)

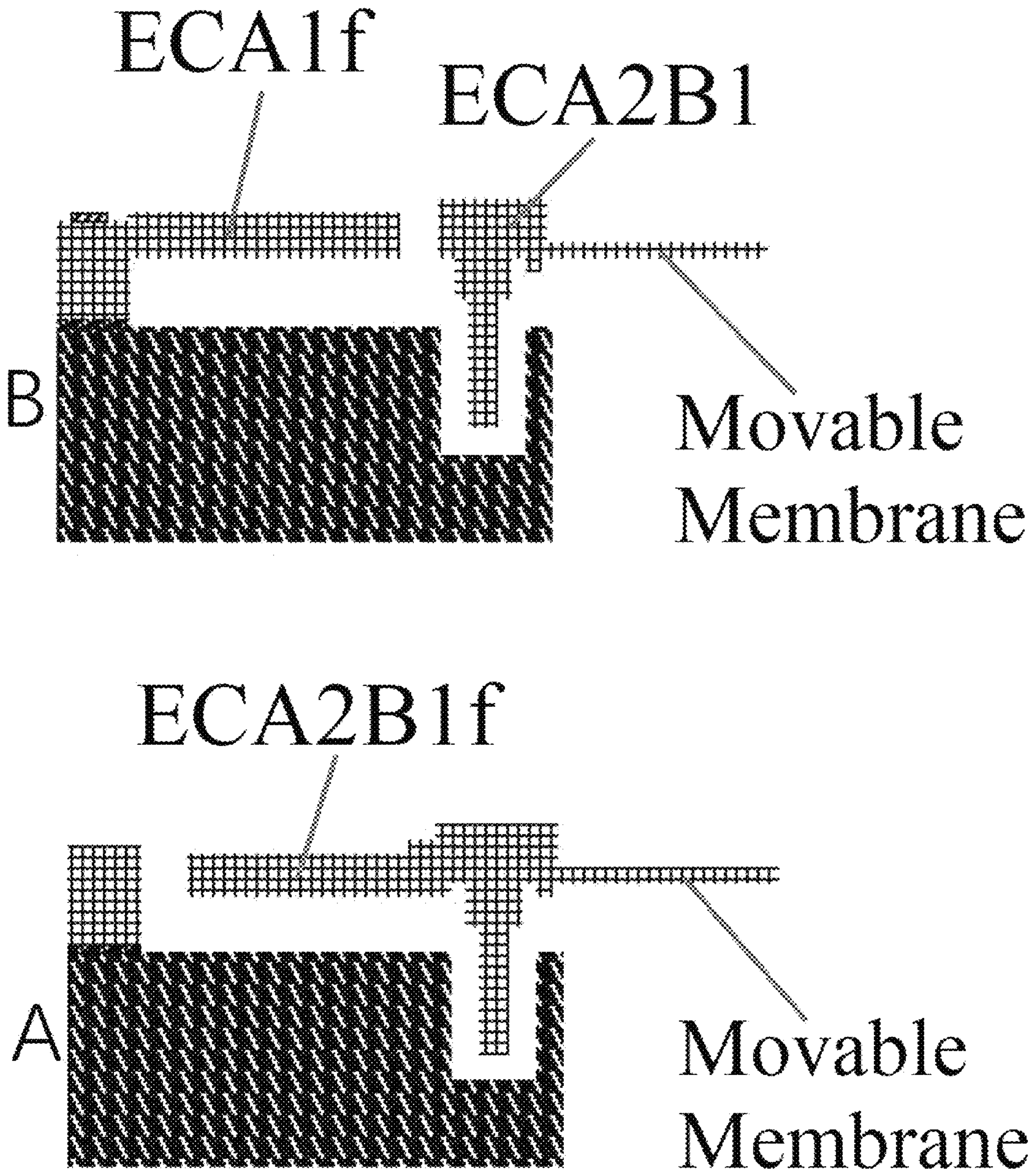
Figure 58C (Step 23)

PROCESS OF FABRICATING CAPACITIVE MICROPHONE COMPRISING MOVEABLE SINGLE CONDUCTOR AND STATIONARY COMPOSITE CONDUCTOR

CROSS-REFERENCE TO RELATED U.S. APPLICATIONS

This application is Continuation-in-Part of U.S. non-provisional application Ser. No. 17/120,169 filed on Dec. 13, 2020 and docketed as "Single Movable," which is a Continuation-in-Part of U.S. non-provisional application Ser. No. 17/008,638 filed on Sep. 1, 2020, which is a divisional application of U.S. Ser. No. 15/730,732 filed on Oct. 12, 2017 (now U.S. Pat. No. 10,798,508 issued on Oct. 6, 2020), which is a Continuation-in-Part of U.S. non-provisional application Ser. No. 15/623,339 filed on Jun. 14, 2017 (now U.S. Pat. No. 10,244,330 issued on Mar. 26, 2019), which is Continuation-in-Part of U.S. non-provisional application Ser. No. 15/393,831 filed on Dec. 29, 2016 (now U.S. Pat. No. 10,171,917 issued on Jan. 1, 2019), all of which are incorporated herein by reference in their entirety.

FIELD OF THE INVENTION

The present invention generally relates to a process of fabricating a lateral mode capacitive microphone with a total signal output generated from two signal outputs, one of which is an additive inverse of another. The microphone of the invention may find applications in smart phones, telephones, hearing aids, public address systems for concert halls and public events, motion picture production, live and recorded audio engineering, two-way radios, megaphones, radio and television broadcasting, and in computers for recording voice, speech recognition, VoIP, and for non-acoustic purposes such as ultrasonic sensors or knock sensors, among others.

BACKGROUND OF THE INVENTION

A microphone is a transducer that converts sound into an electrical signal. Among different designs of microphone, a capacitive microphone or a condenser microphone is conventionally constructed employing the so-called "parallel-plate" capacitive design. Unlike other microphone types that require the sound wave to do more work, only a small mass in capacitive microphones needs be moved by the incident sound wave. Capacitive microphones generally produce a high-quality audio signal, and they are now the popular choice in consumer electronics, laboratory and recording studio applications, ranging from telephone transmitters through inexpensive karaoke microphones to high-fidelity recording microphones.

FIG. 1A is a schematic diagram of parallel capacitive microphone in the prior art. Two thin layers 101 and 102 are placed closely in almost parallel One of them is fixed backplate 101, and the other one is movable/deflectable membrane/diaphragm 102, which can be moved or driven by sound pressure. Diaphragm 102 acts as one plate of a capacitor, and the vibrations thereof produce changes in the distance between two layers 101 and 102, and changes in the mutual capacitance therebetween.

"Squeeze film" and "squeezed film" refer to a type of hydraulic or pneumatic damper for damping vibratory motion of a moving component with respect to a fixed component. Squeezed film damping occurs when the moving component is moving perpendicular and in close proximity to the surface of the fixed component (e.g., between approximately 2 and 50 micrometers). The squeezed film effect results from compressing and expanding the fluid (e.g., a gas or liquid) trapped in the space between the moving plate and the solid surface. The fluid has a high resistance, and it damps the motion of the moving component as the fluid flows through the space between the moving plate and the solid surface.

In capacitive microphones as shown in FIG. 1A, squeeze film damping occurs when two layers 101 and 102 are in close proximity to each other with air disposed between them. The layers 101 and 102 are positioned so close together (e.g. within 5 μm) that air can be "squeezed" and "stretched" to slow movement of membrane/diaphragm 101. As the gap between layers 101 and 102 shrinks, air must flow out of that region. The flow viscosity of air, therefore, gives rise to a force that resists the motion of moving membrane/diaphragm 101. Squeeze film damping is significant when membrane/diaphragm 101 has a large surface area to gap length ratio. Such squeeze film damping between the two layers 101 and 102 becomes a mechanical noise source, which is the dominating factor among all noise sources in the entire microphone structure.

U.S. Pat. No. 10,171,917 to the same assignee teaches a novel microphone with a lateral mode design, in which the movable membrane/diaphragm does not move into the fixed backplate and the squeeze film damping is substantially avoided. Advantageously, the present invention provides an improved microphone design, in which the noise is further reduced.

SUMMARY OF THE INVENTION

The present invention provides a process of fabricating a capacitive microphone that includes a first capacitor and a second capacitor. Step (A) in the process comprises fabricating the first capacitor and the second capacitor and configuring the two capacitors so that a signal output S1 of the first capacitor is substantially (±5%) the additive inverse of a signal output S2 of the second capacitor, and a total signal output St is a difference between S1 and S2. Fabricating the first capacitor may include fabricating a first electrical conductor ECA1, fabricating a second electrical conductor ECA2, and configuring conductors ECA1 and ECA2 in a lateral mode. By "later mode," it is intended to mean that conductors ECA1 and ECA2 have a mutual capacitance therebetween. The mutual capacitance can be varied by an acoustic pressure impacting upon ECA1 and/or ECA2 along a range of impacting directions in 3D space, generating the signal output S1 of the first capacitor. The mutual capacitance is varied the most by an acoustic pressure impacting upon ECA1 and/or ECA2 along one direction among the range of impacting directions, and the one direction is defined as the primary direction. ECA1 has a first projection along the primary direction on a conceptual plane that is perpendicular to the primary direction; and ECA2 has a second projection along the primary direction on the conceptual plane. The first projection and the second projection have a shortest distance Dmin therebetween, and Dmin remains greater than zero regardless of that ECA1 and/or ECA2 is (are) impacted by an acoustic pressure along the primary direction or not.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form in order to avoid unnecessarily obscuring the present invention. Other parts may be omitted or merely suggested.

FIG. 10 schematically shows a moveable single conductor with "Uneven Height" electrically shared by the first lateral mode capacitor and the second lateral mode capacitor in accordance with an exemplary embodiment of the present invention.

FIG. 19 schematically shows a moveable composite conductor with "Uneven Height" formed from the first lateral mode capacitor and the second lateral mode capacitor (which remain electrically separated) in accordance with an exemplary embodiment of the present invention.

FIG. 36A is a top view showing step 1 of providing a homogeneous substrate.

FIG. 36B shows several cross-sectional views of step 1.

FIG. 37A is a top view showing step 2 of depositing an isolation layer.

FIG. 37B shows several cross-sectional views of step 2.

FIG. 38A is a top view showing step 3 of etching/patterning the isolation layer.

FIG. 38B shows several cross-sectional views of step 3.

FIG. 39A is a top view showing step 4 of opening a trench.

FIG. 39B shows several cross-sectional views of step 4.

FIG. 40A is a top view showing step 5 of growing a layer of thermal oxide.

FIG. 40B shows several cross-sectional views of step 5.

FIG. 41A is a top view showing step 6 of depositing a layer of polysilicon (P0).

FIG. 41B shows several cross-sectional views of step 6.

FIG. 42A is a top view showing step 7 of etching/patterning the layer of (P0).

FIG. 42B shows several cross-sectional views of step 7.

FIG. 43A is a top view showing step 8 of depositing a layer of phosphosilicate glass (PSG1 or G1).

FIG. 43B shows several cross-sectional views of step 8.

FIG. 44A is a top view showing step 9 of etching/patterning the layer of phosphosilicate glass (PSG1 or G1).

FIG. 44B shows several cross-sectional views of step 9.

FIG. 45A is a top view showing step 10 of depositing a layer of Poly Silicon (P1).

FIG. 45B shows several cross-sectional views of step 10.

FIG. 46A is a top view showing step 11 of etching/patterning the layer of Poly Silicon (P1).

FIG. 46B shows several cross-sectional views of step 11.

FIG. 47A is a top view showing step 12 of depositing a layer of phosphosilicate glass (PSG2).

FIG. 47B shows several cross-sectional views of step 12.

FIG. 48A is a top view showing step 13 of etching/patterning the layer of phosphosilicate glass (PSG2).

FIG. 48B shows several cross-sectional views of step 13.

FIG. 49A is a top view showing step 14 of depositing a layer of Poly Silicon (P2).

FIG. 49B shows several cross-sectional views of step 14.

FIG. 50A is a top view showing step 15 of depositing a thin layer of phosphosilicate glass (PSGthin).

FIG. 50B shows several cross-sectional views of step 15.

FIG. 51A is a top view showing step 16 of etching/patterning the layer of Poly Silicon (P2). FIG. 51B shows several cross-sectional views of step 16.

FIG. 52A is a top view showing step 17 of depositing a layer of Poly Silicon (P3).

FIG. 52B shows several cross-sectional views of step 17.

FIG. 53A is a top view showing step 18 of etching/patterning the layer of Poly Silicon (P3).

FIG. 53B shows several cross-sectional views of step 18.

FIG. 54A is a top vim showing step 19 of wet etching away the PSGthin layer.

FIG. 54B shows several cross-sectional views of step 19.

FIG. 55A is a top view showing step 20 of depositing a layer of metal.

FIG. 55B shows several cross-sectional views of step 20.

FIG. 56A is a top view showing step 21 of etching/patterning a front-side structure.

FIG. 56B shows several cross-sectional views of step 21.

FIG. 57A is a top view showing step 22 of opening a backside cavity/hole.

FIG. 57B shows several cross-sectional views of step 22.

FIG. 58A is a top view showing step 23 of HF releasing of the final microphone product.

FIG. 58B shows two cross-sectional views of step 23.

FIG. 58C shows two cross-sectional views of step 23.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

In addition, as used herein, the term "or" is an inclusive "or" operator and is equivalent to the term "and/or," unless the context clearly dictates otherwise. The term "based on"

is not exclusive and allows for being based on additional factors not described, unless the context clearly dictates otherwise. In addition, throughout the specification, the meaning of “a,” “an,” and “the” include plural references. The meaning of “in” includes “in” and “on.”

Figure 1A:
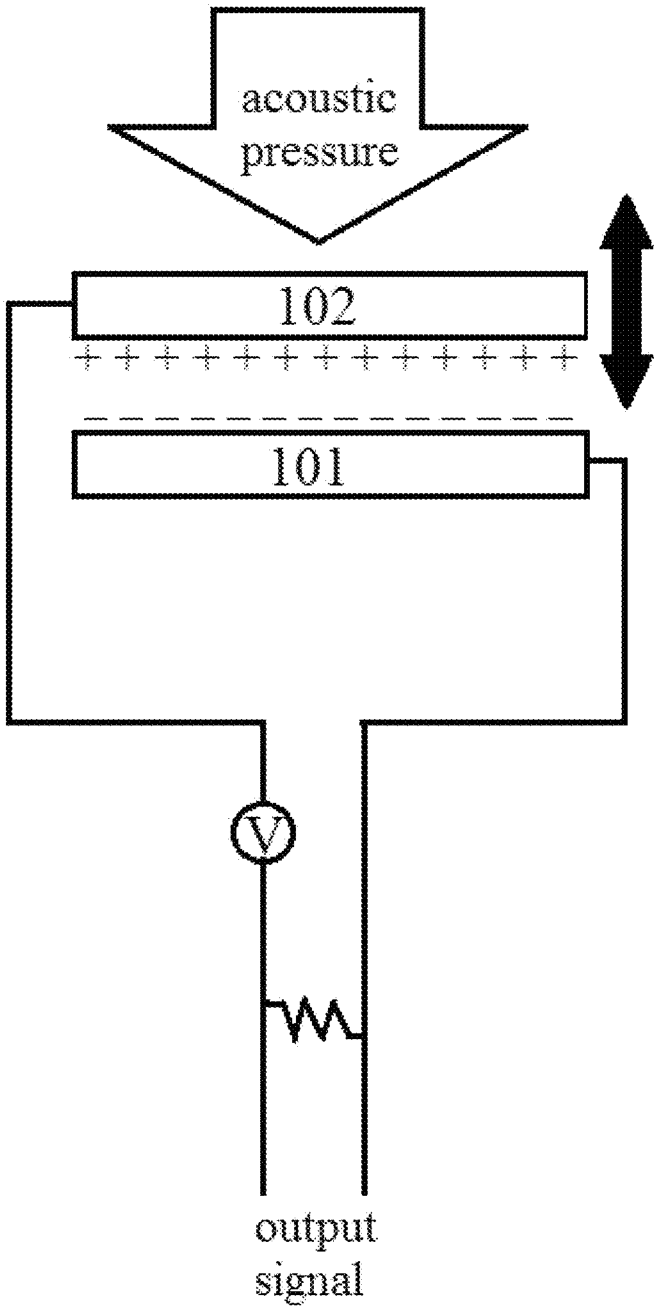
(Prior Art) Figure 1A
FIG. 1A shows a conventional capacitive microphone in the prior art.
Figure 1B:
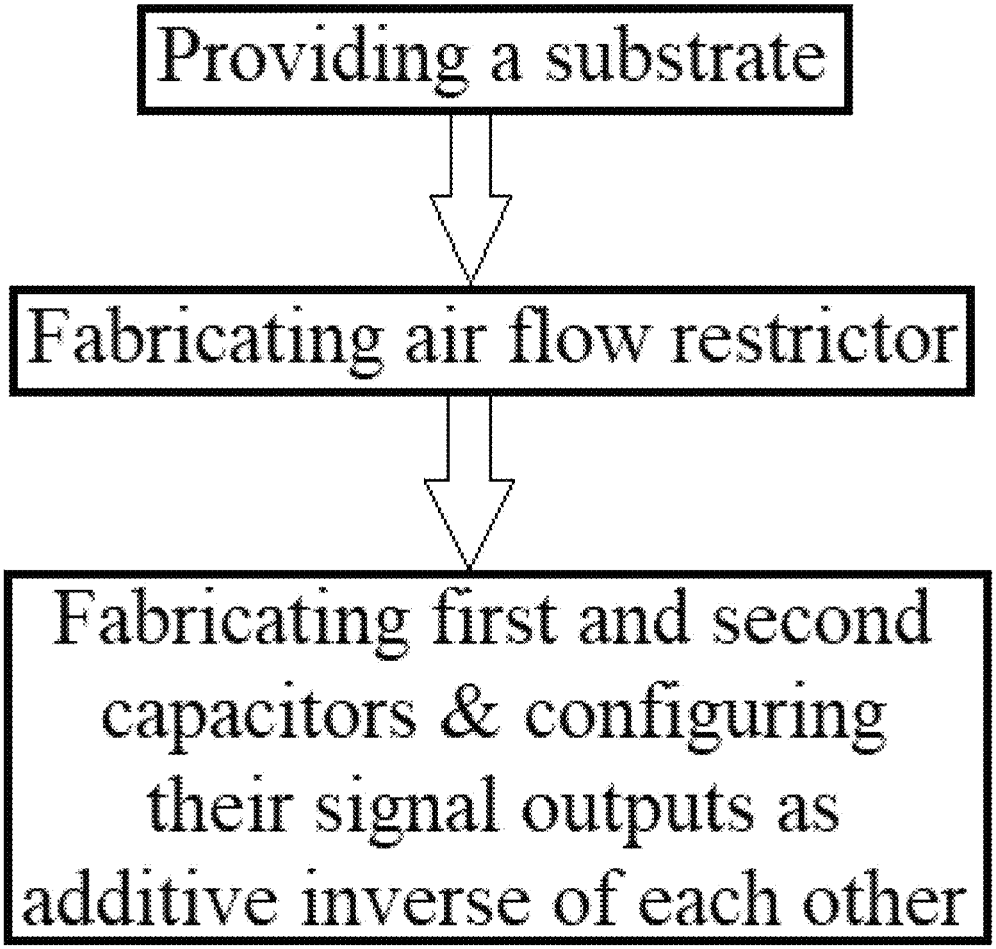
FIG. 1B shows a general process for fabricating a lateral-mode capacitive microphone in accordance with an exemplary embodiment of the present invention.

FIG. 1B shows a general process for fabricating a lateral-mode capacitive microphone in accordance with exemplary embodiments of the present invention. The process comprises the steps of (Pre-A1) providing a substrate, (Pre-A2) optionally fabricating an air flow restrictor, and (A) fabricating a first capacitor and a second capacitor and configuring the two capacitors so that a signal output S1 of the first capacitor is substantially (±5%) the additive inverse of a signal output S2 of the second capacitor, and a total signal output St is a difference between S1 and S2. Fabricating the first capacitor during Step (A) may include fabricating a first electrical conductor ECA1, fabricating a second electrical conductor ECA2, and configuring conductors ECA1 and ECA2 side-by-side over the substrate in a lateral mode. Fabricating an air flow restrictor may include etching a planar surface of the substrate to form a trench and forming an insert that is protruded from one of the two electrical conductors and downward into the trench.

The process of FIG. 1B can be accomplished using surface micromachining techniques, bulk micromachining techniques, high aspect ratio (HAR) silicon micromachining, and semiconductor processing techniques etc.

Surface micromachining creates structures on top of a substrate using a succession of thin film deposition and selective etching. Generally, polysilicon is used as one of the layers and silicon dioxide is used as a sacrificial layer which is removed or etched out to create the necessary void in the thickness direction. Added layers are generally very thin with their size varying from 2-5 micrometers. A main advantage is realizing monolithic microsystems in which the electronic and the mechanical components (functions) are built in on the same substrate. As the structures are built on top of the substrate and not inside it, the substrate’s properties are not as important as in bulk micromachining, and the expensive silicon wafers can be replaced by cheaper substrates, such as glass, plastic, PET substrate, or other non-rigid materials. The size of the substrates can also be much larger than a silicon wafer.

Complicated components, such as movable parts, are built using a sacrificial layer. For example, a suspended cantilever can be built by depositing and structuring a sacrificial layer, which is then selectively removed at the locations where the future beams must be attached to the substrate (i.e. the anchor points). The structural layer is then deposited on top of the polymer and structured to define the beams. Finally, the sacrificial layer is removed to release the beams, using a selective etch process that will not damage the structural layer. There are many possible combinations of structural/sacrificial layer. The combination chosen depends on the process. For example it is important for the structural layer not to be damaged by the process used to remove the sacrificial layer.

Bulk micromachining produces structures inside a substrate by selectively etching inside the substrate. Bulk micromachining starts with a silicon wafer or other substrates which is selectively etched, using photolithography to transfer a pattern from a mask to the surface. Bulk micromachining can be performed with wet or dry etches, although the most common etch in silicon is the anisotropic wet etch. This etch takes advantage of the fact that silicon has a crystal structure, which means its atoms are all arranged periodically in lines and planes. Certain planes have weaker bonds and are more susceptible to etching. The etch results in pits that have angled walls, with the angle being a function of the crystal orientation of the substrate.

Silicon wafer can be anisotropically wet etched, forming highly regular structures. Wet etching typically uses alkaline liquid solvents, such as potassium hydroxide (KOH) or tetramethylammonium hydroxide (TMAH) to dissolve silicon which has been left exposed by the photolithography masking step. These alkali solvents dissolve the silicon in a highly anisotropic way, with some crystallographic orientations dissolving up to 1000 times faster than others. Such an approach is often used with very specific crystallographic orientations in the raw silicon to produce V-shaped grooves. The surface of these grooves can be atomically smooth if the etch is carried out correctly, and the dimensions and angles can be precisely defined.

In various embodiments of the invention, the microphone is made using a MEMS manufacturing process. Materials for the process include silicon, polymers, metals, and ceramics etc. Deposition processes can be carried out using physical deposition and chemical deposition. Patterning can be carried out using lithography, electron beam lithography, ion beam lithography, ion track technology, X-ray lithography, and diamond patterning. Wet etching can be carried out using isotropic etching, anisotropic etching, HF etching, and electrochemical etching. Dry etching can be carried out using vapor etching (e.g. xenon difluoride) and plasma etching (e.g. sputtering and reactive ion etching (RIE)).

Figure 1C:
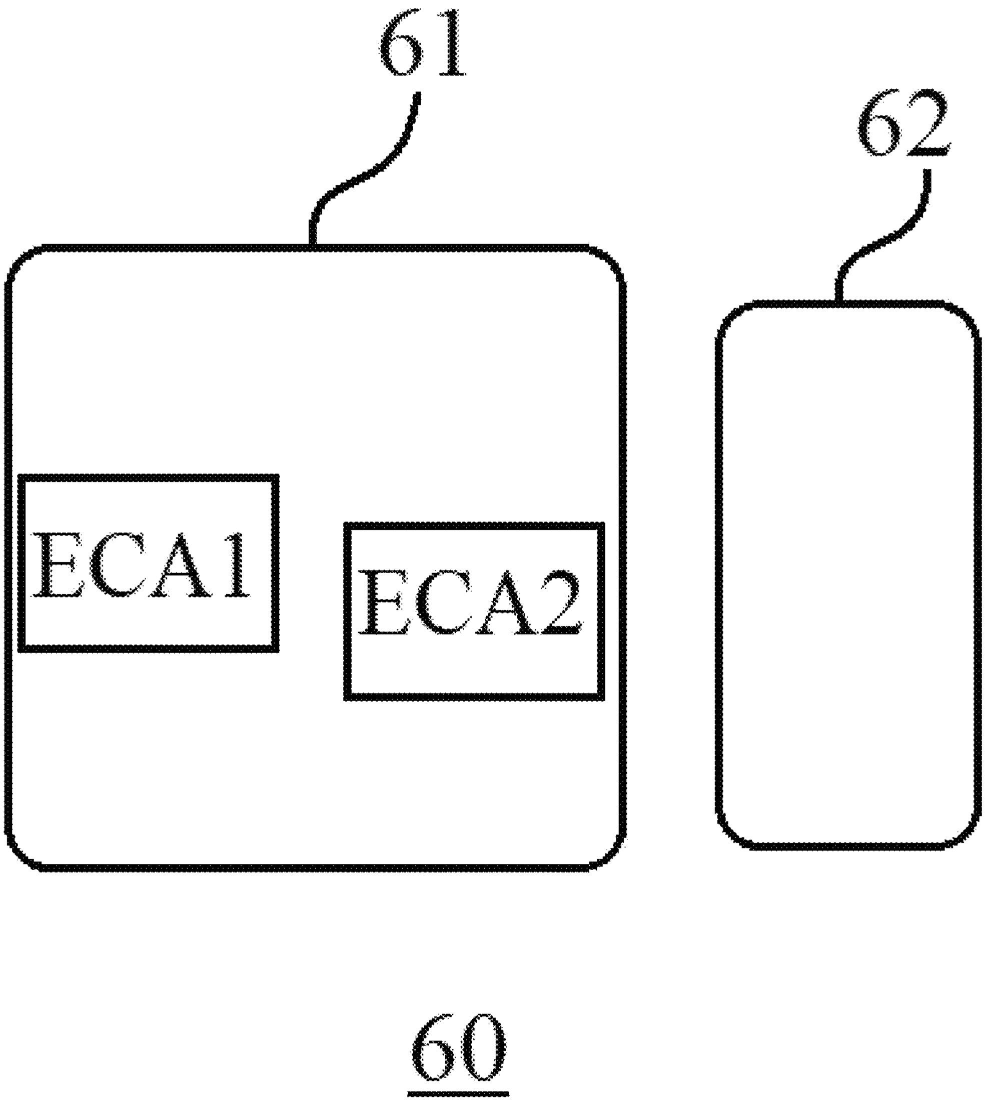
FIG. 1C schematically shows a capacitive microphone in accordance with an exemplary embodiment of the present invention that includes at least one pair of capacitor plates arranged in a lateral mode configuration.

With reference to FIG. 1C, a capacitive microphone 60 fabricated from the process as shown in FIG. 1B may include a first capacitor 61 and a second capacitor 62. In mathematics, the additive inverse of a number a is the number that, when added to a, yields zero. This number is also known as the opposite (number), sign change, and negation. For example, the additive inverse of 7 is −7, because 7+(−7)=0. The additive inverse of −0.3 is 0.3, because (−0.3)+0.3=0. A signal output S1 of the first capacitor 61 is substantially the additive inverse of a signal output S2 of the second capacitor 62, with a deviation of less than ±20%, ±15%, ±10%, ±5%, ±3%, or ±1%. For example, when the deviation is less than ±10%, S1 will be equal to −(S2±10% S2), which is within a range of from −0.9×S2 to −1.1×S2. The total signal output St of the microphone 60 is a difference between S1 and S2. For example, St=7−(−7)=14 (unit), or St=(−7)−7=−14 (unit). In some embodiments, however, an acoustic and/or electronic noise N1 of the signal output S1 may not be the additive inverse of the counterpart noise N2 of the signal output S2. For example, N1 may be substantially the same as N2 with a deviation of less than ±20%, ±15%, ±10%, ±5%, ±3%, or ±1%, including N1=N2. Therefore, electronic noise N1 of the signal output S1 partially or completely cancels off noise N2 of the signal output S2, when the total signal output St is generated. For example, if N1=N2=+0.5, then St=S1−S2=(7+0.5)−(−7+0.5)=14 (unit), or St=S1−S2−(−7+0.5)−(7+0.5)=−14 (unit).

As shown in FIG. 1C, the first capacitor 61 may be so fabricated or patterned that it comprises a first electrical conductor ECA1 and a second electrical conductor ECA2 that are configured in a lateral mode. By “later mode,” it is intended to mean that conductors ECA1 and ECA2 have a mutual capacitance therebetween. The mutual capacitance can be varied by an acoustic pressure impacting upon ECA1 and/or ECA2 along a range of impacting directions in 3D space, generating the signal output S1 of the first capacitor. The mutual capacitance is varied the most by an acoustic pressure impacting upon ECA1 and/or ECA2 along one direction among the range of impacting directions, and the one direction is defined as the primary direction. ECA1 has a first projection along the primary direction on a conceptual plane that is perpendicular to the primary direction, and ECA2 has a second projection along the primary direction on the conceptual plane. The first projection and the second projection have a shortest distance Dmin therebetween, and Dmin remains greater than zero regardless of that ECA1 and/or ECA2 is (are) impacted by an acoustic pressure along the primary direction or not.

Figure 3:
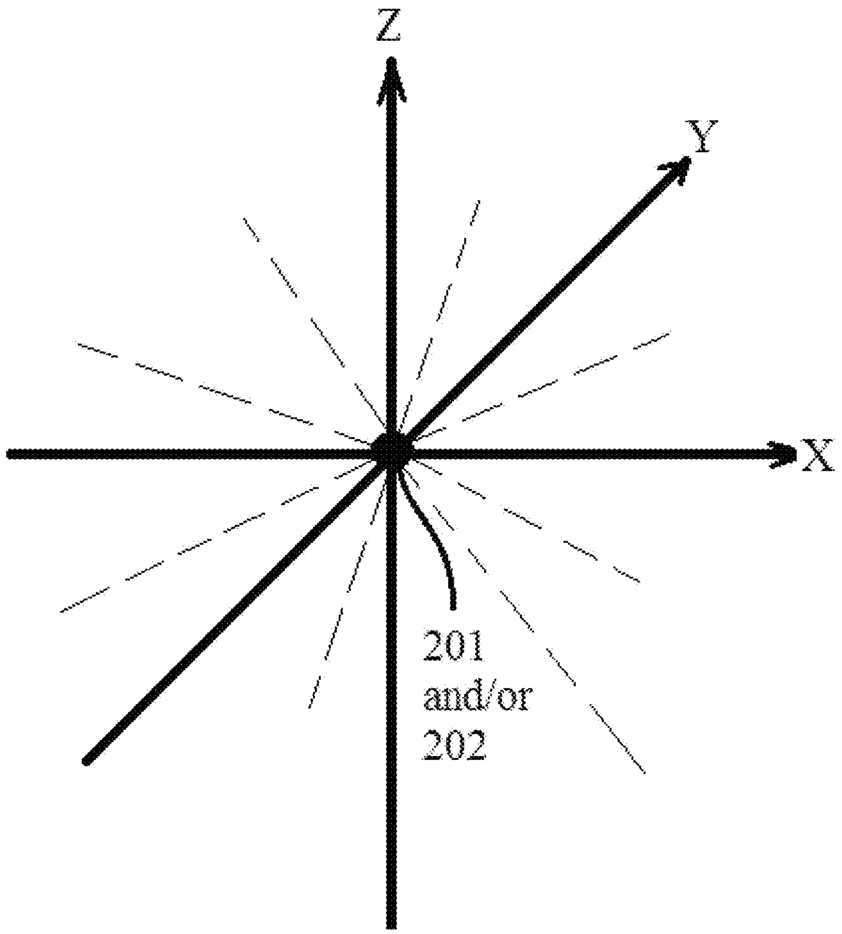
FIG. 3 illustrates acoustic pressures impacting a microphone along a range of directions.
Figure 4:
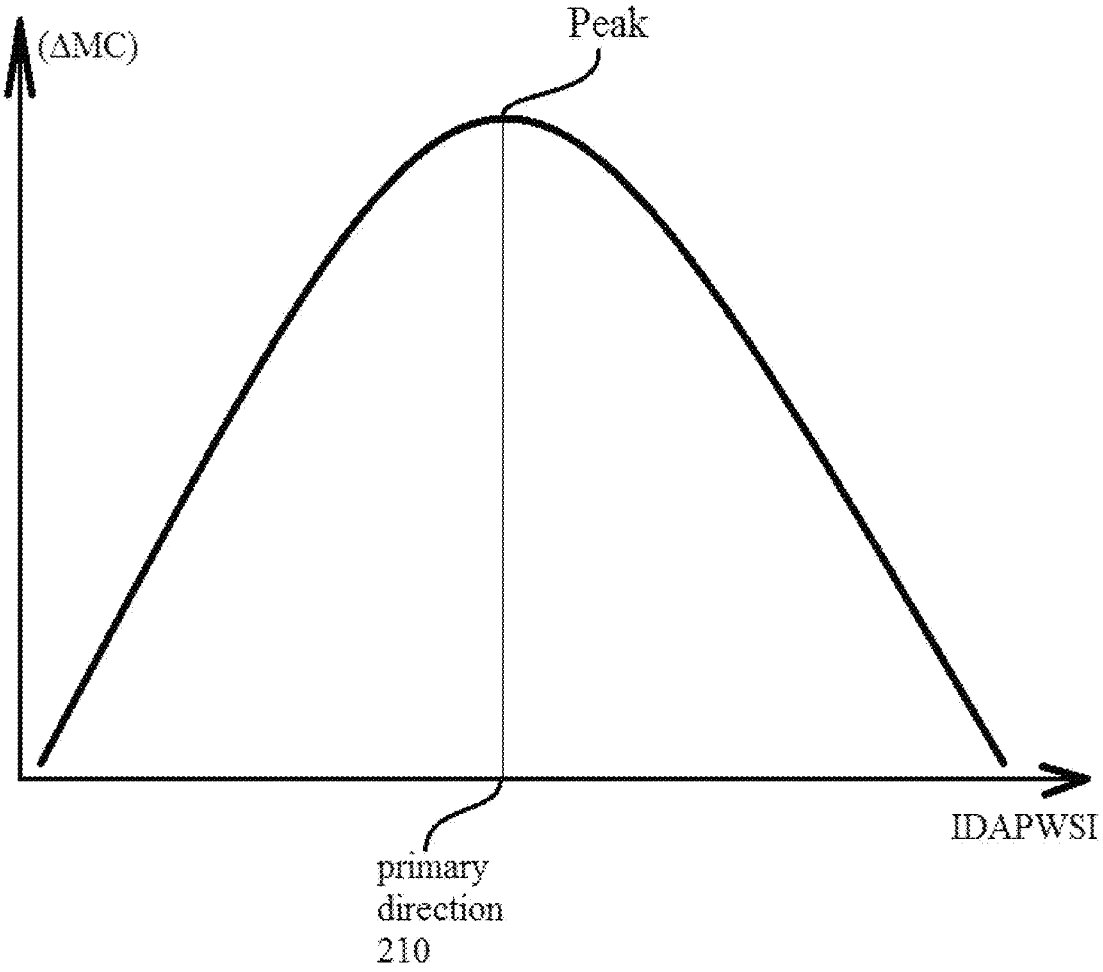
FIG. 4 illustrates the methodology on how to determine the primary direction for the internal components in a microphone in accordance with an exemplary embodiment of the present invention.

The term "lateral mode" will be explained in more details with reference to FIG. 2A. A first electrical conductor 201 (an embodiment of ECA1) and a second electrical conductor 202 (an embodiment of ECA2) in a capacitive microphone 200 such as a MEMS microphone are configured in a lateral mode. Conductor 201 and conductor 202 are configured to have a relative spatial relationship therebetween so that a mutual capacitance can be generated between them. The first electrical conductor 201 and the second electrical conductor 202 are independently of each other made of polysilicon, gold, silver, nickel, aluminum, copper, chromium, titanium, tungsten, and platinum. The relative spatial relationship as well as the mutual capacitance can both be varied by an acoustic pressure impacting upon the first electrical conductor 201 and/or the second electrical conductor 202. As shown in FIG. 3, the acoustic pressure may impact conductor 201 and/or conductor 202 along a range of impacting directions in 3D space as represented by dotted lines. Given the same strength/intensity of acoustic pressure, the mutual capacitance can be varied the most (or maximally varied) by an acoustic pressure impacting upon the first electrical conductor 201 and/or the second electrical conductor 202 along a certain direction among the above range of impacting directions as shown in FIG. 3. The variation of mutual capacitance (ΔMC) caused by various impacting directions of acoustic pressure from 3D space with same intensity (IDAPWSI) is conceptually plotted in FIG. 4. A primary direction is defined as the impacting direction that generates the peak value of ΔMC and is labeled as direction 210 in FIG. 2A. It should be appreciated that, given the same strength/intensity of acoustic pressure, the relative spatial relationship can be varied the most (or maximally varied) by an acoustic pressure impacting upon the first electrical conductor 201 and/or the second electrical conductor 202 along a certain direction X among the range of impacting directions as shown in FIG. 3. Direction X may be the same as, or different from, the primary direction 210 as defined above. In some embodiments of the invention, the primary direction may be alternatively defined as the direction X.

Referring back to FIG. 2A, the first electrical conductor 201 has a first projection 201P along the primary direction 210 on a conceptual plane 220 that is perpendicular to the primary direction 210. The second electrical conductor 202 has a second projection 202P along the primary direction 210 on the conceptual plan 220*e*. The first projection 201P and the second projection 202P have a shortest distance Dmin therebetween. Dmin may be constant or variable, but it is always greater than zero, no matter the first electrical conductor 201 and/or the second electrical conductor 202 is (are) impacted by an acoustic pressure along the primary direction 210 or not. FIG. 2B illustrates an exemplary embodiment of the microphone of FIG. 2A. First electrical conductor 201 is stationary, and has a function similar to the fixed backplate in the prior art. A large flat area of second electrical conductor 202, similar to movable/deflectable membrane/diaphragm 102 in FIG. 1A, receives acoustic pressure and moves up and down along the primary direction, which is perpendicular to the flat area. However, conductors 201 and 202 are configured in a side-by-side spatial relationship. As one "plate" of the capacitor, second electrical conductor 202 does not move significantly toward and from first conductor 201. Instead, second conductor 202 moves laterally over, or "glides" over, first conductor 201, producing changes in the overlapped area between conductors 201 and 202, and therefore varying the mutual capacitance therebetween. A capacitive microphone based on such a relative movement between conductors 201 and 202 is called lateral mode capacitive microphone in the present invention.

Figure 2A:
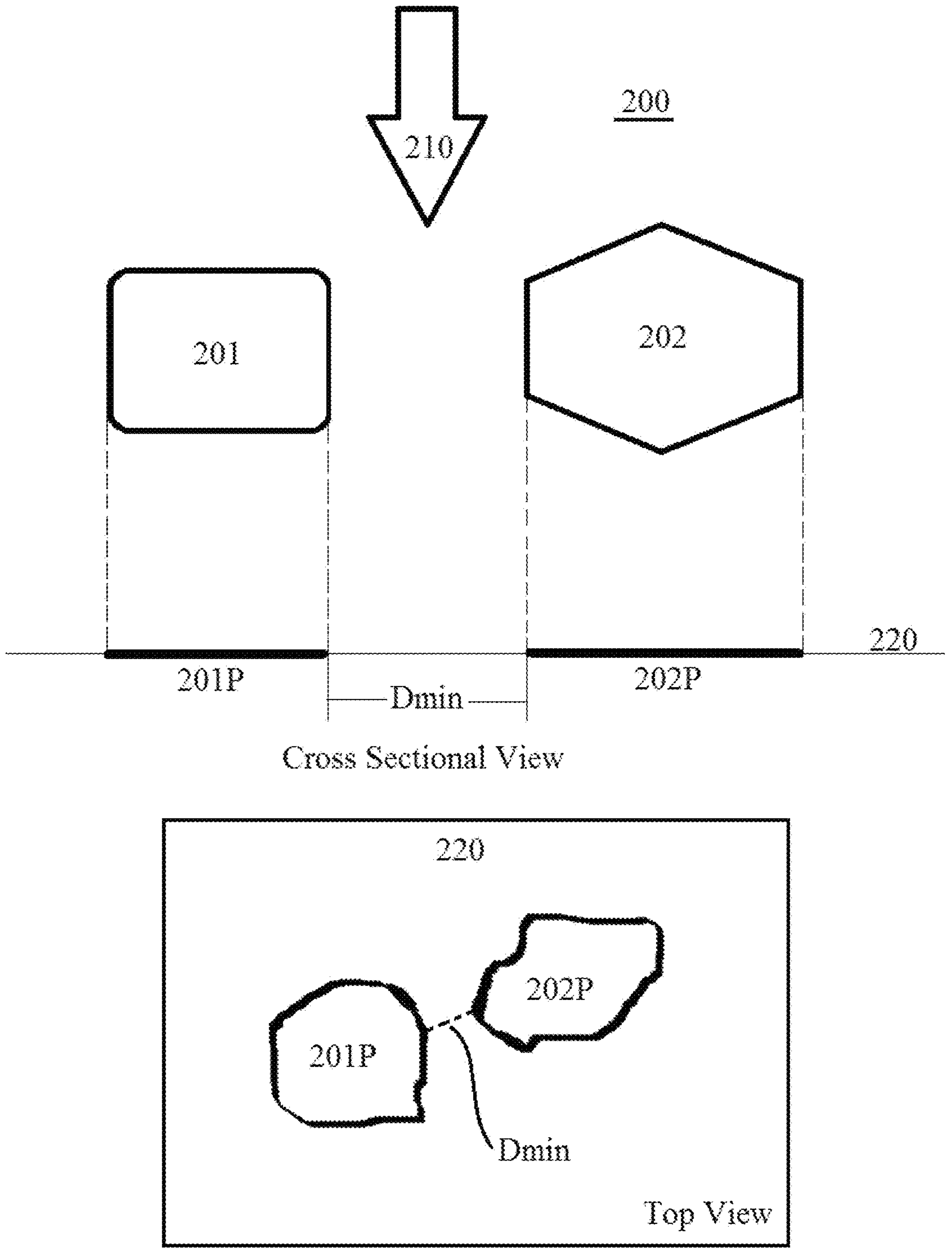
FIG. 2A illustrates the lateral mode configuration of capacitor plates in accordance with an exemplary embodiment of the present invention.
Figure 2B:
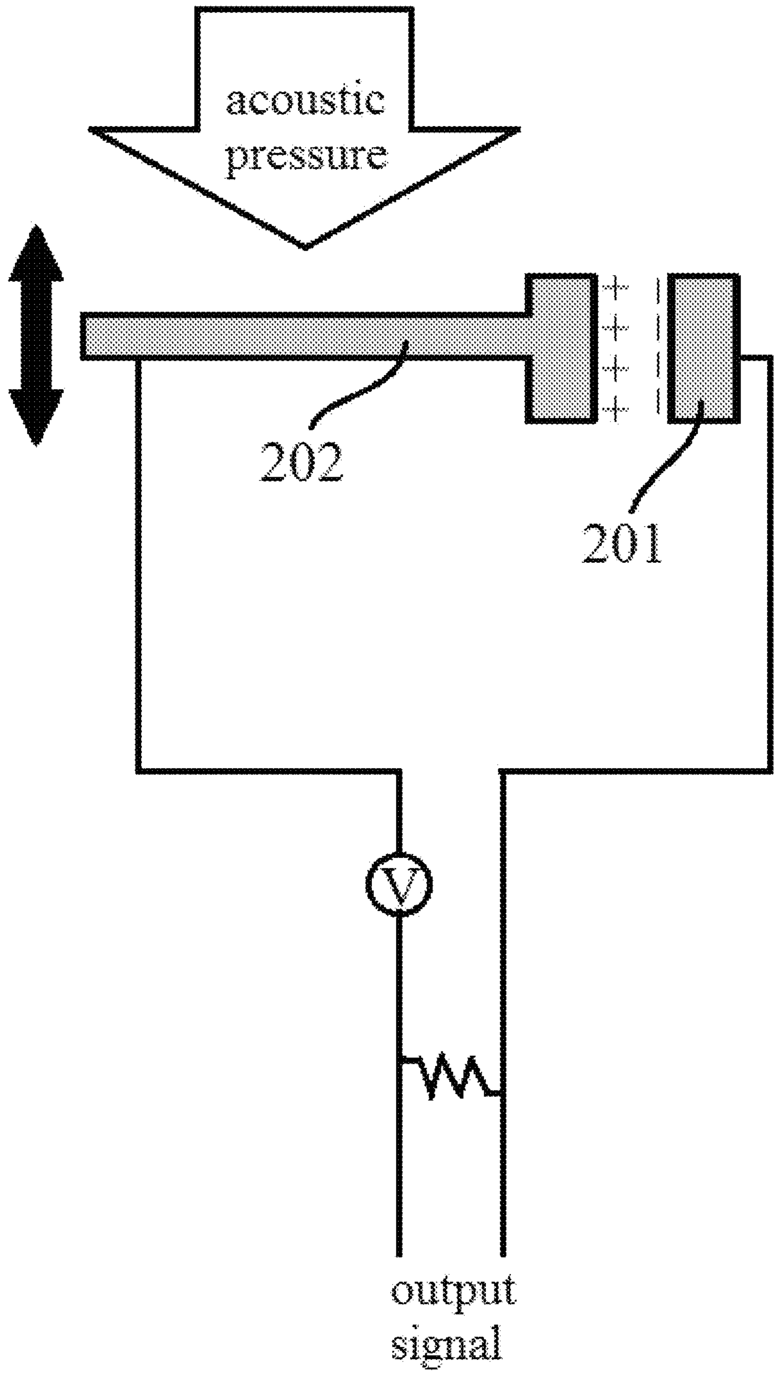
FIG. 2B illustrates the principle of a lateral mode capacitive microphone in accordance with an exemplary embodiment of the present invention.

In exemplary embodiments of the invention, the microphone 60 in FIG. 1C and/or microphone 200 in FIGS. 2A-2B may be a MEMS (Microelectromechanical System) microphone, AKA chip/silicon microphone. Typically, a pressure-sensitive diaphragm is etched directly into a silicon wafer by MEMS processing techniques, and is usually accompanied with integrated preamplifier. For a digital MEMS microphone, it may include built in analog-to-digital converter (ADC) circuits on the same CMOS chip making the chip a digital microphone and so more readily integrated with digital products.

Figure 5:
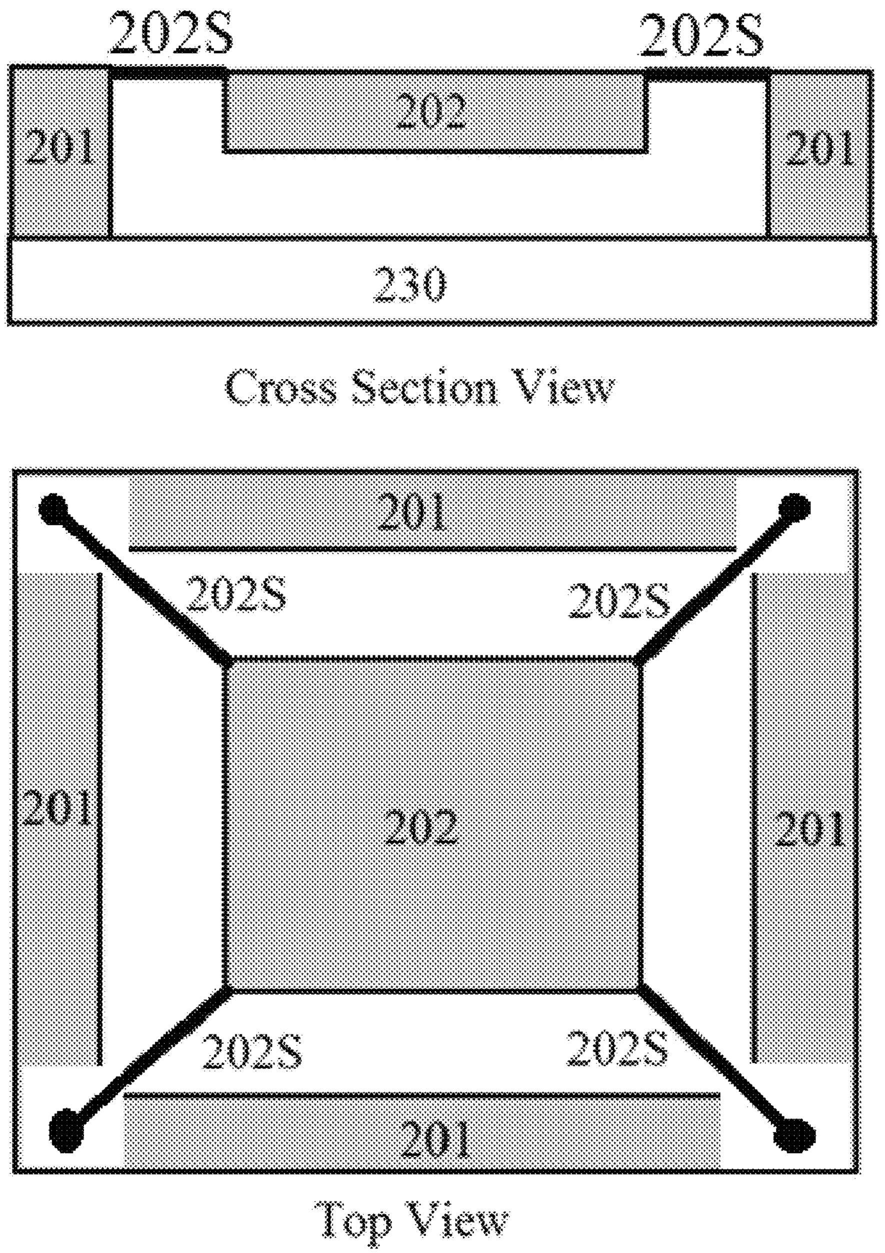
FIG. 5 schematically shows a MEMS capacitive microphone in accordance with an exemplary embodiment of the present invention.

In an embodiment as shown in FIG. 5, capacitive microphone 60 or 200 may be so fabricated or patterned that it includes a substrate 230 such as silicon. The substrate 230 can be viewed as the conceptual plane 220 in FIG. 2A. The first electrical conductor 201 and the second electrical conductor 202 may be constructed above the substrate 230 side-by-side. Alternatively, first electrical conductor 201 may be so fabricated or patterned that it is surrounding the second electrical conductor 202, as shown in FIG. 5. In an exemplary embodiment, first electrical conductor 201 may be so fabricated or patterned that it is fixed relative to the substrate 230. On the other hand, second electrical conductor 202 may be so fabricated or patterned that it is a membrane movable relative to the substrate 230. The primary direction may be (is) perpendicular to the membrane plane 202. The movable membrane 202 may be so fabricated or patterned that it is attached to the substrate 230 via three or more suspensions 202S such as four suspensions 202S. As will be described and illustrated later, each of the suspension 202S may be so fabricated or patterned that it comprises folded and symmetrical cantilevers.

Figure 6:
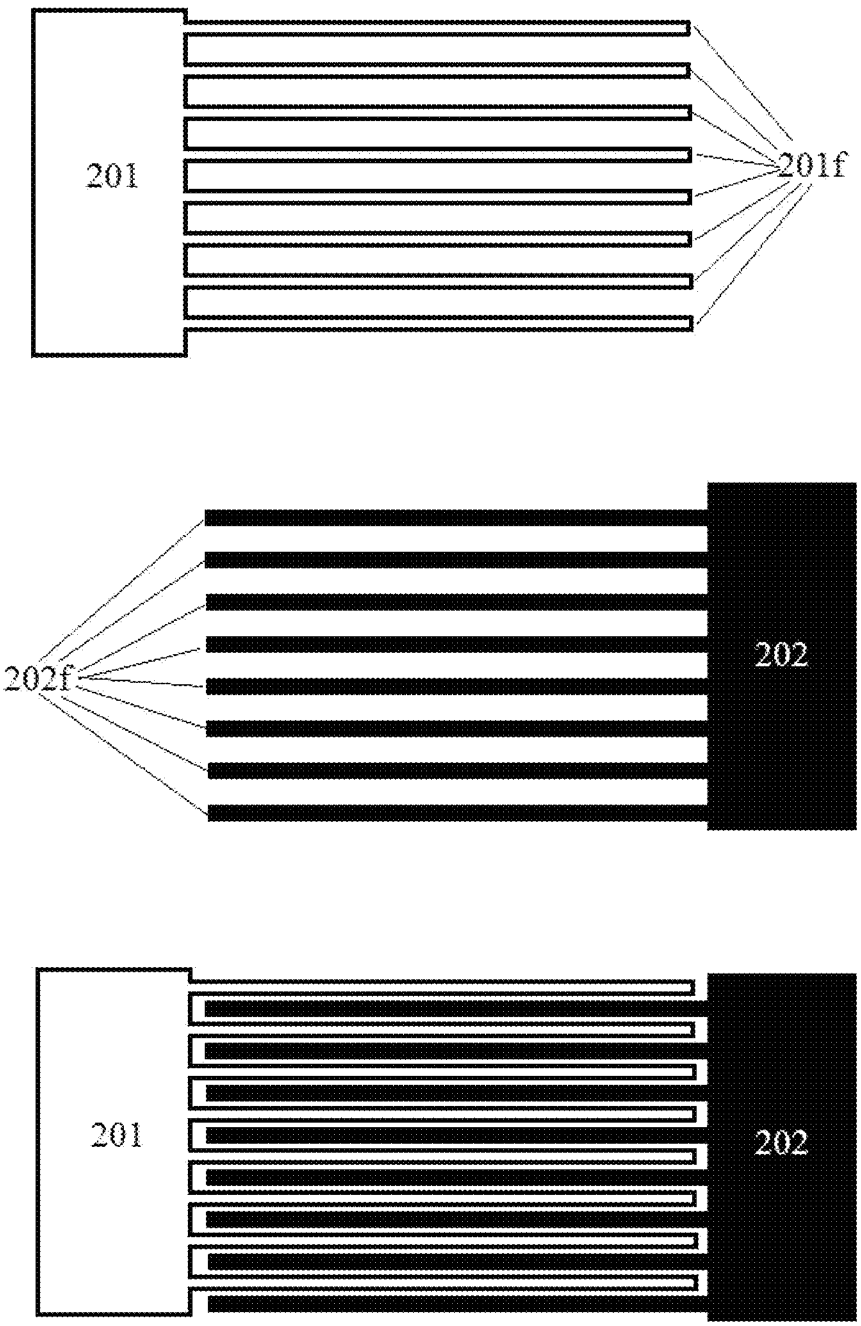
FIG. 6 illustrates the first/second electrical conductors having a comb finger configuration in accordance with an exemplary embodiment of the present invention.
Figure 7:
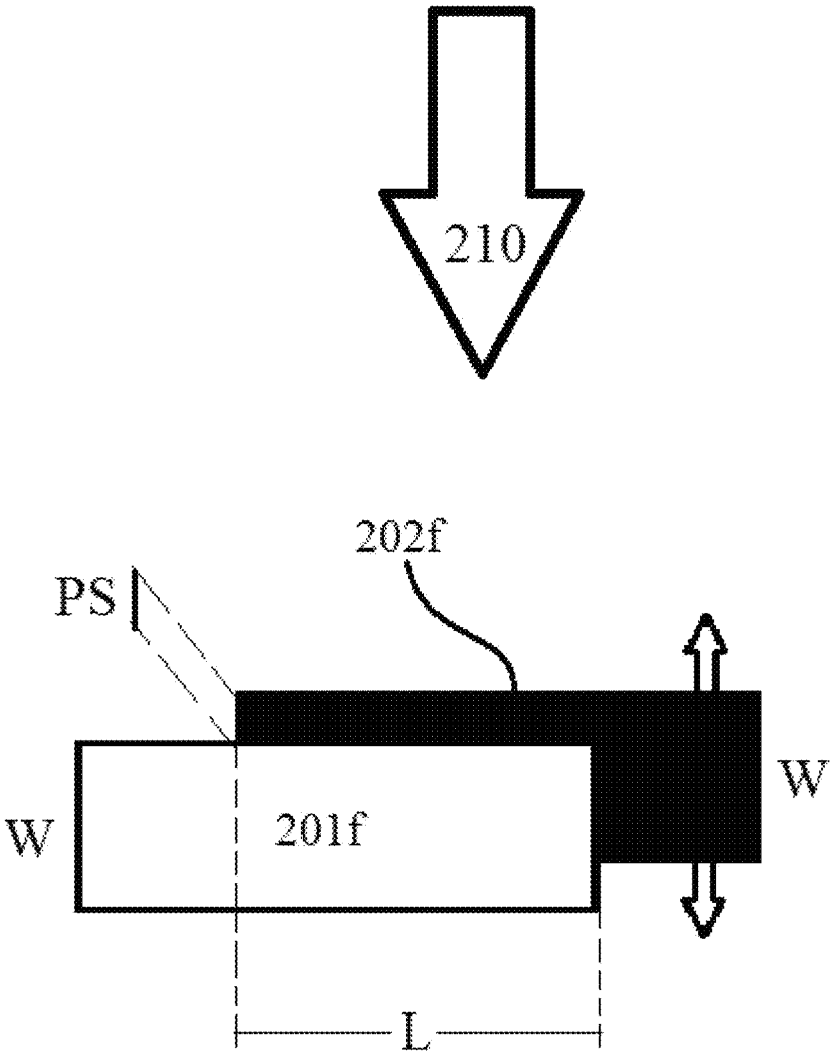
FIG. 7 depicts the spatial relationship between two comb fingers of FIG. 6 in accordance with an exemplary embodiment of the present invention.

In an embodiment as shown in FIG. 6, the first electrical conductor 201 may be so fabricated or patterned that it comprises a first set of comb fingers 201*f*. The movable membrane as second conductor 202 may be so fabricated or patterned that it comprises a second set of comb fingers 202*f* around the peripheral region of the membrane. The two sets of comb fingers 201*f* and 202*f* may be so fabricated or patterned that they are interleaved into each other. The second set of comb fingers 202*f* are movable along the primary direction, which is perpendicular to the membrane plane 202, relative to the first set of comb fingers 201*f*. As such, the resistance from air located within the gap between the membrane 202 and the substrate is lowered, for example, 25 times lower squeeze film damping. In a preferred embodiment, the first set of comb fingers 201*f* and the second set of comb fingers 202*f* may be so fabricated or patterned that they have identical shape and dimension. As shown in FIG. 7, each comb finger may be so fabricated or patterned that it has a same width W measured along the primary direction 210, and the first set of comb fingers 201*f* and the second set of comb fingers 202*f* may be so fabricated or patterned that they have a positional shift PS along the primary direction 210, in the absence of vibration caused by sound wave. For example, the positional shift PS along the primary direction 210 may be one third of the width W, PS=⅓ W. In other words, the first set of comb fingers 201*f* and the second set of comb fingers 202*f* may be so fabricated or patterned that they have an overlap of ⅔W along the primary direction 210, in the absence of vibration caused by sound wave. In embodiments, the movable membrane 202 may be so fabricated or patterned that it has a shape of square.

Comb fingers 201*f* are fixed on anchor, and comb fingers 202*f* are integrated with membrane-shaped second electrical conductor 202 (hereinafter membrane 202 for simplicity). When membrane 202 vibrates due to sound wave, fingers 202*f* move together with membrane 202. The overlap area between two neighboring fingers 201*f* and 202*f* changes along with this movement, so does the capacitance. Eventually a capacitance change signal (e.g. S1 or S2) is detected, in the same manner as the conventional capacitive microphone.

Figure 8:
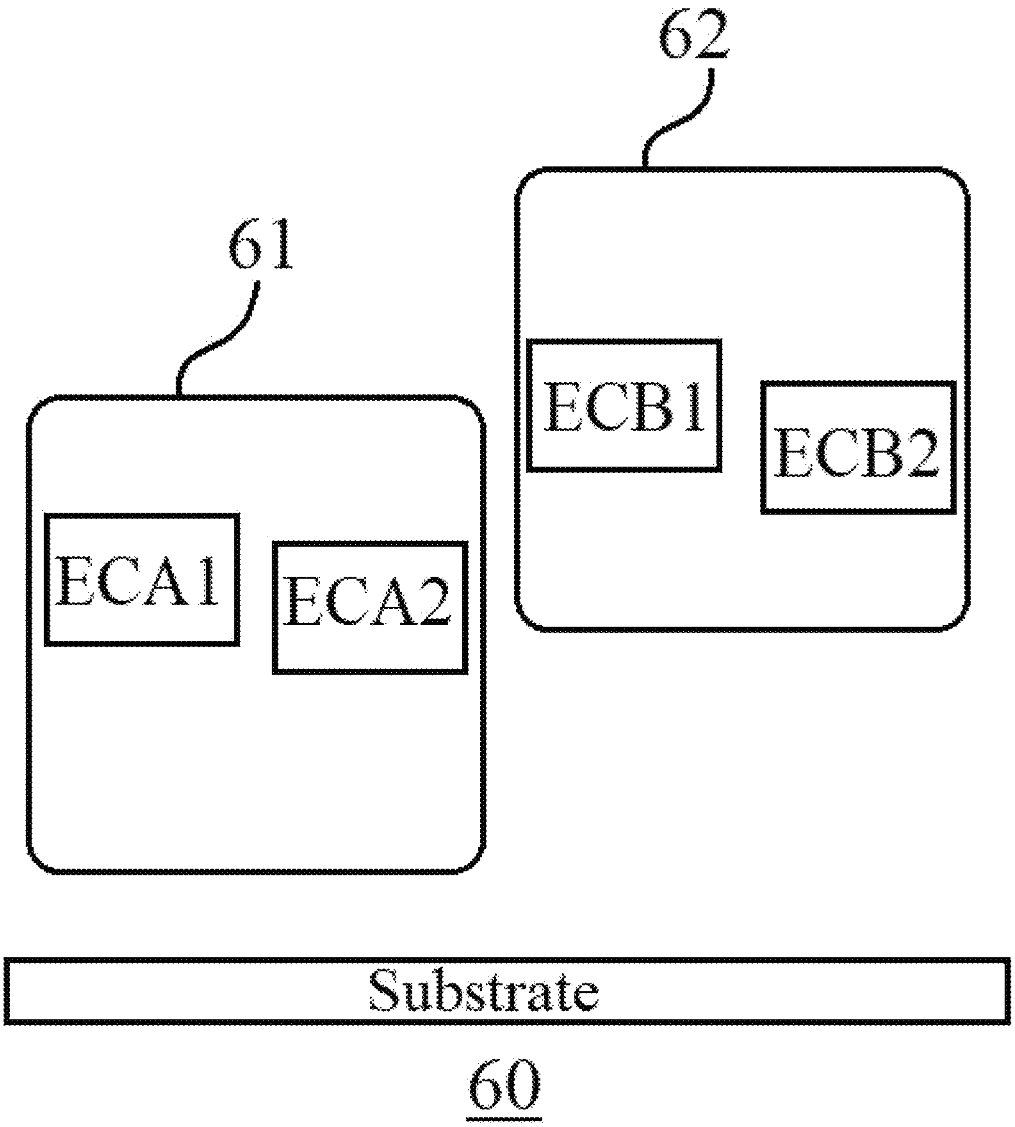
FIG. 8 schematically shows a capacitive microphone in accordance with an exemplary embodiment of the present invention that includes one or two pairs of capacitor plates arranged in lateral mode configuration.

Referring back to FIG. 2B, the second capacitor 62 may be fabricated or patterned as a capacitor of any design, including a parallel-plate design as shown in FIG. 1A, as long as signal output S1 is substantially the additive inverse of signal output S2. As shown in FIG. 8, the second capacitor 62 may be so fabricated or patterned that it includes a third electrical conductor ECB1 and a fourth electrical conductor ECB2. Conductors ECB1 and ECB2 may be built like thin layers 101 and 102 that are placed closely in almost parallel as shown in FIG. 1A. One of conductors ECB1 and ECB2 is fixed backplate 101, and the other one is movable/deflectable membrane/diaphragm 102, which can be moved or driven by sound pressure. Diaphragm 102 acts as one plate of a capacitor, and the vibrations thereof produce changes in the distance between two layers 101 and 102, and changes in the mutual capacitance therebetween.

In preferred embodiments, conductors ECB1 and ECB2 may also be fabricated, patterned, or configured in a lateral mode, like conductors ECA1 and ECA2 (or conductors 210 and 202) as described above and illustrated in FIGS. 2A-7. For conciseness, the description and illustration of ECB1 and ECB2 in a lateral mode will be omitted.

The first capacitor 61 and the second capacitor 62 as shown in FIG. 8 may be structurally and functionally independent of each other, as long as signal output S1 is substantially the additive inverse of signal output S2. However, in preferred embodiments, capacitors 61 and 62 are structurally and functionally related to each other. For example, they may be so fabricated or patterned that they share the same primary direction of the same substrate 230. The common substrate 230 can be viewed as the conceptual plane. Like conductors ECA1 and ECA2 that are constructed above the substrate 230 side-by-side, conductors ECB1 and ECB2 are also constructed above the substrate 230 side-by-side.

In more preferred embodiments, one of conductors ECA1 and ECA2 may be so fabricated or patterned that it is electrically connected to one of conductors ECB1 and ECB2 to form a single shared conductor. The electrical connection can be accomplished by physical integration and/or merge of two conductors, or by electrical wire connection of two separate conductors. In the following examples, two conductors ECA2 and ECB1 may be fabricated or patterned to form one single conductor (designated as "ECA2B1") by physical integration and/or merging of the two conductors, or by electrical wire connection of the two separate conductors. It should be appreciated that the single conductor ECA2B1 may be moveable or stationary/fixed relative to the common substrate 230, as will be described in more details.

Moveable Single Conductor with Stationary Composite Conductor

Figure 9:
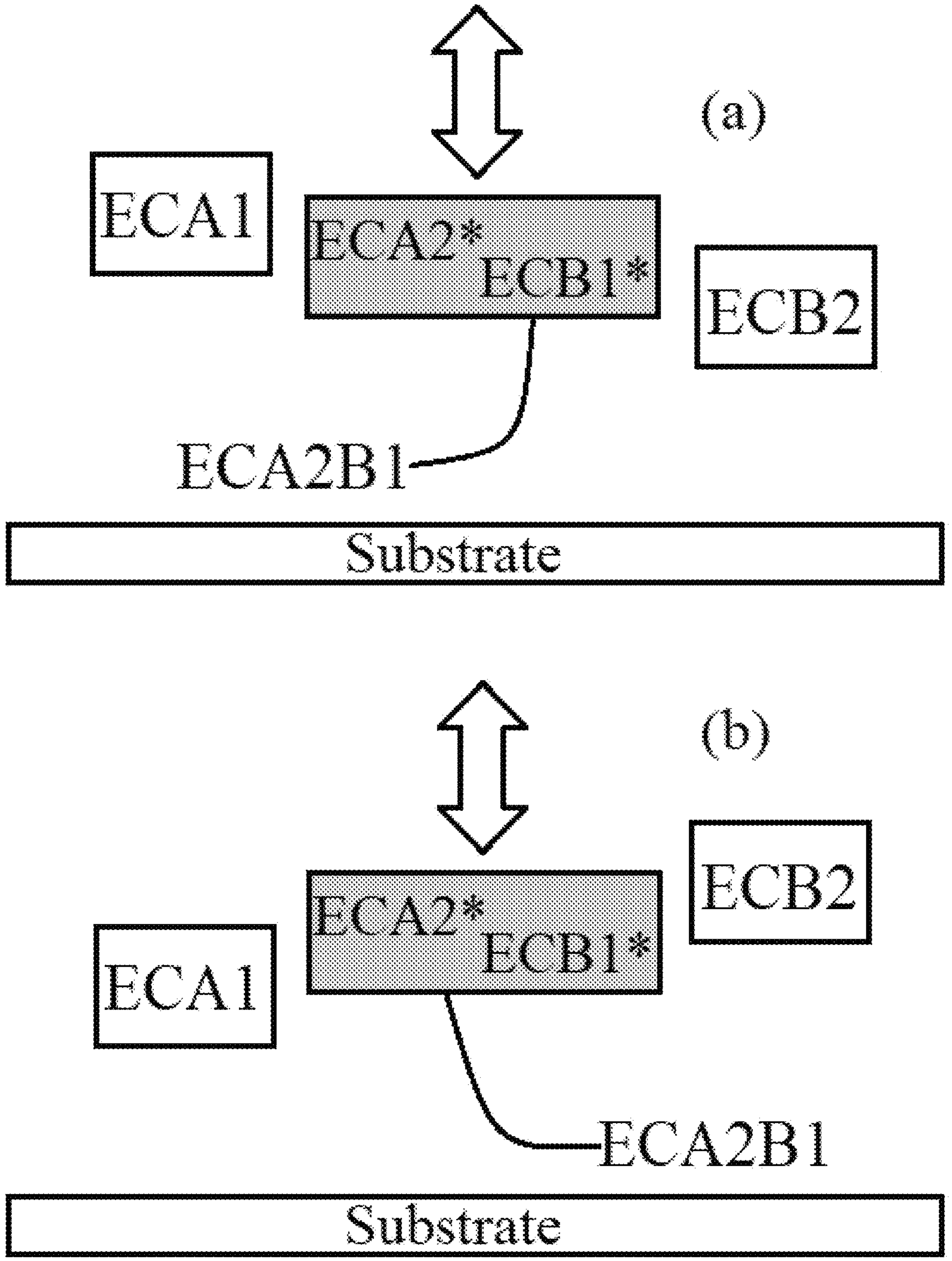
FIG. 9 schematically shows a moveable single conductor with "Even Height" electrically shared by the first lateral mode capacitor and the second lateral mode capacitor in accordance with an exemplary embodiment of the present invention.

FIG. 9 schematically shows a capacitive microphone product 60 in accordance with an exemplary embodiment of the present invention that includes a moveable single conductor with "Even Height" shared by the first lateral mode capacitor 61 and the second lateral mode capacitor 62. FIG. 10 schematically shows a capacitive microphone 60 in accordance with an exemplary embodiment of the present invention that includes a moveable single conductor where the first lateral mode capacitor 61 and the second lateral mode capacitor 62 have "Uneven Height." Referring to FIGS. 9-10, electrically separated conductors ECA1 and ECB2 may be so fabricated or patterned that they are fixed relative to the substrate 230; single conductor ECA2B1 may be so fabricated or patterned that it comprises a membrane that is movable relative to the common substrate 230; and the common primary direction is perpendicular to the membrane plane. Conductor ECA1 may be so fabricated or patterned that it includes a flat layer in parallel to the substrate 230 and having a thickness ECA1*t* and a height ECA1*h* along the primary direction as measured from the substrate 230. Similarly, conductor ECB2 may be so fabricated or patterned that it includes a flat layer in parallel to the substrate 230 and having a thickness ECB2*t* and a height ECB2*h* along the primary direction as measured from the same substrate 230. Single conductor ECA2B1 may be so fabricated or patterned that it comprises a portion ECA2* facing conductor ECA1. Portion ECA2* may be so fabricated or patterned that it includes a flat layer in parallel to the substrate and having a thickness ECA2*t* and a height ECA2*h* along the primary direction as measured from the same substrate. Likewise, single conductor ECA2B1 may be so fabricated or patterned that it comprises another portion ECB1* facing conductor ECB2 and portion ECB1* may be so fabricated or patterned that it comprises a flat layer in parallel to the substrate and having a thickness ECB1*t* and a height ECB1*h* along the primary direction as measured from the same substrate.

In preferred but still exemplary embodiments, thickness ECA1*t* and thickness ECA2*t* are substantially equal (within ±10% deviation) or exactly equal to each other. Likewise, thickness ECB2*t* and thickness ECB1*t* are substantially equal (within ±10% deviation) or exactly equal to each other. Preferably, thickness ECA1*t*, thickness ECA2*t*, thickness ECB2*t*, and thickness ECB1*t* are substantially the same or exactly the same, and they are equal to ABt. Height difference ΔAh is herein defined as height ECA1*h* minus (subtract) height ECA2*h* (ECA1*h*−ECA2*h*); and height difference ΔBh is herein defined as height ECB1*h* minus (subtract) height ECB2*h* (ECB1*h*−ECB2*h*). ΔAh≠0 such as ΔAh>0 or ΔAh<0, ΔBh≠0 such as ΔBh>0 or ΔBh<0, but ΔAh=ΔBh. In more preferred embodiments, the absolute values of ΔAh and ΔBh are about one third of ABt, |ΔAh|≈|ΔBh|≈⅓ABt or |ΔAh|=|ΔBh|=⅓ABt.

In specific embodiments as shown in FIG. 9, height ECA2*h*=height ECB1*h*. In the upper panel (a) of FIG. 9, ΔAh>0, ΔBh>0, and ΔAh=ΔBh. In the lower panel (b) of FIG. 9, ΔAh<0, ΔBh<0, and ΔAh=ΔBh. In other specific embodiments as shown in FIG. 10, height ECA1*h*=height ECB2*h*. In the upper panel (a) of FIG. 10, ΔAh>0, ΔBh>0, and ΔAh=ΔBh. In the lower panel (b) of FIG. 10, ΔAh<0, ΔBh<0, and ΔAh=ΔBh.

Figure 11:
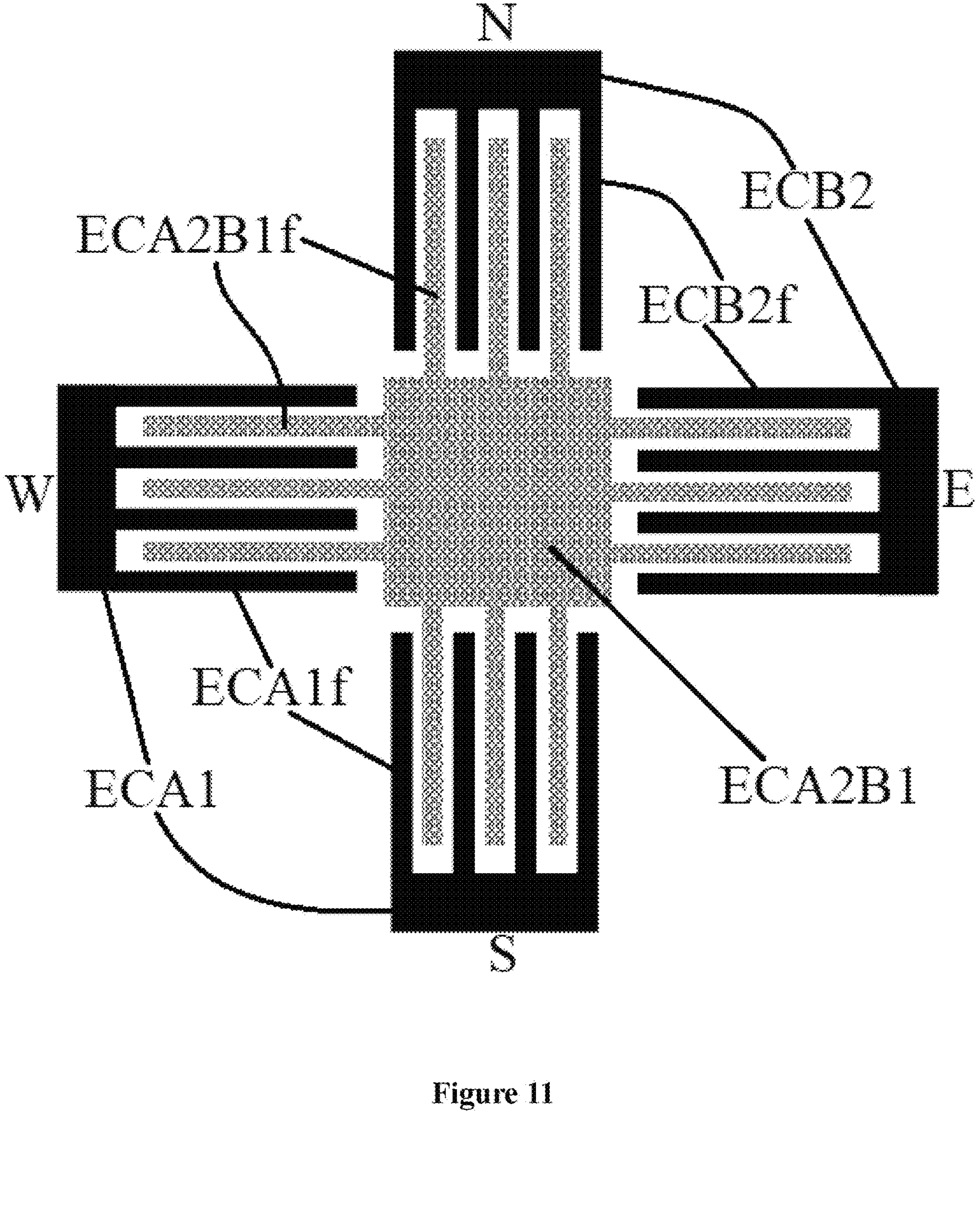
FIG. 11 is the top view of one configuration as shown in FIGS. 9 and 10 combined with comb fingers as shown in FIG. 6 in accordance with an exemplary embodiment of the present invention.

FIG. 11 is a top view of the configurations as shown in FIGS. 9 and 10 combined with comb fingers as shown in FIG. 6. Conductor ECA1 may be so fabricated or patterned that it comprises a set of comb fingers ECA1*f*, and conductor ECB2 comprises a set of comb fingers ECB2*f*. The movable membrane of single conductor ECA2B1 may be so fabricated or patterned that it comprises a set of comb fingers ECA2B1*f* around the peripheral region of the membrane. Comb fingers ECA1*f* and comb fingers ECB2*f* may be so fabricated or patterned that they are interleaved into comb fingers ECA2B1*f*. As described above, single conductor ECA2B1 comprises a portion ECA2* (not shown) facing conductor ECA1 and another portion ECB1* (not shown) facing conductor ECB2. Comb fingers ECA2B if are laterally movable relative to both comb fingers ECA1*f* and comb fingers ECB2*f*, and the resistance from air located within a gap between the membrane and the substrate is lowered. The movable membrane of single conductor ECA2B1 may be square shaped as shown in FIG. 11. However, it is contemplated that the movable membrane of single conductor ECA2B1 may have a shape of circle, triangle, hexagon, and octagon etc. In preferred embodiments, comb fingers ECA2B1*f*, comb fingers ECA1*f*, and comb fingers ECB2*f* may be so fabricated or patterned that they have identical shape, dimension, and spatial arrangement. The movable membrane of single conductor ECA2B1 may be so fabricated or patterned that it is attached to the substrate via three or more suspensions such as four suspensions (like suspensions 202S as shown in FIG. 5), and each suspension may be so fabricated or patterned that it includes folded and symmetrical cantilevers.

Figure 12:
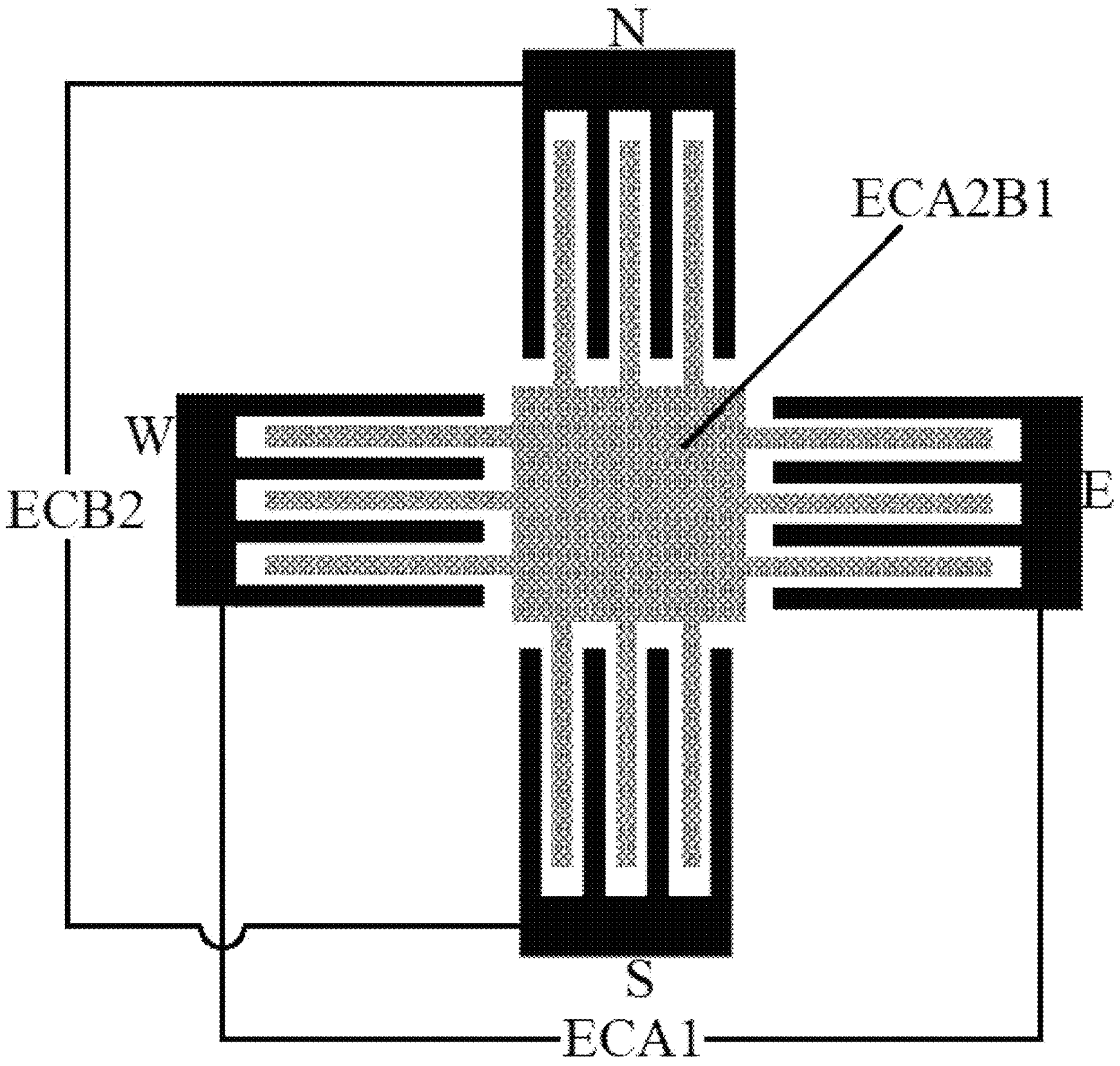
FIG. 12 is the top view of another configuration as shown in FIGS. 9 and 10 combined with comb fingers as shown in FIG. 6 in accordance with an exemplary embodiment of the present invention.
Figure 13:
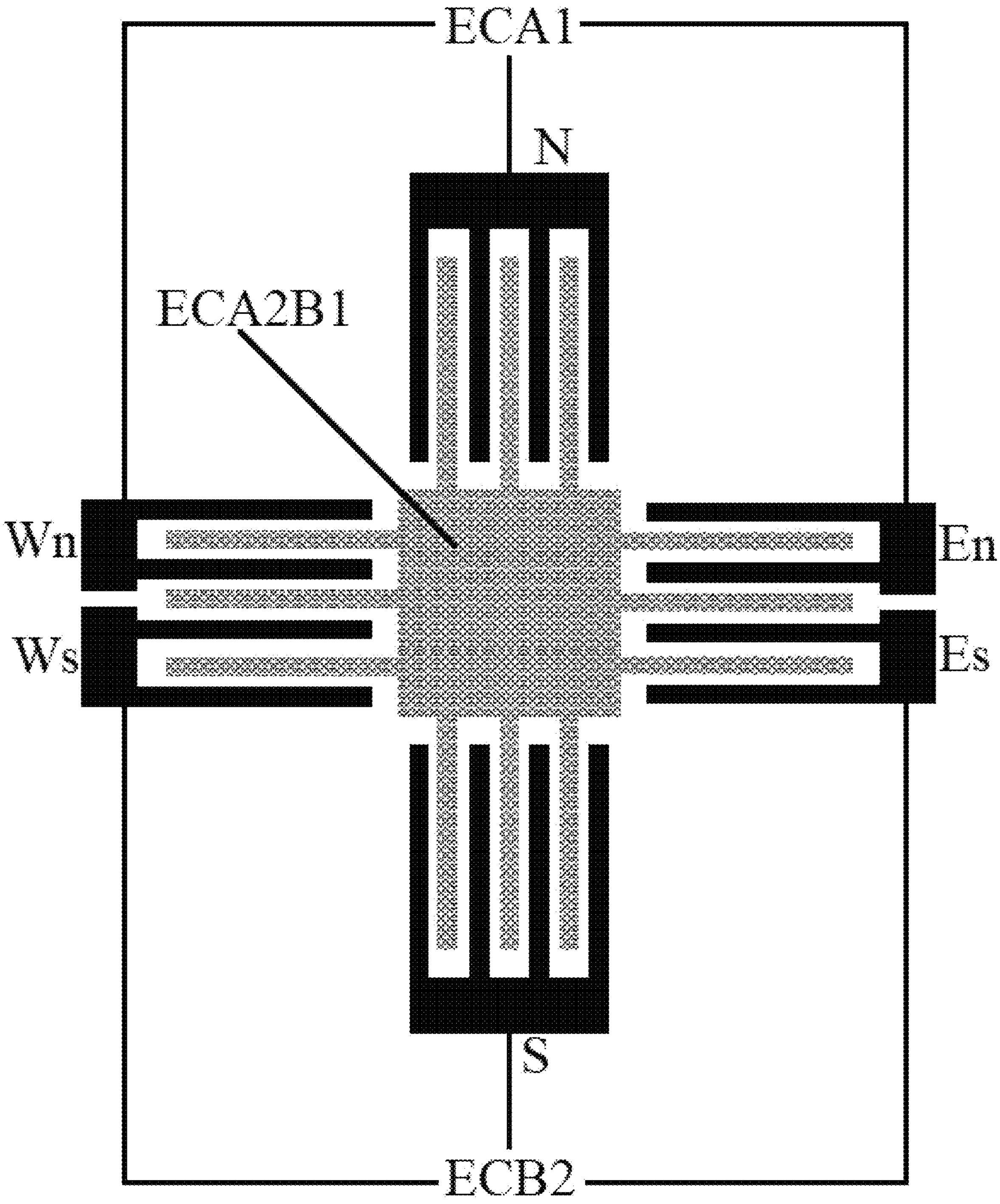
FIG. 13 is the top view of still another configuration as shown in FIGS. 9 and 10 combined with comb fingers as shown in FIG. 6 in accordance with an exemplary embodiment of the present invention.
Figure 14:
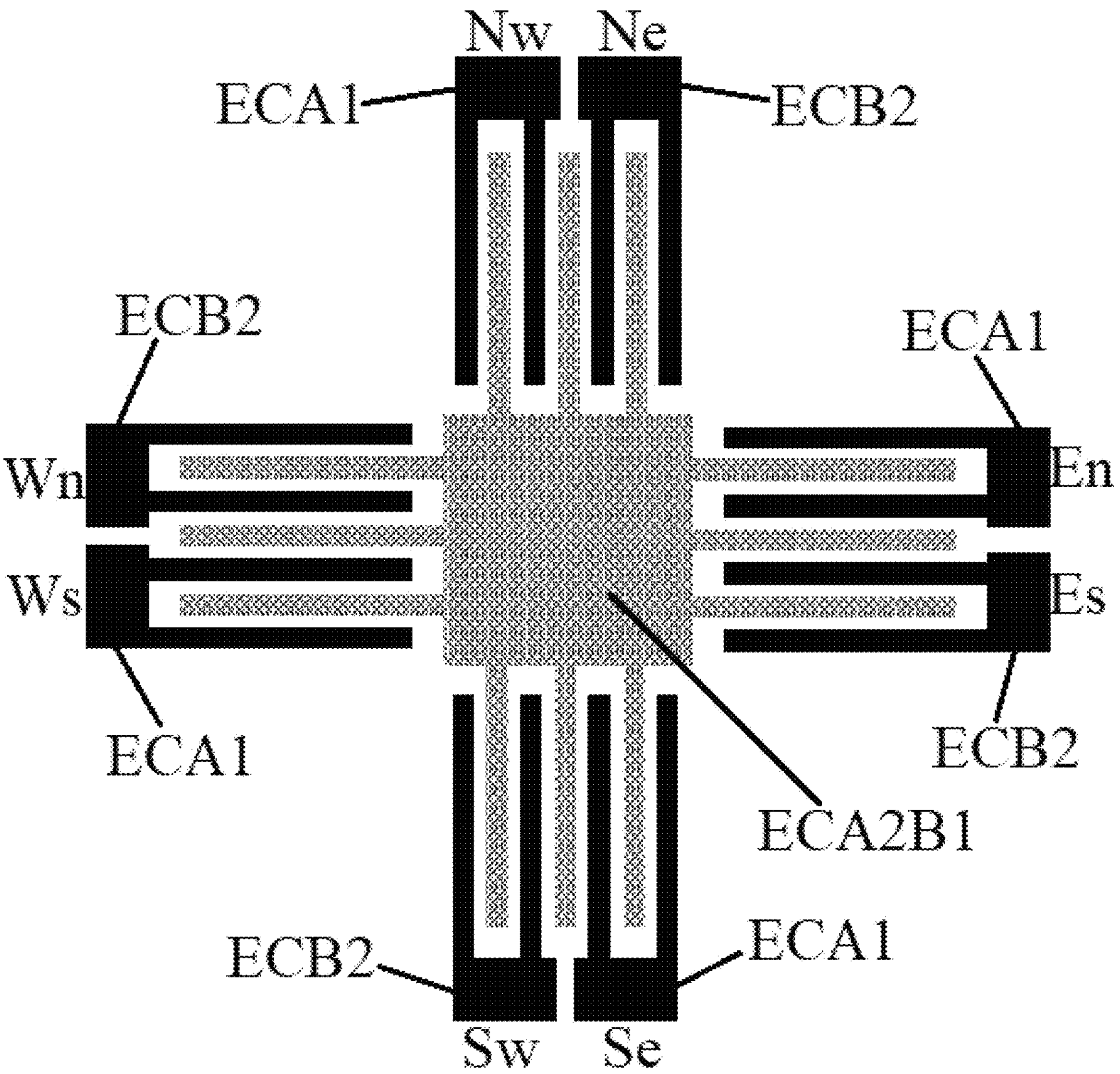
FIG. 14 is the top view of a further configuration as shown in FIGS. 9 and 10 combined with comb fingers as shown in FIG. 6 in accordance with an exemplary embodiment of the present invention.

As shown in FIG. 11, the square-shaped movable membrane of single conductor ECA2B1 may face or overlap four electrode banks N, S, E and W. Comb fingers extended from conductor ECA2B1 are interleaved into comb fingers extended from banks N, S, E and W. Any two neighboring banks with their respective comb fingers may be electrically connected, and constitute conductor ECA1 (e.g. N+E, E+S, S+W and W+N), while the other two neighboring banks with their respective comb fingers may be electrically connected and constitute conductor ECB2 (e.g. S+W, W+N, N+E and E+S respectively). As shown in FIG. 12, any two opposite banks with their respective comb fingers may be electrically connected and constitute conductor ECA1 (e.g. N+S and E+W), while the other two opposite banks with their respective comb fingers may be electrically connected, and constitute conductor ECB2 (e.g. E+W and N+S respectively). As shown in FIG. 13, only two opposite banks with their respective comb fingers may be split into two sub-banks. For example, bank E is split half into sub-bank Es and sub-bank Es, and bank W is split half into sub-bank Ws and sub-bank Ws. Bank N, sub-bank En and sub-bank Wn may be electrically connected, and constitute conductor ECA1, while bank S, sub-bank Es and sub-bank Ws may be electrically connected and constitute conductor ECB2. As shown in FIG. 14, all the four banks N, S, E and W with their respective comb fingers may be split into 4 pairs of sub-banks, Ne and Nw, Se and Sw, En and Es, and Wn and Ws. Four sub-banks from the 4 pairs may be electrically connected and constitute conductor ECA1, while other four sub-banks from the 4 pairs may be electrically connected and constitute conductor ECB2. For example, sub-banks Nw, En, Se and Ws may be electrically connected and constitute conductor ECA1, while sub-banks Ne, Es, Sw and Wn may be electrically connected and they constitute conductor ECB2.

Figure 15:
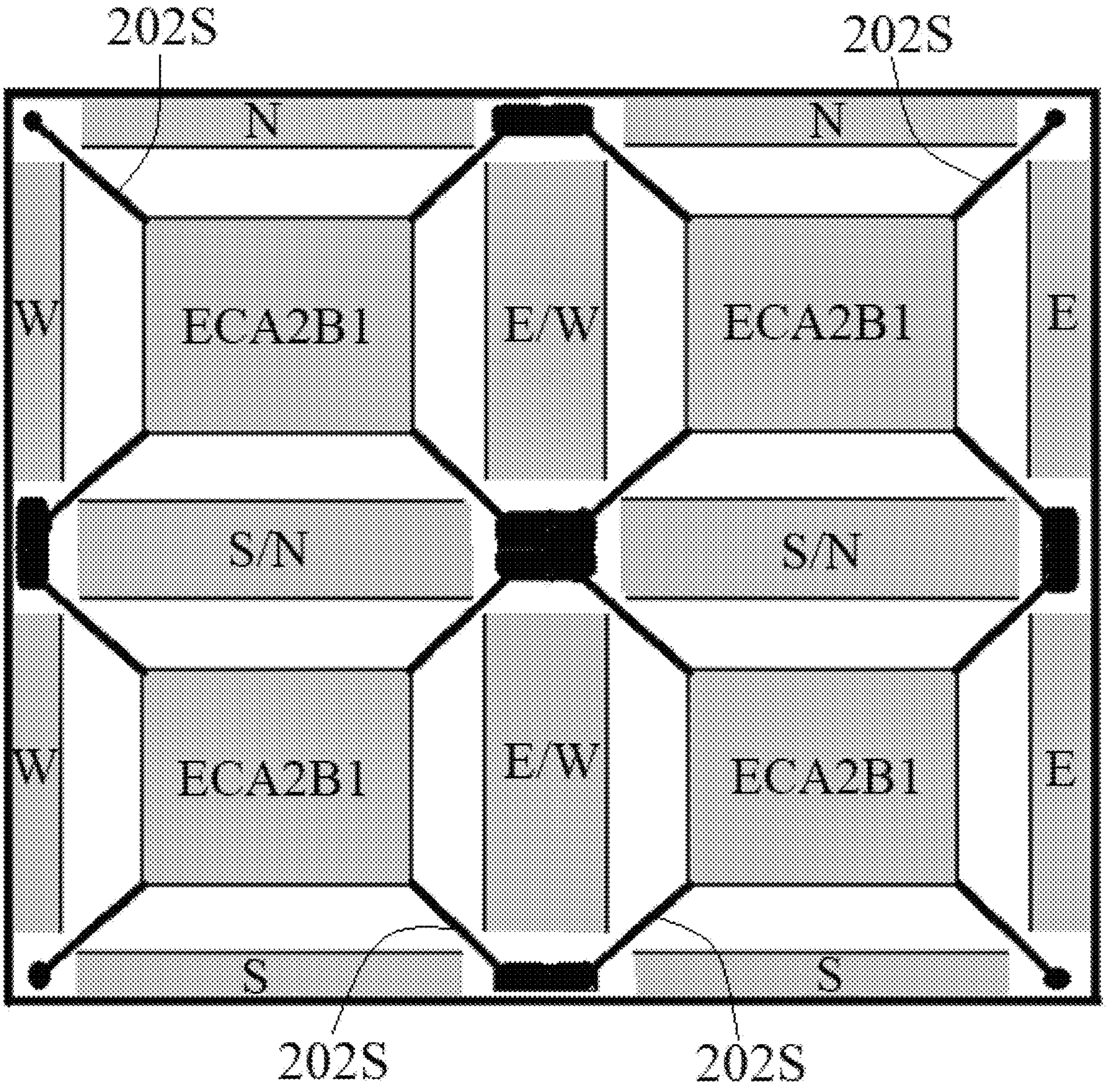
FIG. 15 shows that four movable single conductors as shown in FIGS. 11-14 are arranged in a 2×2 array configuration in accordance with an exemplary embodiment of the present invention.

The capacitive microphone of the invention may be so fabricated or patterned that it includes one or more movable membranes of single conductor ECA2B1. For example, four movable membranes of single conductor ECA2B1 can be arranged in a 2×2 array configuration. As shown in FIG. 15, four movable single conductors as shown in FIGS. 11-14 may be arranged in a 2×2 array configuration.

Figure 16:
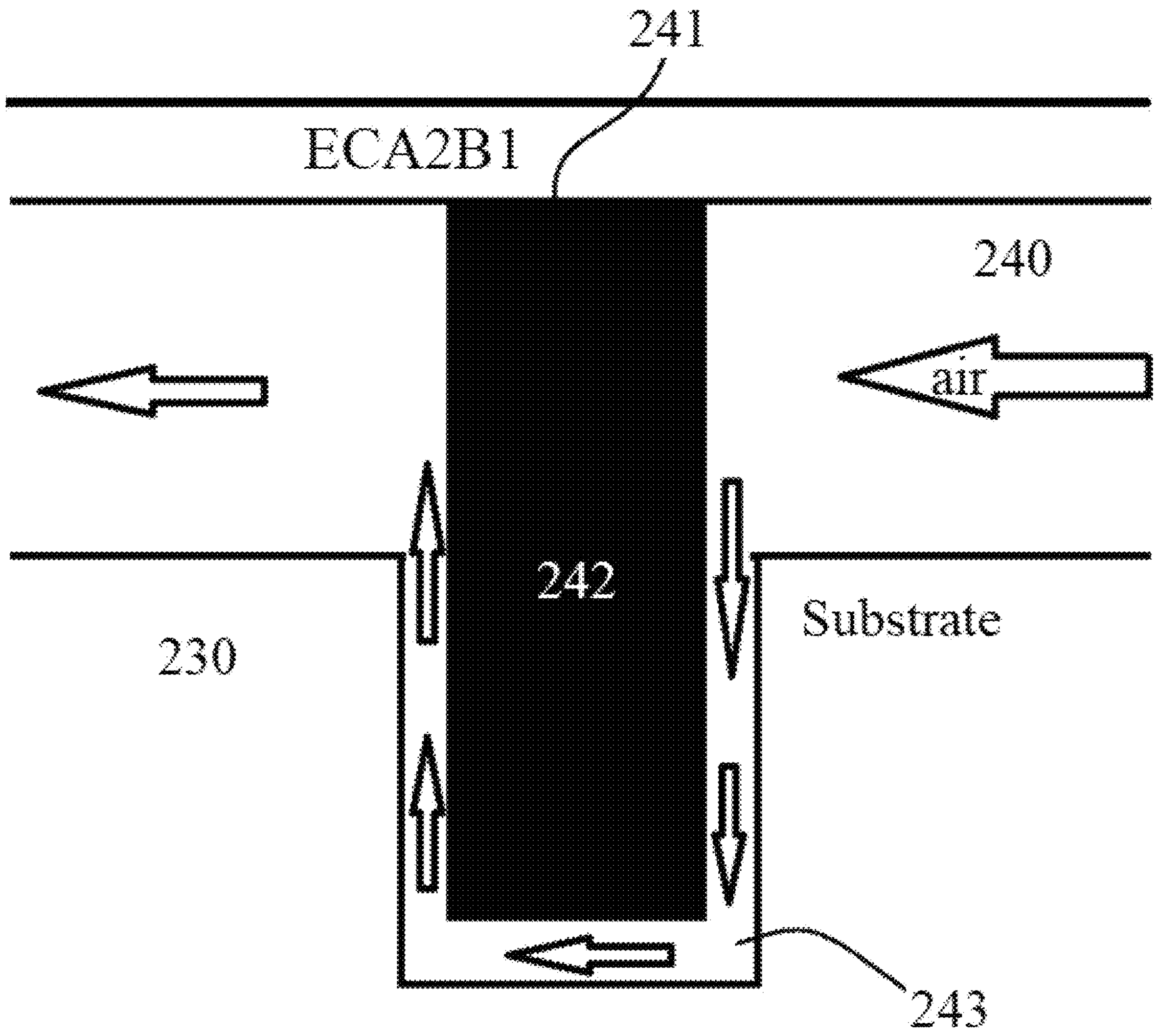
FIG. 16 demonstrates the design of one air flow restrictor between the substrate and the movable single conductors as shown in FIGS. 11-14 in accordance with an exemplary embodiment of the present invention.
Figure 17:
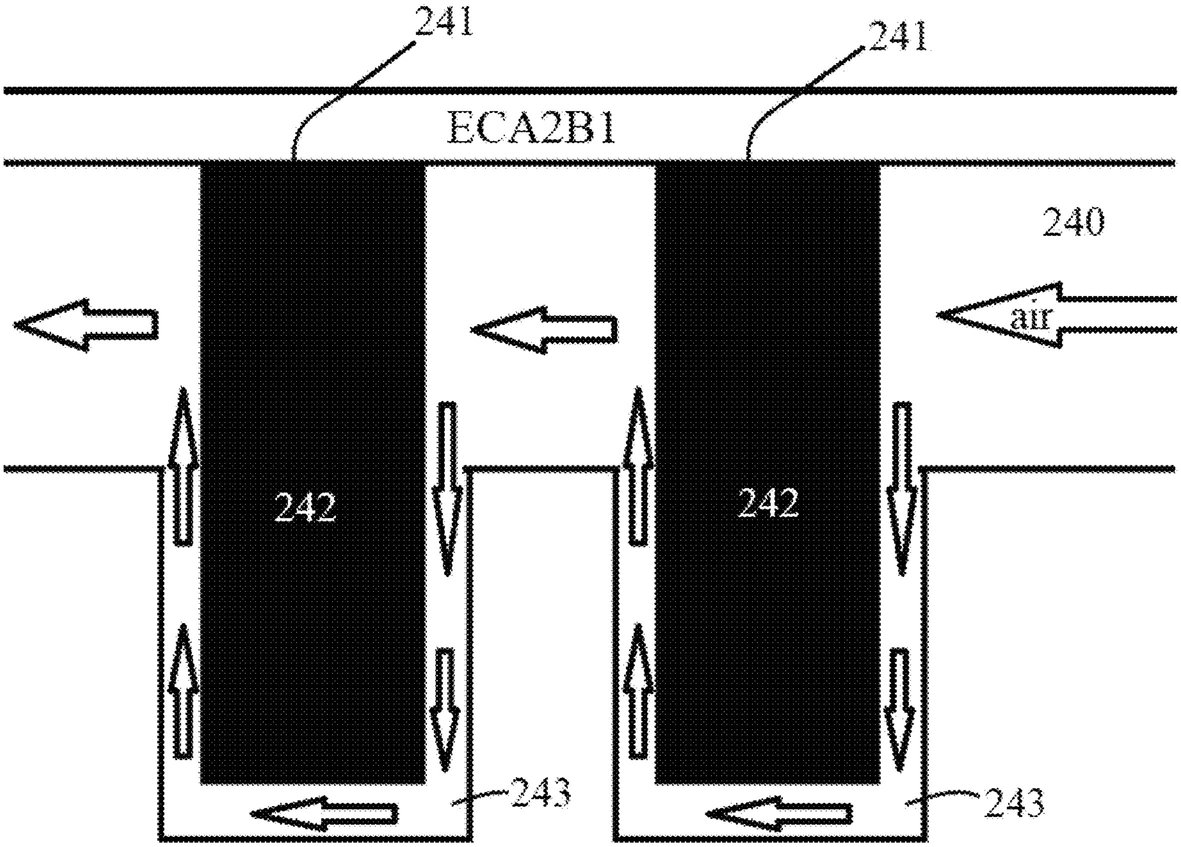
FIG. 17 demonstrates the design of two serial and co-centered flow restrictors between the substrate and the movable single conductors as shown in FIGS. 11-14 in accordance with an exemplary embodiment of the present invention.

Leakage is often an issue in microphone design. In conventional parallel plate design as shown in FIG. 1A, it typically has a couple of tiny holes around the edge in order to let air go through slowly, to keep air pressure balance on both sides of membrane 101 in low frequency. That is a desired leakage. However, a large leakage is undesired, because it will let some low frequency sound wave escape away from membrane vibration easily via the holes, and will result in a sensitivity drop in low frequency. In some embodiments as shown in FIGS. 16 and 17, the capacitive microphone of the invention may be so fabricated or patterned that it comprises one, two or more air flow restrictors 241 that restrict the flow rate of air that flows in/out of the gap between the membrane 202 of single conductor ECA2B1 and the substrate 230. Air flow restrictors 241 may be designed to decrease the size of an air channel 240 for the air to flow in/out of the gap. Alternatively or additionally, air flow restrictors 241 may increase the length of the air channel 240 for the air to flow in/out of the gap. For example, air flow restrictors 241 may be so fabricated or patterned that it comprises an insert 242 into a groove 243, which not only decreases the size of an air channel 240, but also increases the length of the air channel 240. Air flow restrictors 241 may function as a structure for preventing air leakage in the microphone of the invention. In MEMS microphones, a deep slot may be etched and, patterned on the substrate around the edge of square membrane of conductor ECA2B1. Then, an insert/wall 242 connected to (or extended from) the square membrane is deposited to form a long and narrow air tube 240, which gives a large acoustic resistance.

Movable Composite Conductor with Stationary Single Conductor

Figure 18:
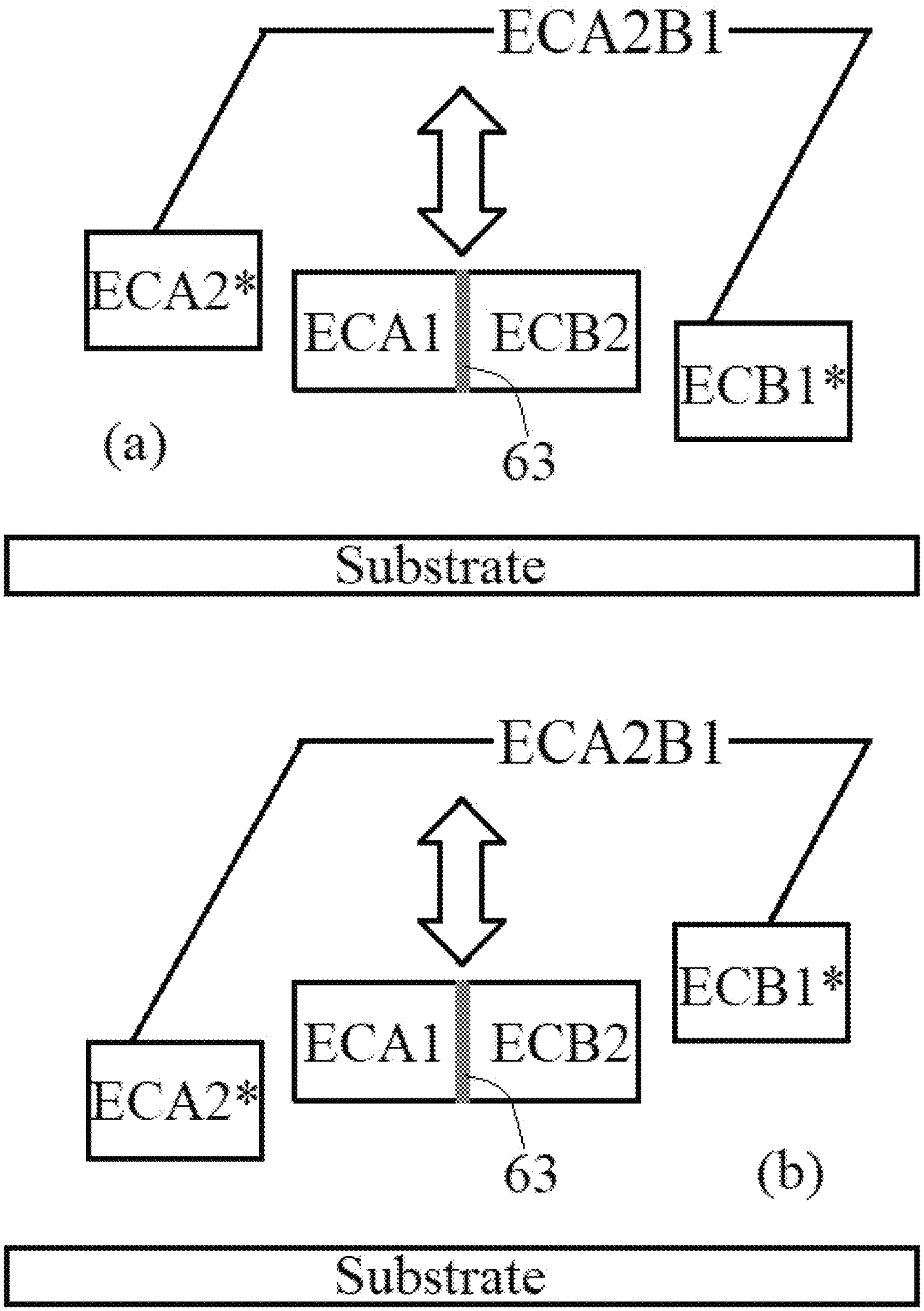
FIG. 18 schematically shows a moveable composite conductor with "Even Height" formed from the first lateral mode capacitor and the second lateral mode capacitor (which remain electrically separated) in accordance with an exemplary embodiment of the present invention.

In some other embodiments, a moveable composite conductor with "Even Height" or "Uneven Height" may be fabricated from the first lateral mode capacitor and the second lateral mode capacitor (which remain electrically separated). As shown in FIGS. 18-19, single conductor ECA2B1 may be so fabricated or patterned that it is fixed relative to the substrate 230. Conductors ECA1 and ECB2 may be so fabricated or patterned that they are electrically separated but physically combined (e.g. using an electrical insulator 63 between ECA1 and ECB2) into a composite conductor ECA1B2 that includes a membrane movable relative to the substrate, and the common primary direction is perpendicular to the membrane plane. Conductor ECA1 in the composite conductor ECA1B2 may be so fabricated or patterned that it includes a flat layer in parallel to the substrate 230 and having a thickness ECA1*t* and a height ECA1*h* along the primary direction as measured from the substrate 230. Similarly, conductor ECB2 in the composite conductor ECA1B2 may be so fabricated or patterned that it includes a flat layer in parallel to the substrate 230 and having a thickness ECB2*t* and a height ECB2*h* along the primary direction as measured from the same substrate. Single conductor (electrically speaking) ECA2B1 may be so fabricated or patterned that it comprises a portion ECA2* facing conductor ECA1, and portion ECA2* may be so fabricated or patterned that it comprises a flat layer in parallel to the substrate and having a thickness ECA2**t* and a height ECA2**h* along the primary direction as measured from the same substrate. Likewise, single conductor ECA2B1 may be so fabricated or patterned that it comprises a portion ECB1* facing conductor ECB2, and portion ECB1* also comprises a flat layer in parallel to the substrate 230 and having a thickness ECB1*t and a height ECB1*h along the primary direction as measured from the same substrate.

In preferred but still exemplary embodiments, thickness ECA1t and thickness ECA2*t are substantially or exactly equal (within ±10% deviation) to each other. Likewise, thickness ECB2t and thickness ECB1*t are substantially equal (within ±10% deviation). Preferably, thickness ECA1t, thickness ECA2*t, thickness ECB2t, and thickness ECB1*t are substantially the same, and are equal to ABt. Height difference ΔAh is defined as height ECA2*h minus (subtract) height ECA1h, ΔAh=ECA2*h−ECA1h. Height difference ΔBh is defined as height ECB2h minus (subtract) height ECB1*h, ΔBh=ECB2h−ECB1*h. ΔAh≠0 such as ΔAh>0 or ΔAh<0, ΔBh≠0 such as ΔBh>0 or ΔBh<0, but ΔAh=ΔBh. In more preferred embodiments, the absolute values of ΔAh and ΔBh are about one third of ABt, |ΔAh|≈|ΔBh|≈⅓ABt or |ΔAh|=|ΔBh|=⅓ABt.

In specific embodiments as shown in FIG. 18, height ECA1h=height ECB2h. In the upper panel (a) of FIG. 18, ΔAh>0, ΔBh>0, and ΔAh=ΔBh. In the lower panel (b) of FIG. 18, ΔAh<0, ΔBh<0, and ΔAh=ΔBh. In other specific embodiments as shown in FIG. 19, height ECA2*h=height ECB1*h. In the upper panel (a) of FIG. 19, ΔAh>0, ΔBh>0, and ΔAh=ΔBh. In the lower panel (b) of FIG. 19, ΔAh<0, ΔBh<0, and ΔAh=ΔBh.

Figure 20:
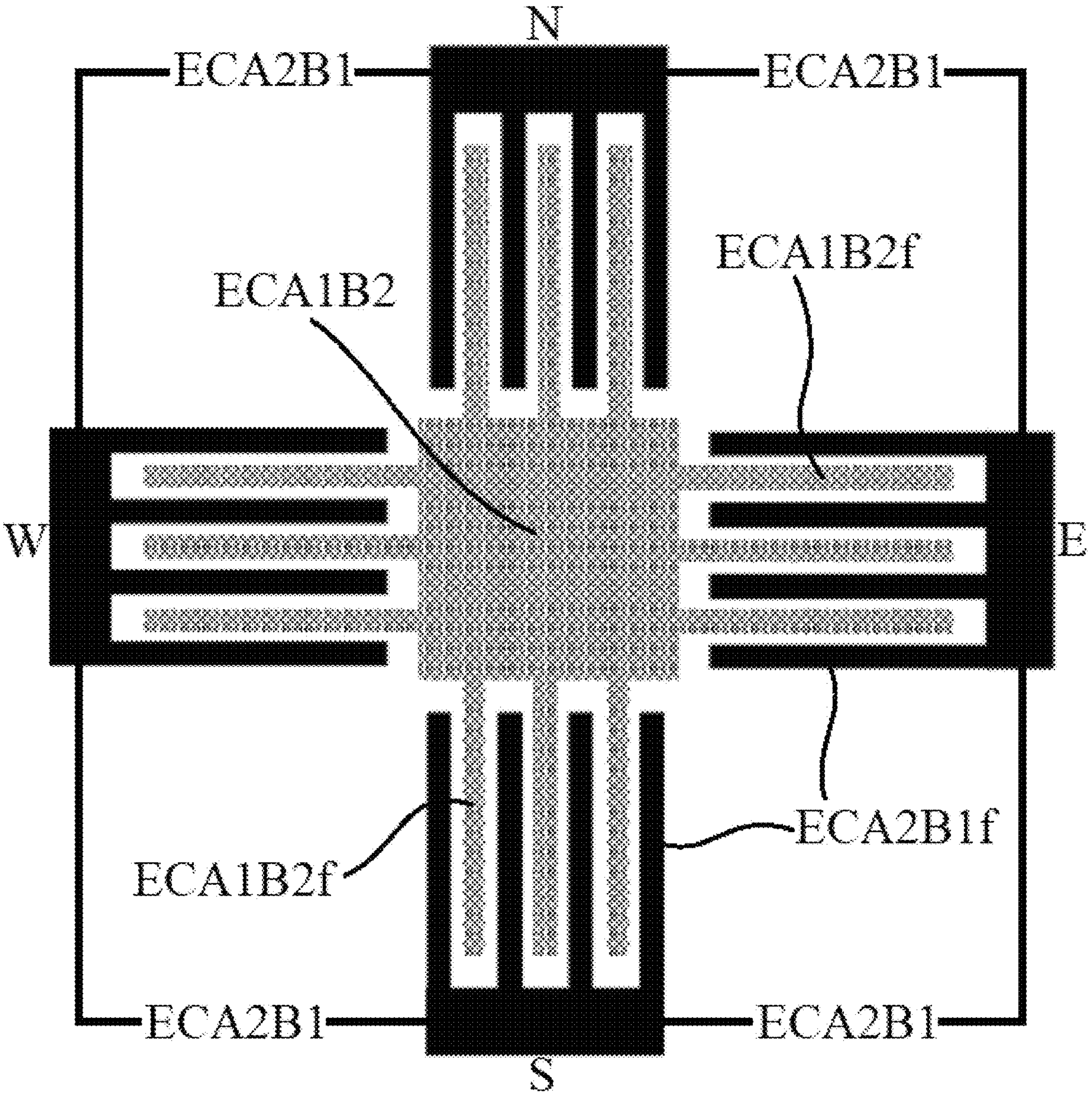
FIG. 20 is the top view of the general configuration as shown in FIGS. 18 and 19 combined with comb fingers as shown in FIG. 6 in accordance with an exemplary embodiment of the present invention.

While FIG. 20 is the top view of the general configuration as shown in FIGS. 18 and 19 combined with comb fingers as shown in FIG. 6, FIGS. 21-31 show some specific examples of such configuration. Referring to FIG. 20, single conductor ECA2B1 may be so fabricated or patterned that it comprises a set of comb fingers ECA2B1f. Portion ECA2* of single conductor ECA2B1 may be so fabricated or patterned that it comprises a set of comb fingers ECA2*f. Portion ECB1* of single conductor ECA2B1 comprises a set of comb fingers ECB1*f. The movable membrane of composite conductor ECA1B2 comprises a set of comb fingers ECA1B2f around the peripheral region of the membrane. Comb fingers ECA2*f and comb fingers ECB1*f are interleaved into comb fingers ECA1B2f. As described above, single conductor ECA2B1 comprises a portion ECA2* (not shown) facing conductor ECA1 and another portion ECB1* (not shown) facing conductor ECB2. Comb fingers ECA1B2f are laterally movable relative to both comb fingers ECA2*f and comb fingers ECB1*f, and the resistance from air located within a gap between the membrane and the substrate is lowered.

The movable membrane of composite conductor ECA1B2 may be so fabricated or patterned that it is square shaped as shown in FIG. 20. However, it is contemplated that the movable membrane of composite conductor ECA1B2 may have a shape of circle, triangle, hexagon, and octagon etc. In preferred embodiments, comb fingers ECA1B2f, comb fingers ECA2*f, and comb fingers ECB1*f may be so fabricated or patterned that they have identical shape, dimension, and spatial arrangement. The movable membrane of composite conductor ECA1B2 may be so fabricated or patterned that it is attached to the substrate via three or more suspensions such as four suspensions (like suspensions 202S as shown in FIG. 5); and each suspension may be so fabricated or patterned that it includes folded and symmetrical cantilevers.

As shown in FIG. 20, the square-shaped movable membrane of composite conductor ECA1B2 may face or overlap four electrically connected electrode banks N, S, E and W.

Comb fingers extended from four sides of conductor ECA1B2 are interleaved into comb fingers extended from banks N, S, E and W.

Figure 21:
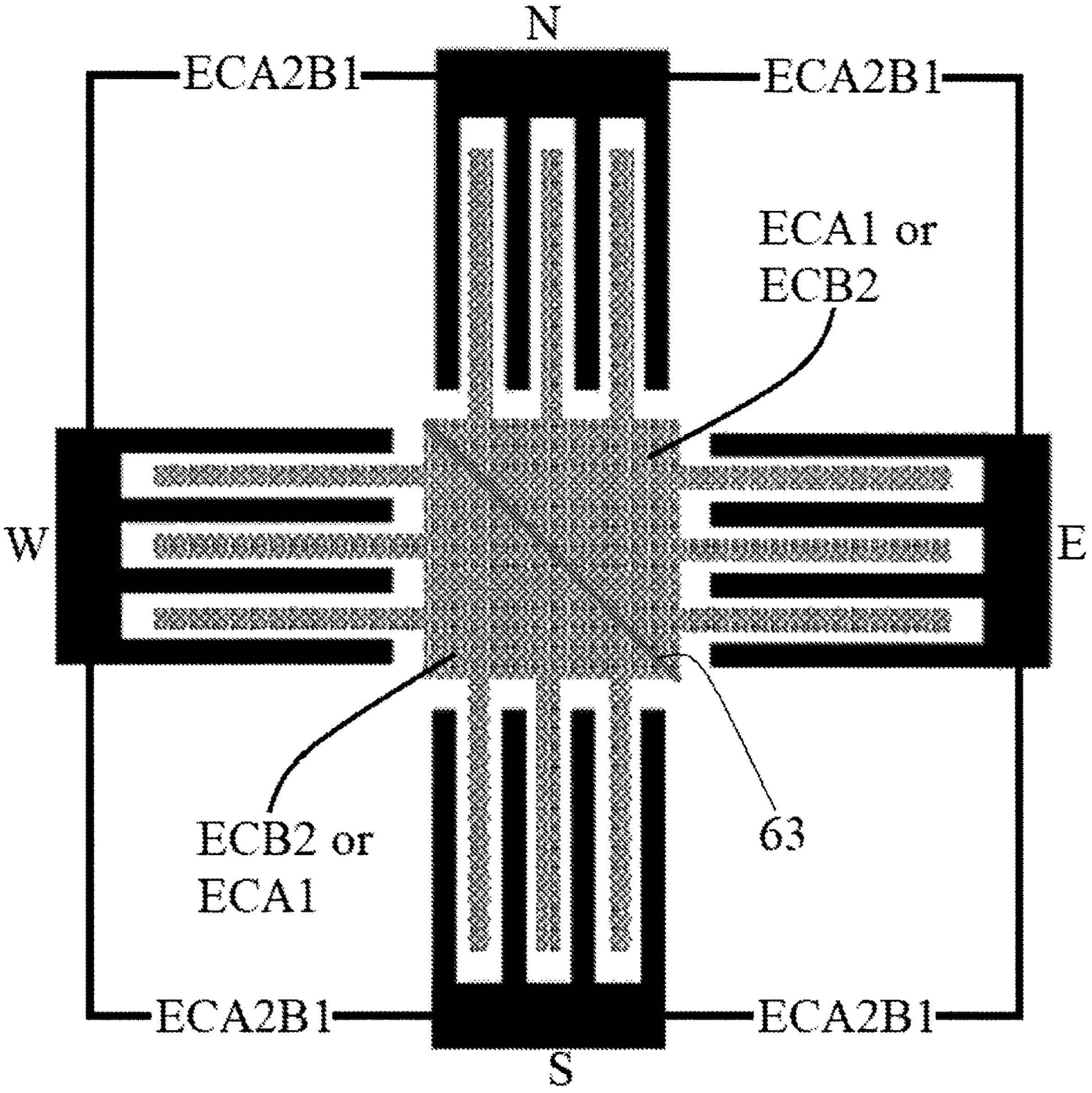
FIG. 21 is the top view of a first specific example of the general configuration as shown in FIG. 20 in accordance with an exemplary embodiment of the present invention.
Figure 22:
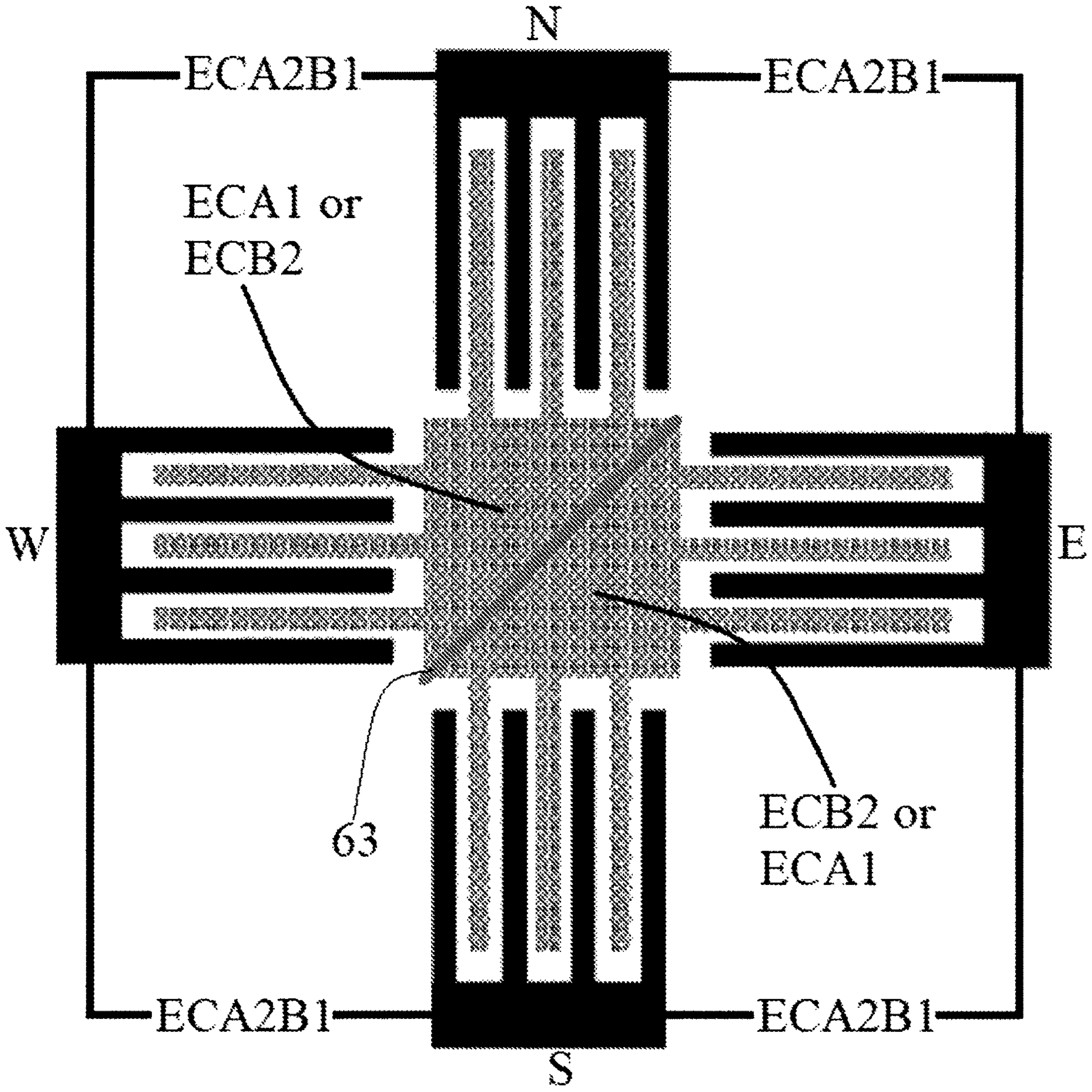
FIG. 22 is the top view of a second specific example of the general configuration as shown in FIG. 20 in accordance with an exemplary embodiment of the present invention.
Figure 23:
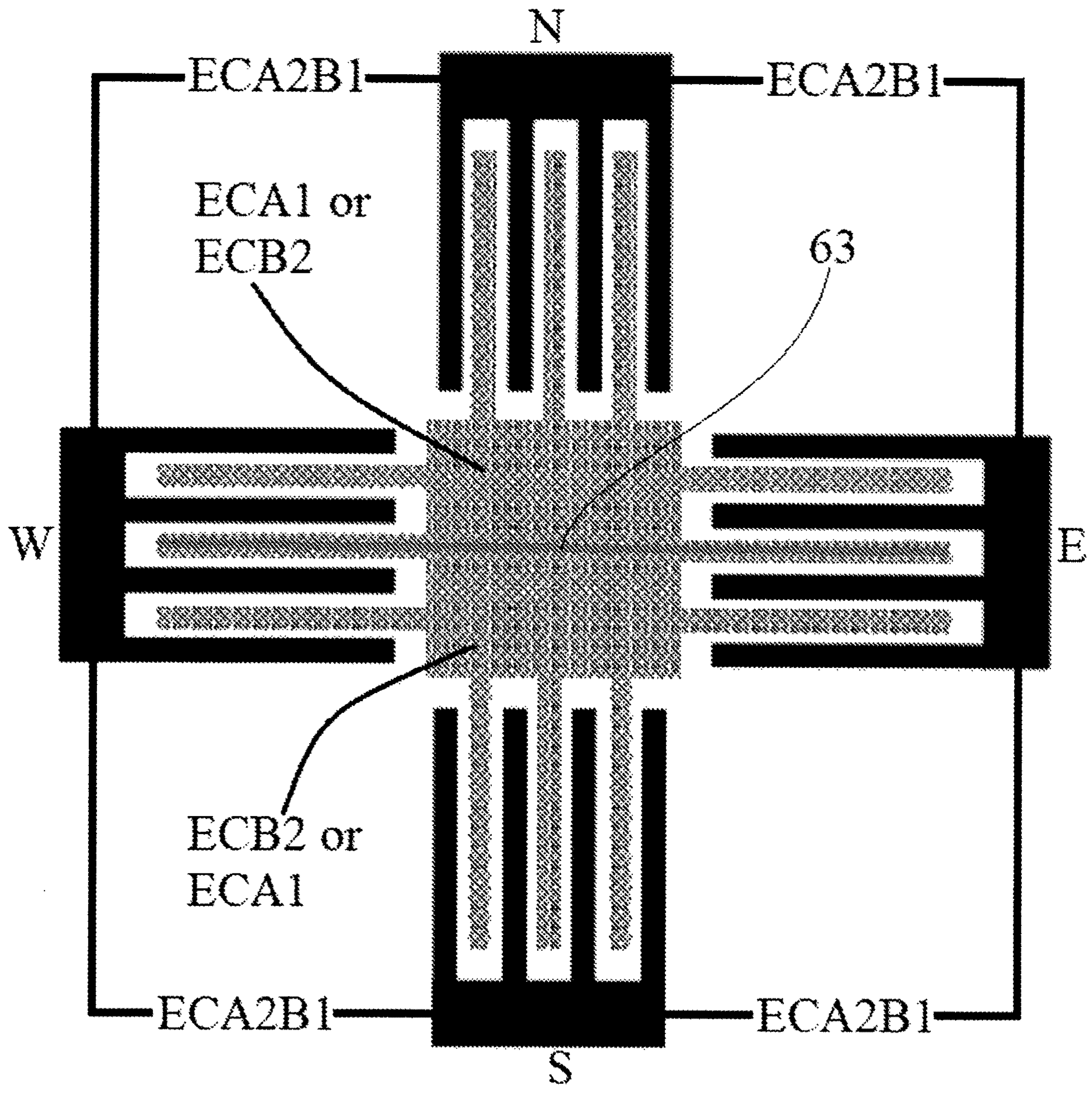
FIG. 23 is the top view of a third specific example of the general configuration as shown in FIG. 20 in accordance with an exemplary embodiment of the present invention.
Figure 24:
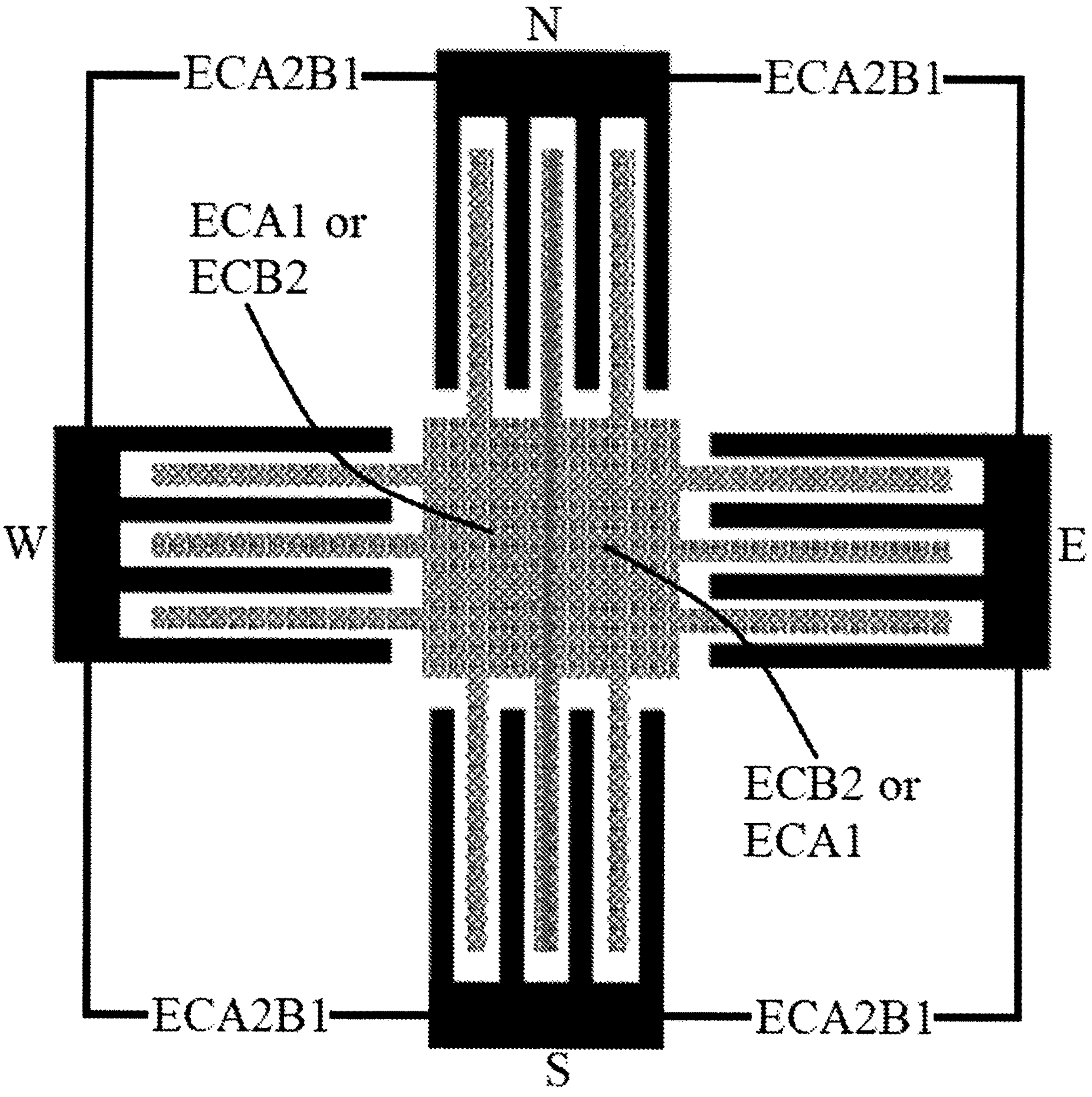
FIG. 24 is the top view of a fourth specific example of the general configuration as shown in FIG. 20 in accordance with an exemplary embodiment of the present invention.

Composite conductor ECA1B2 may be electrically divided into two electrodes ECA1 and ECB1 in any suitable way; for example, using an electrical insulator 63 between ECA1 and ECB2. As shown in FIGS. 21 and 22, an electrical insulator 63 along a diagonal line (either forward or backward) of the square-shaped membrane of composite conductor ECA1B2 can generate a pair of electrical conductors ECA1 and ECB2 located on two sides of the diagonal line, respectively. As shown in FIG. 23, an electrical insulator 63 along a horizontal middle line of the square-shaped membrane of composite conductor ECA1B2 can generate a pair of electrical conductors ECA1 and ECB2 located on two sides (above and below) of the horizontal middle line, respectively. As shown in FIG. 24, an electrical insulator 63 along a vertical middle line of the square-shaped membrane of composite conductor ECA1B2 can generate a pair of electrical conductors ECA1 and ECB2 located on two sides (right and left) of the vertical middle line, respectively.

Figure 25:
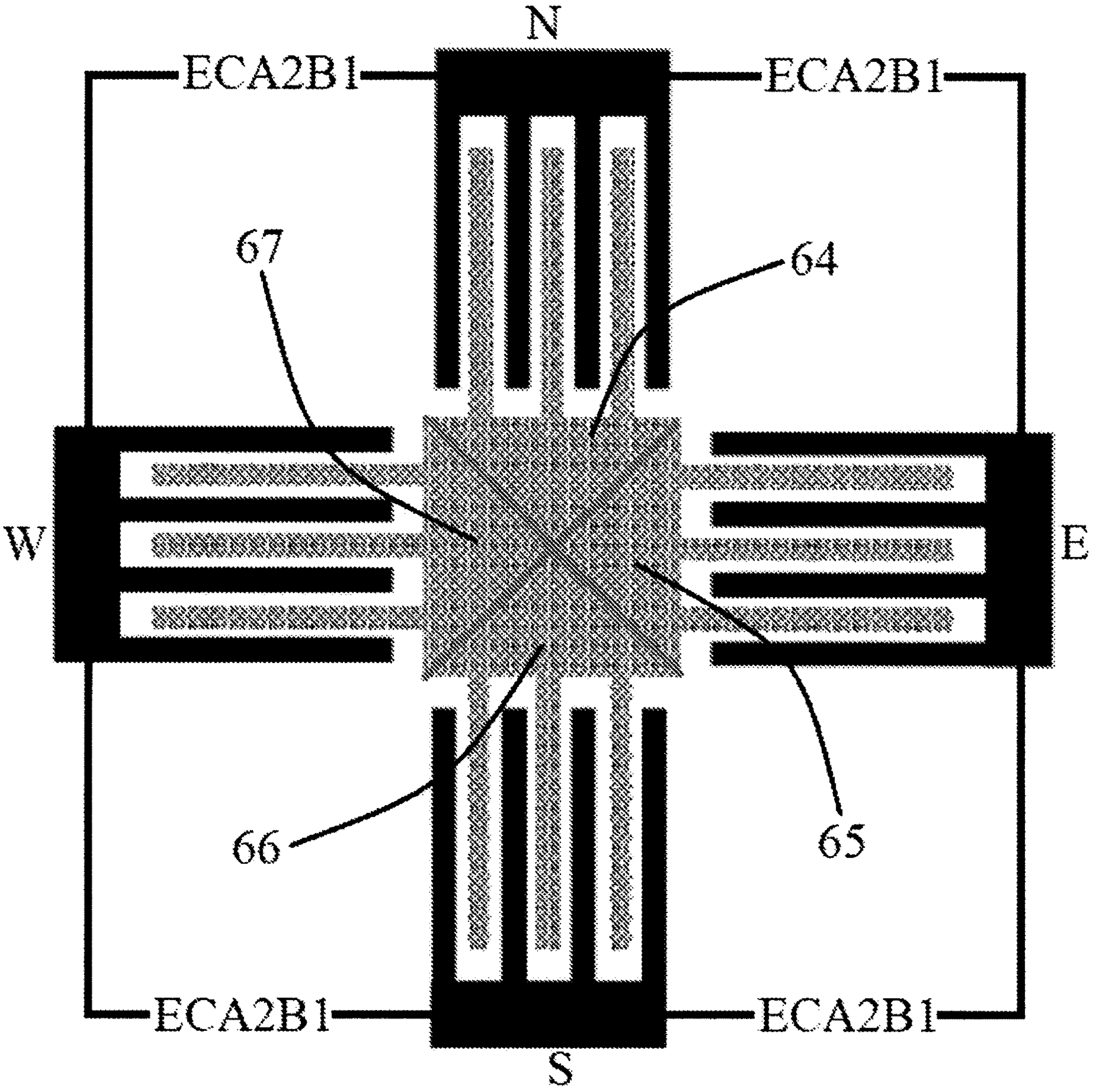
FIG. 25 is the top view of a fifth specific example of the general configuration as shown in FIG. 20 in accordance with an exemplary embodiment of the present invention.

As shown in FIG. 25, an electrical insulator 63 along both diagonal lines of the square-shaped membrane of composite conductor ECA1B2 can generate four sub-conductors 64, 65, 66 and 67. Sub-conductors 64 and 66 may be electrically connected and they together constitute one of electrical conductors ECA1 and ECB2 Sub-conductors 65 and 67 may be electrically connected and they together constitute another one of electrical conductors ECA1 and ECB2.

Figure 26:
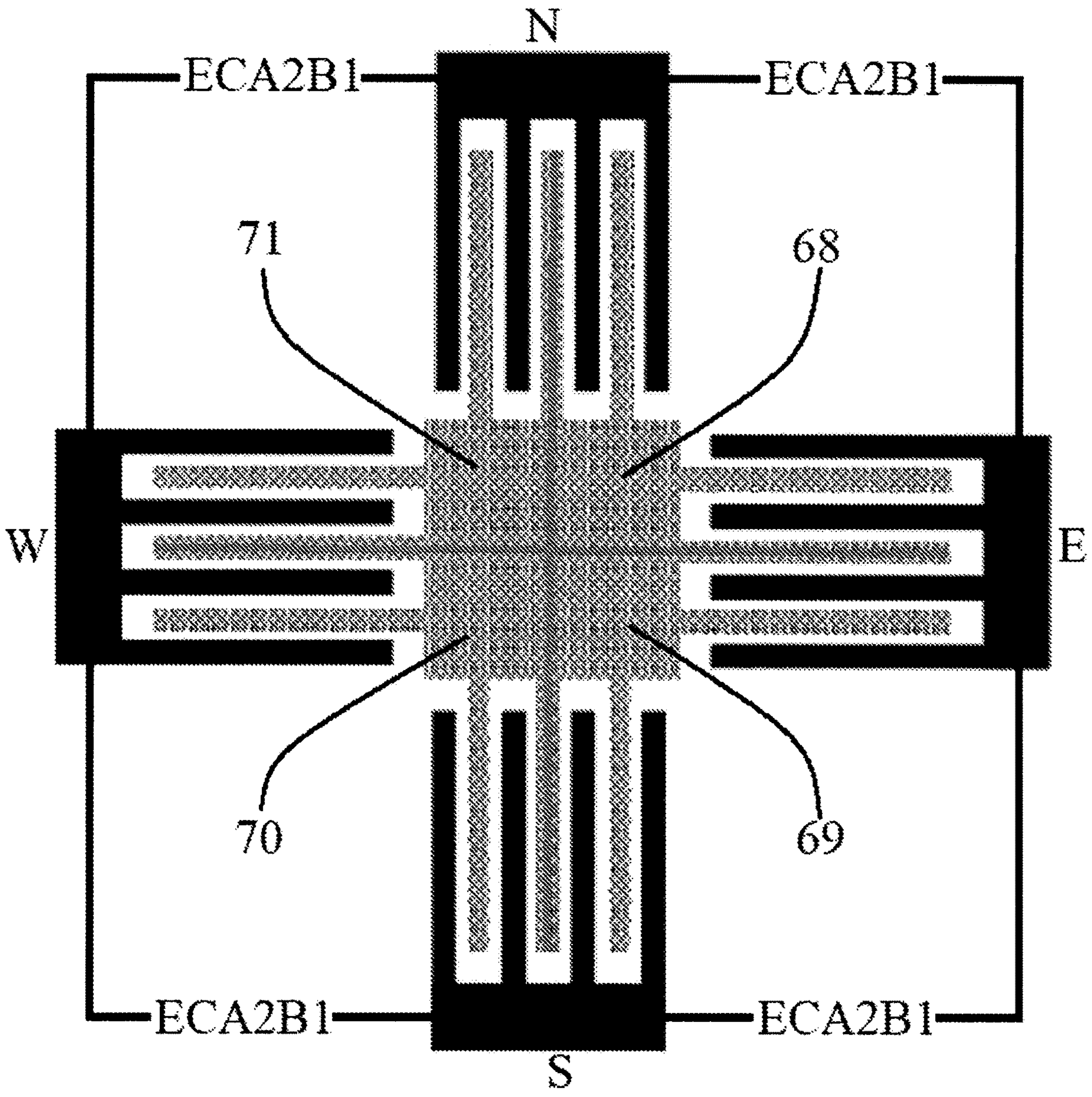
FIG. 26 is the top view of a sixth specific example of the general configuration as shown in FIG. 20 in accordance with an exemplary embodiment of the present invention.

As shown in FIG. 26, an electrical insulator 63 along both vertical middle line and horizontal middle line of the square-shaped membrane of composite conductor ECA1B2 can generate four sub-conductors 68, 69, 70 and 71. Sub-conductors 68 and 70 may be electrically connected and they together constitute one of electrical conductors ECA1 and ECB2. Sub-conductors 69 and 71 may be electrically connected and they together constitute another one of electrical conductors ECA1 and ECB2.

Figure 27:
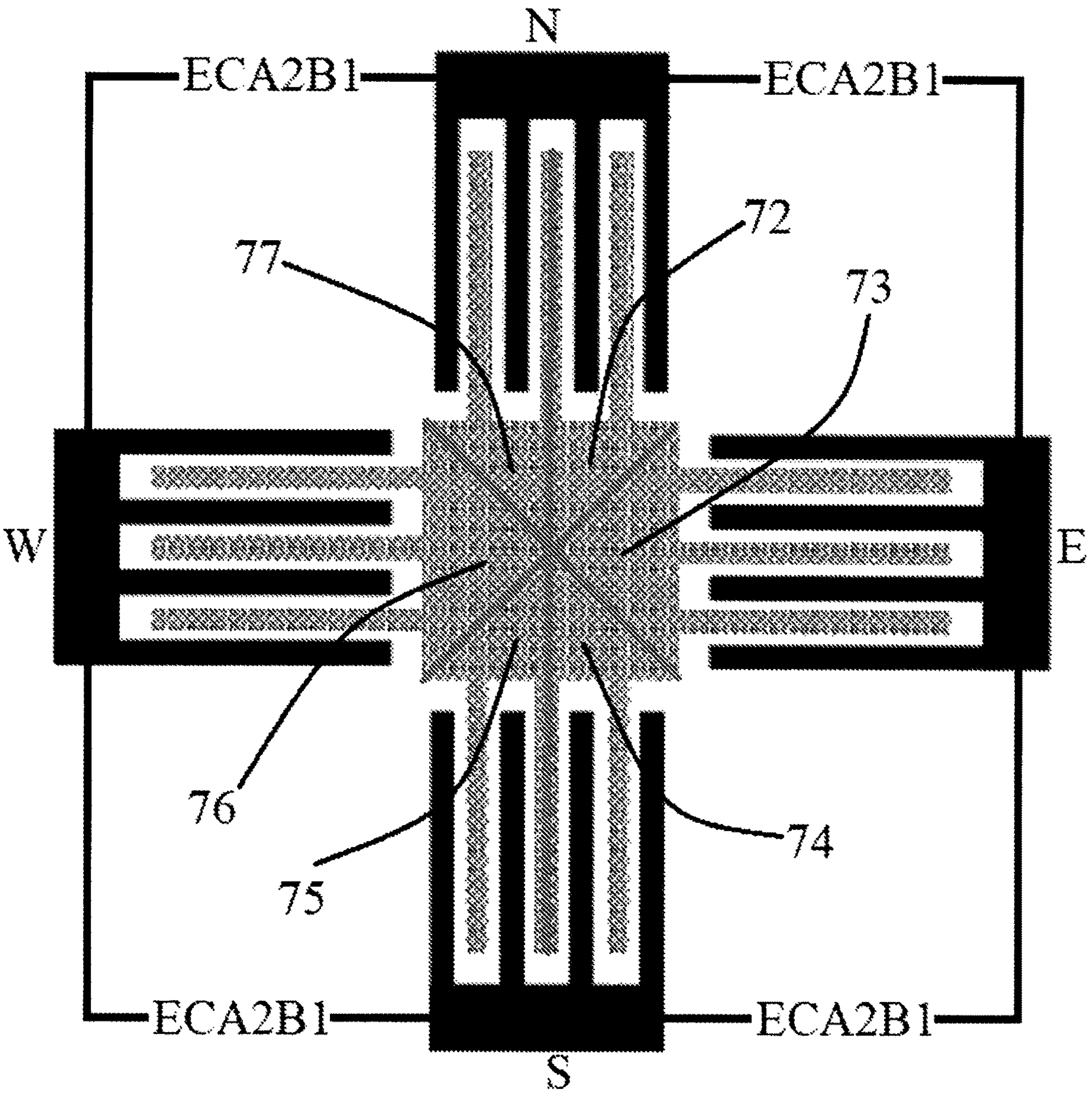
FIG. 27 is the top view of a seventh specific example of the general configuration as shown in FIG. 20 in accordance with an exemplary embodiment of the present invention.

As shown in FIG. 27, an electrical insulator 63 along both diagonal lines and the vertical middle line of the square-shaped membrane of composite conductor ECA1B2 can generate six sub-conductors 72, 73, 74, 75, 76 and 77. Sub-conductors 73, 72 and 75 may be electrically connected and they together constitute one of electrical conductors ECA1 and ECB2. Sub-conductors 76, 77 and 74 may be electrically connected and they together constitute another one of electrical conductors ECA1 and ECB2. An electrical insulator 63 along both diagonal lines and the horizontal middle line will generate similar sub-conductor combinations, which will be omitted here.

Figure 28:
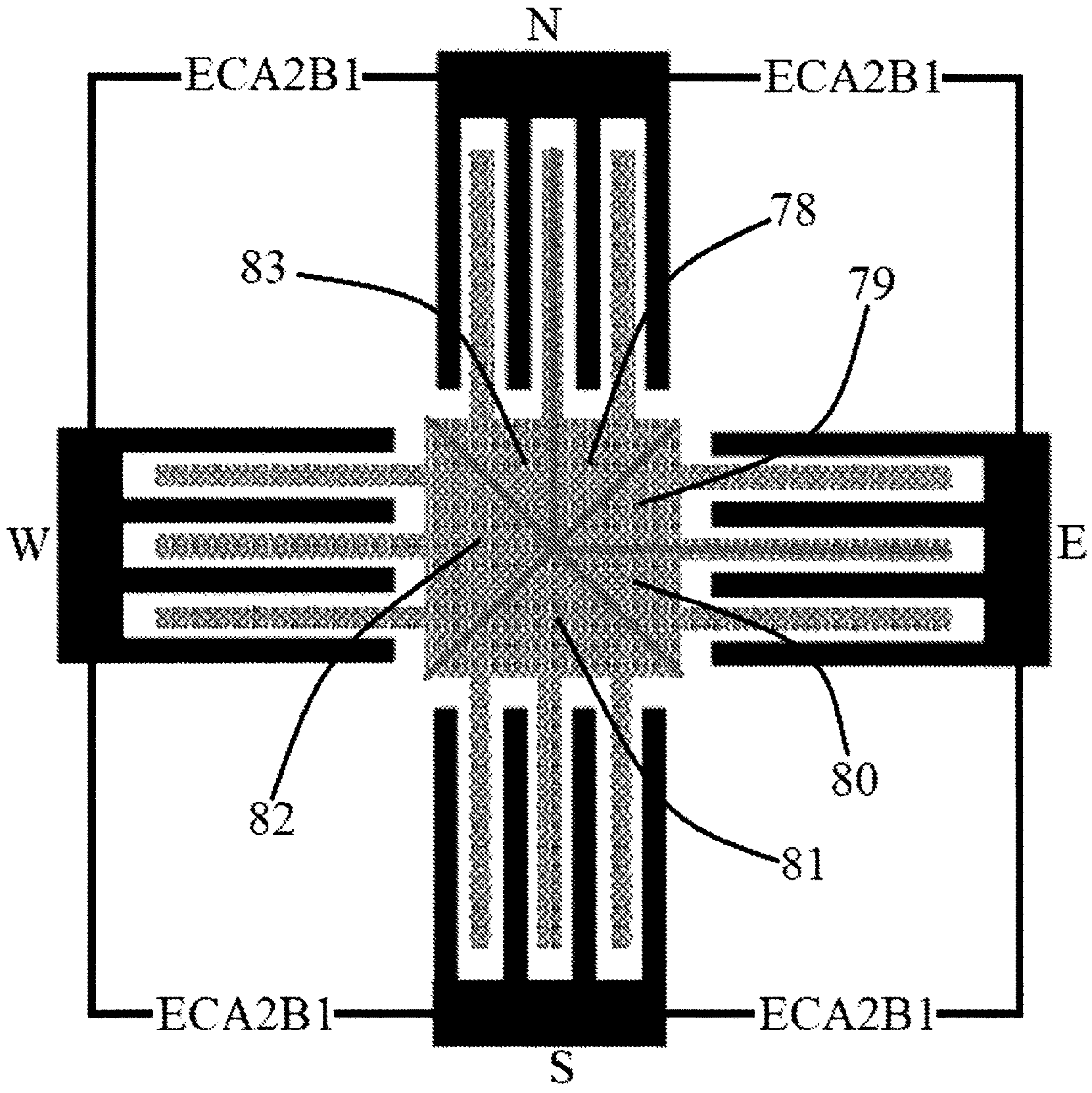
FIG. 28 is the top view of an eighth specific example of the general configuration as shown in FIG. 20 in accordance with an exemplary embodiment of the present invention.

As shown in FIG. 28, an electrical insulator 63 along both full diagonal lines, a half of the vertical middle line, and a half of the horizontal middle line of the square-shaped membrane of composite conductor ECA1B2 can generate six sub-conductors 78, 79, 80, 81, 82 and 83 Sub-conductors 81, 80 and 78 may be electrically connected and they together constitute one of electrical conductors ECA1 and ECB2; and the rest 3 sub-conductors may be electrically connected and they together constitute another one of electrical conductors ECA1 and ECB2. Alternatively, sub-conductors 81, 80 and 83 may be electrically connected and they together constitute one of electrical conductors ECA1 and ECB2; and the rest 3 sub-conductors may be electrically connected and they together constitute another one of electrical conductors ECA1 and ECB2. Alternatively, sub-conductors 81, 79 and 83 may be electrically connected and they together constitute one of electrical conductors ECA1 and ECB2; and the rest 3 sub-conductors may be electrically connected and they together constitute another one of electrical conductors ECA1 and ECB2. Alternatively, sub-conductors 81, 79 and 78 may be electrically connected and they together constitute one of electrical conductors ECA1 and ECB2, and the rest 3 sub-conductors may be electrically connected and they together constitute another one of electrical conductors ECA1 and ECB2.

Figure 29:
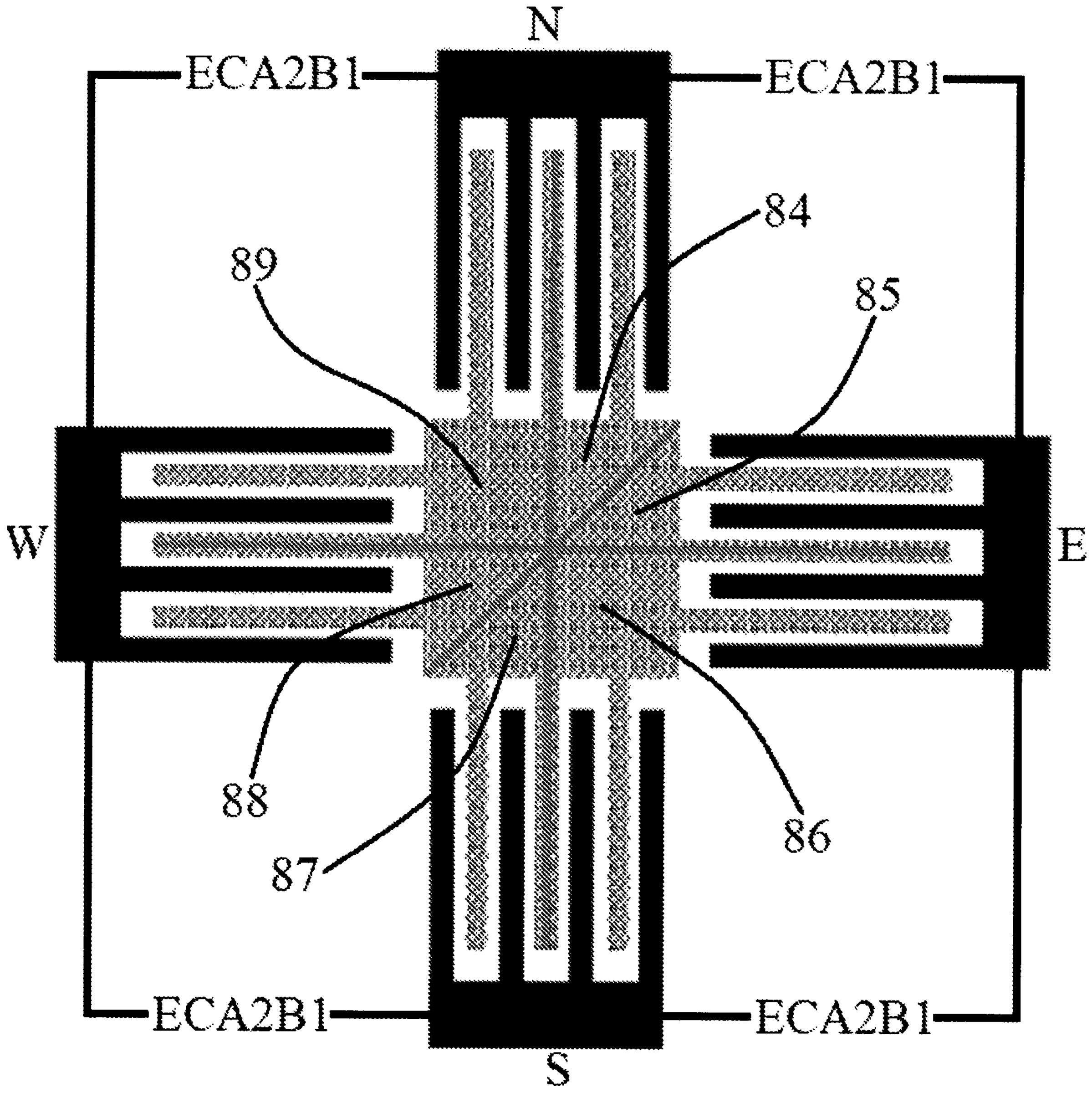
FIG. 29 is the top view of a ninth specific example of the general configuration as shown in FIG. 20 in accordance with an exemplary embodiment of the present invention.

As shown in FIG. 29, an electrical insulator 63 along the full "forward" diagonal line, the full vertical middle line, and the full horizontal middle line of the square-shaped membrane of composite conductor ECA1B2 can generate six sub-conductors 84-89. Sub-conductors 86, 87 and 84 may be electrically connected and they together constitute one of electrical conductors ECA1 and ECB2, and the rest 3 sub-conductors may be electrically connected and they together constitute another one of electrical conductors ECA1 and ECB2. Alternatively, sub-conductors 86, 85 and 88 may be electrically connected and they together constitute one of electrical conductors ECA1 and ECB2; and the rest 3 sub-conductors may be electrically connected and they together constitute another one of electrical conductors ECA1 and ECB2. An electrical insulator 63 along the full "backward" diagonal line, the full vertical middle line, and the full horizontal middle line will generate similar sub-conductor combinations, which will be omitted here.

Figure 30:
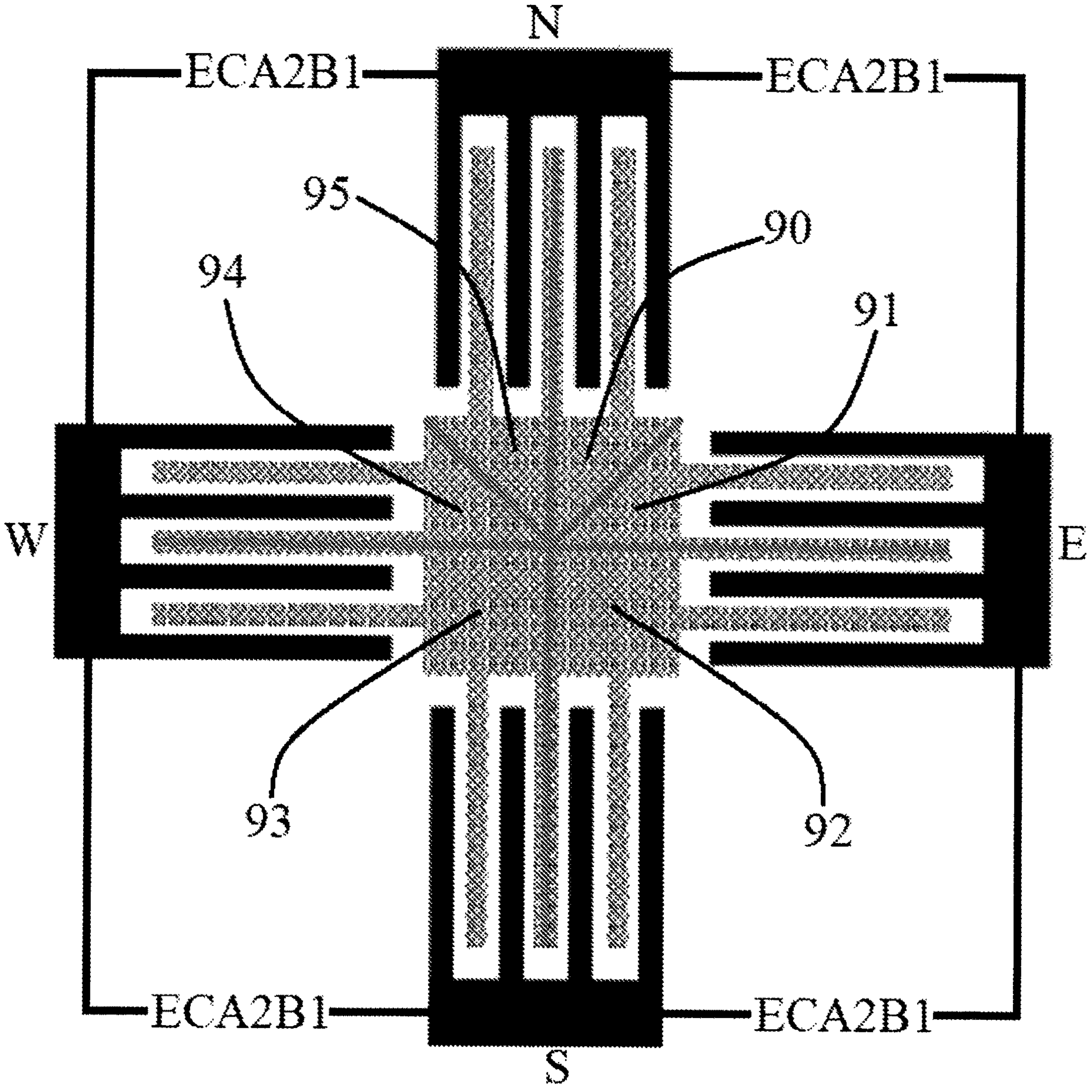
FIG. 30 is the top view of a tenth specific example of the general configuration as shown in FIG. 20 in accordance with an exemplary embodiment of the present invention.

As shown in FIG. 30, an electrical insulator 63 along a half of the "forward" diagonal line, a half of the "backward" diagonal line, the full vertical middle line, and the full horizontal middle line of the square-shaped membrane of composite conductor ECA1B2 can generate six sub-conductors 90-95. Sub-conductors 92, 91 and 94 may be electrically connected and they together constitute one of electrical conductors ECA1 and ECB2; and the rest 3 sub-conductors may be electrically connected and they together constitute another one of electrical conductors ECA1 and ECB2. Alternatively, sub-conductors 92, 91 and 95 may be electrically connected and they together constitute one of electrical conductors ECA1 and ECB2; and the rest 3 sub-conductors may be electrically connected and they together constitute another one of electrical conductors ECA1 and ECB2. Alternatively, sub-conductors 92, 90 and 94 may be electrically connected and they together constitute one of electrical conductors ECA1 and ECB2; and the rest 3 sub-conductors may be electrically connected and they together constitute another one of electrical conductors ECA1 and ECB2. Alternatively, sub-conductors 92, 90 and 95 may be electrically connected and they together constitute one of electrical conductors ECA1 and ECB2; and the rest 3 sub-conductors may be electrically connected and they together constitute another one of electrical conductors ECA1 and ECB2.

Figure 31:
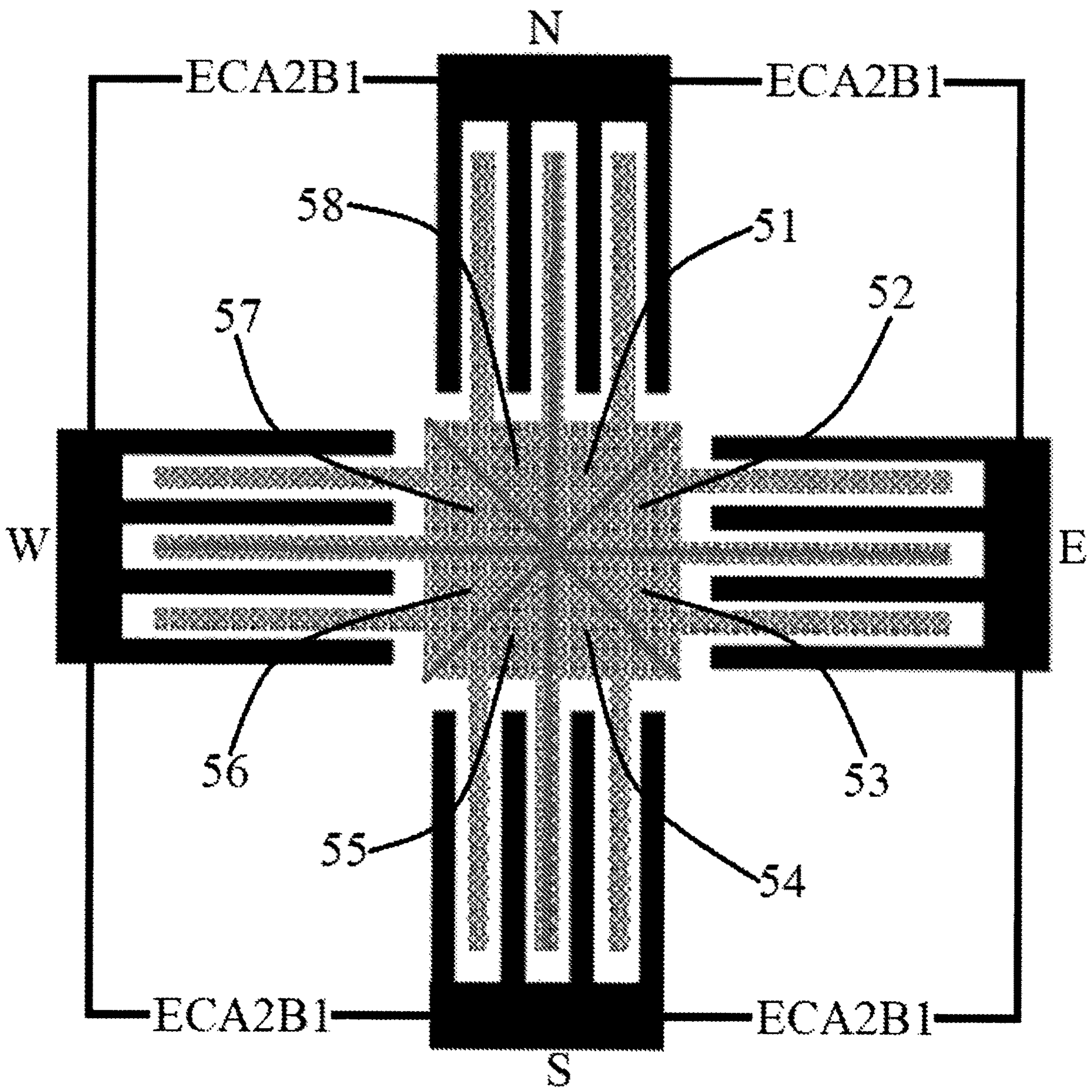
FIG. 31 is the top view of an eleventh specific example of the general configuration as shown in FIG. 20 in accordance with an exemplary embodiment of the present invention.

As shown in FIG. 31, an electrical insulator 63 along the full "forward" diagonal line, the full "backward" diagonal line, the full vertical middle line, and the full horizontal middle line of the square-shaped membrane of composite conductor ECA1B2 can generate eight sub-conductors 51-58. In theory, any four of sub-conductors 51-58 may be electrically connected and they together constitute one of electrical conductors ECA1 and ECB2; and the rest 4 sub-conductors may be electrically connected and they together constitute another one of electrical conductors ECA1 and ECB2. In preferred embodiments, sub-conductors 51, 53, 55 and 57 may be electrically connected and they together constitute one of electrical conductors ECA1 and ECB2; and the rest 4 sub-conductors 52, 54, 56 and 68 may be electrically connected and they together constitute another one of electrical conductors ECA1 and ECB2.

Figure 32:
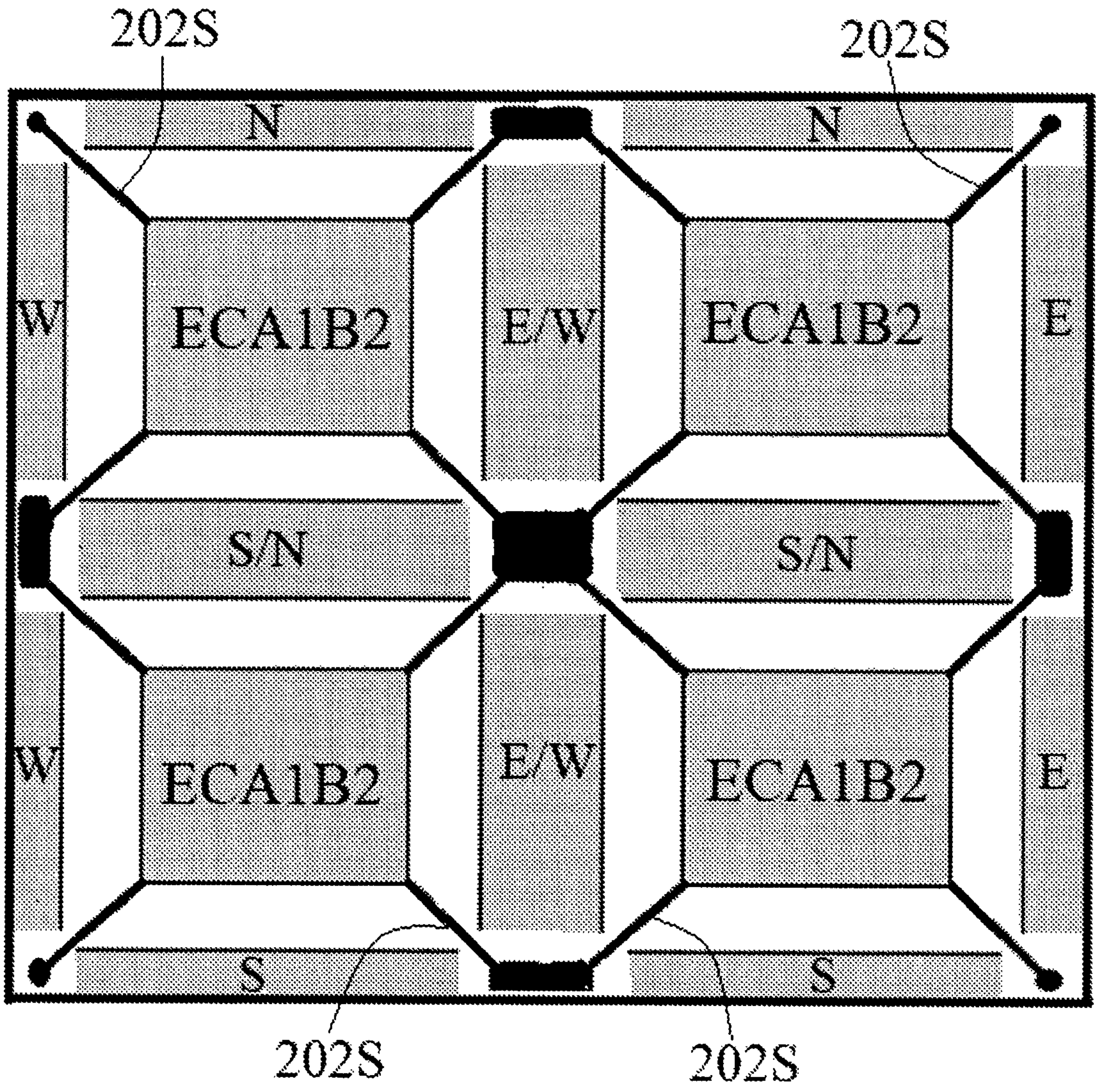
FIG. 32 shows that four movable composite conductors as shown in FIGS. 20-31 are arranged in a 2×2 array configuration in accordance with an exemplary embodiment of the present invention.

The capacitive microphone of the invention may be so fabricated or patterned that it includes one or more movable membranes of composite conductor ECA1B2. For example, four movable membranes of composite conductor ECA1B2 can be arranged in a 2×2 array configuration. As shown in FIG. 32, four movable composite conductors as shown in FIGS. 20-31 may be arranged in a 2×2 array configuration.

Figure 33:
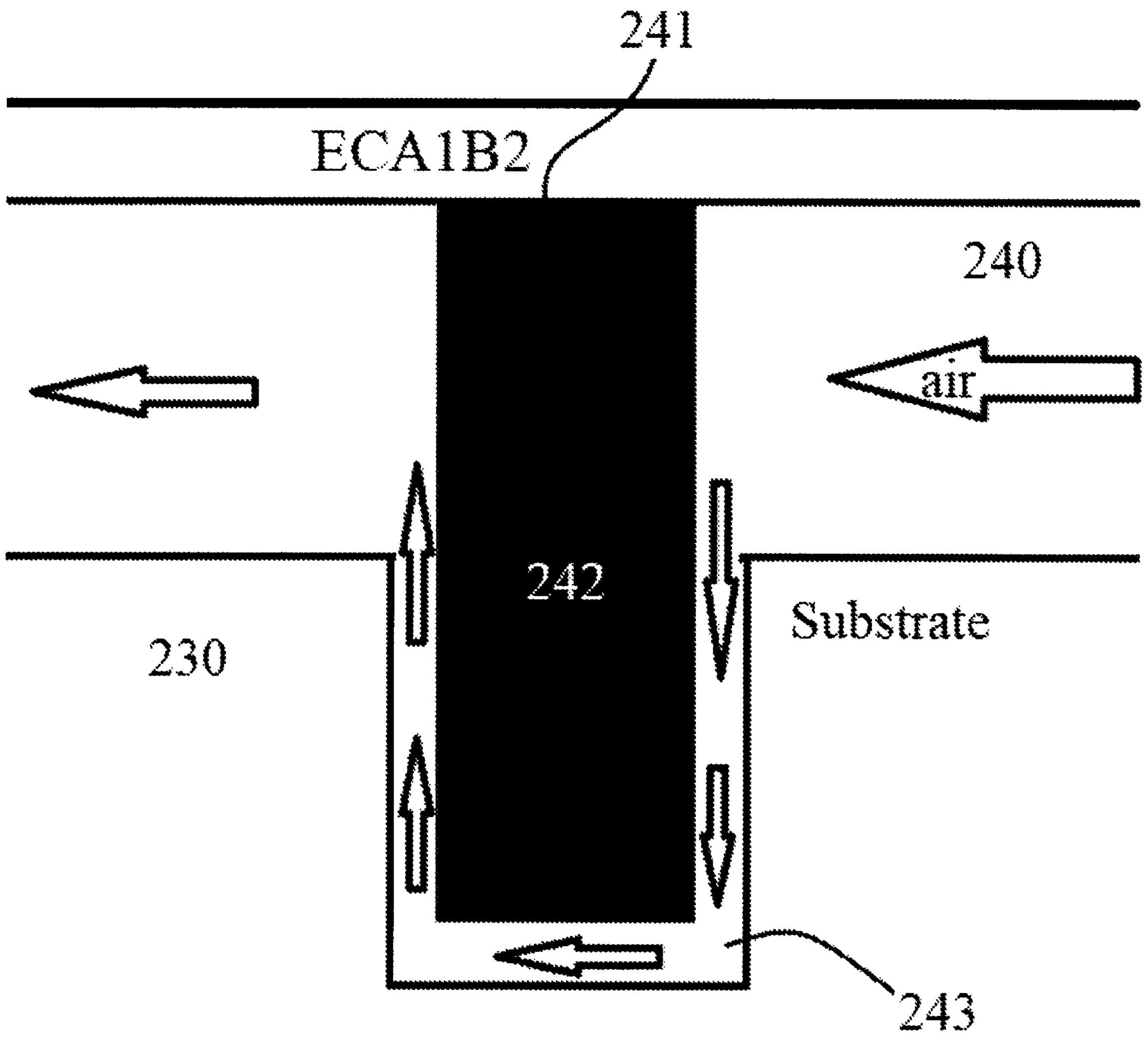
FIG. 33 demonstrates the design of one air flow restrictor between the substrate and the movable composite conductors as shown in FIGS. 20-31 in accordance with an exemplary embodiment of the present invention.
Figure 34:
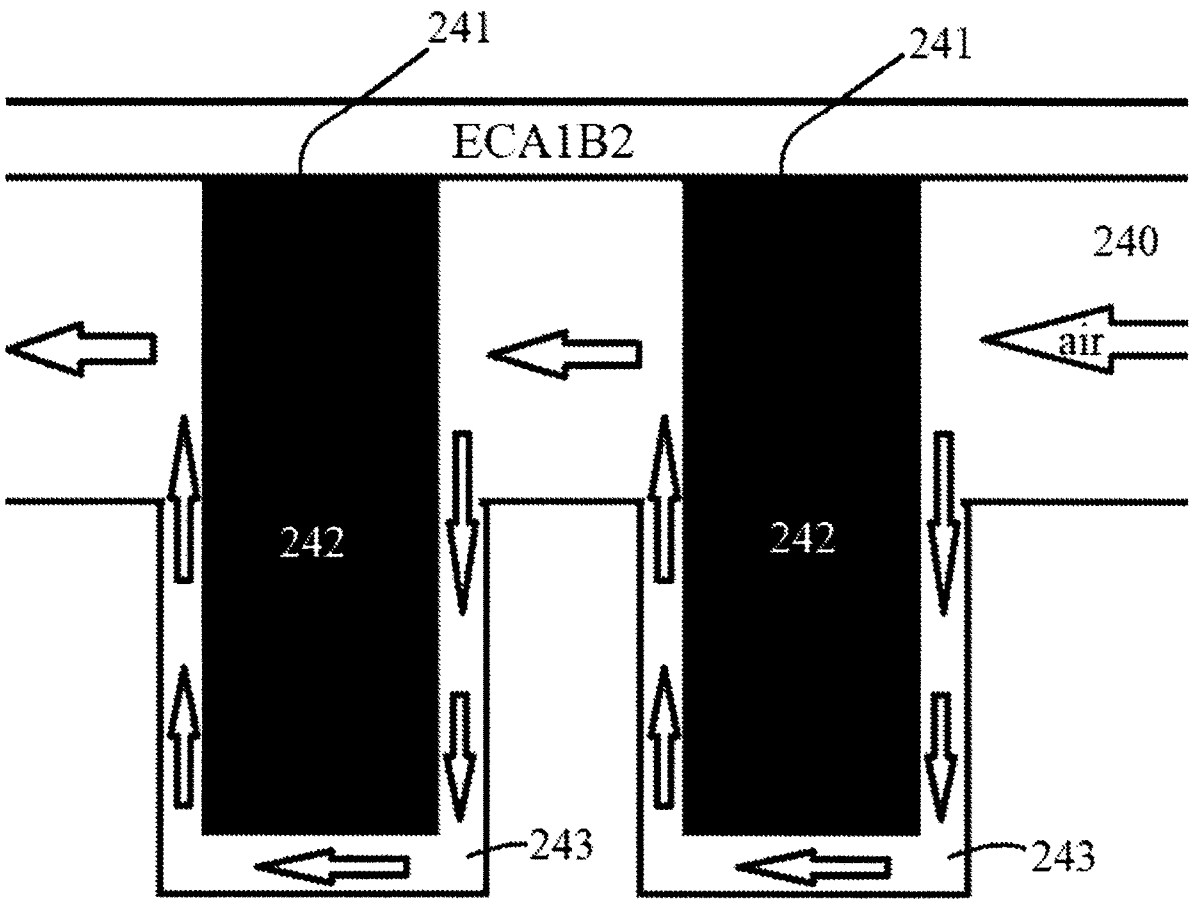
FIG. 34 demonstrates the design of two serial and co-centered flow restrictors between the substrate and the movable composite conductors as shown in FIGS. 20-31 in accordance with an exemplary embodiment of the present invention.

Leakage is often an issue in microphone design. In conventional parallel plate design as shown in FIG. 1A, it typically has a couple of tiny holes around the edge in order to let air go through slowly, to keep air pressure balance on both sides of membrane 101 in low frequency. That is a desired leakage. However, a large leakage is undesired, because it will let some low frequency sound wave escape away from membrane vibration easily via the holes, and will result in a sensitivity drop in low frequency. In some embodiments as shown in FIGS. 33 and 34, the capacitive microphone of the invention may be so fabricated or patterned that it comprises one, two or more air flow restrictors 241 that restrict the flow rate of air that flows in/out of the gap between the membrane 202 of composite conductor ECA1B2 and the substrate 230. Air flow restrictors 241 may be designed to decrease the size of an air channel 240 for the air to flow in/out of the gap. Alternatively or additionally, air flow restrictors 241 may increase the length of the air channel 240 for the air to flow in/out of the gap. For example, air flow restrictors 241 may comprise an insert 242 into a groove 243, which not only decreases the size of an air channel 240, but also increases the length of the air channel 240. Air flow restrictors 241 may function as a structure for preventing air leakage in the microphone of the invention. In MEMS microphones, a deep slot may be etched on substrate around the edge of square membrane of composite conductor ECA1B2. Then, an insert/wall 242 connected to (or extended from) the square membrane is deposited to form a long and narrow air tube 240, which gives a large acoustic resistance.

In various exemplary embodiments, the capacitive microphone of the invention is a MEMS microphone, in which conductors ECA1, ECA2, ECB1 and ECB2 are independently of each other made of polysilicon, gold, silver, nickel, aluminum, copper, chromium, titanium, tungsten, or platinum. Fabrication of the capacitive microphone can be carried out using any methods known in the technical field of micro-electromechanical system (MEMS).

In various embodiments of the invention, the process for fabricating the lateral microphone as described above includes the following steps: (A10) providing a substrate having a planar surface, wherein a primary direction is defined as a direction perpendicular to the planar surface, (B10) depositing at least one removable layer such as a sacrificial layer on the planar surface, (C10) depositing one electrically conductive layer on said at least one removable layer, (D10) dividing the electrically conductive layer into two divided layers, both of which remain in contact with said at least one removable layer and are parallel with the planar surface; and (E10) etching away said at least one removable layer to form a capacitive microphone.

The substrate in the process may be made of silicon. The removable layer may comprise PSG or thermal oxide such as oxides of Si. The electrically conductive layer may comprise polysilicon, silicon, gold, silver, nickel, aluminum, copper, chromium, titanium, tungsten, or platinum. In step (D10), the electrically conductive layer may be divided or cut (e.g. by pattering and etching) into two divided layers, both of which remain in contact with said at least one removable layer. Both layers are substantially parallel to the planar surface. In step (E10), the removable layer is removed or etched away to form a capacitive microphone. In steps (D10) and (E10), the two divided layers become a first electrical conductor and a second electrical conductor in the capacitive microphone. In preferred embodiments, step (D10) may include cutting a first set of comb fingers in the first electrical conductor, and cutting a second set of comb fingers around a peripheral region of the movable membrane.

In exemplary embodiments of the invention, the lateral microphone may be a MEMS (Microelectromechanical System) microphone, AKA chip/silicon microphone. Typically, a pressure-sensitive diaphragm is etched directly into a silicon wafer by MEMS processing techniques, and is usually accompanied with integrated preamplifier. For a digital MEMS microphone, it may include built in analog-to-digital converter (ADC) circuits on the same CMOS chip making the chip a digital microphone and so more readily integrated with digital products.

Figure 35A:
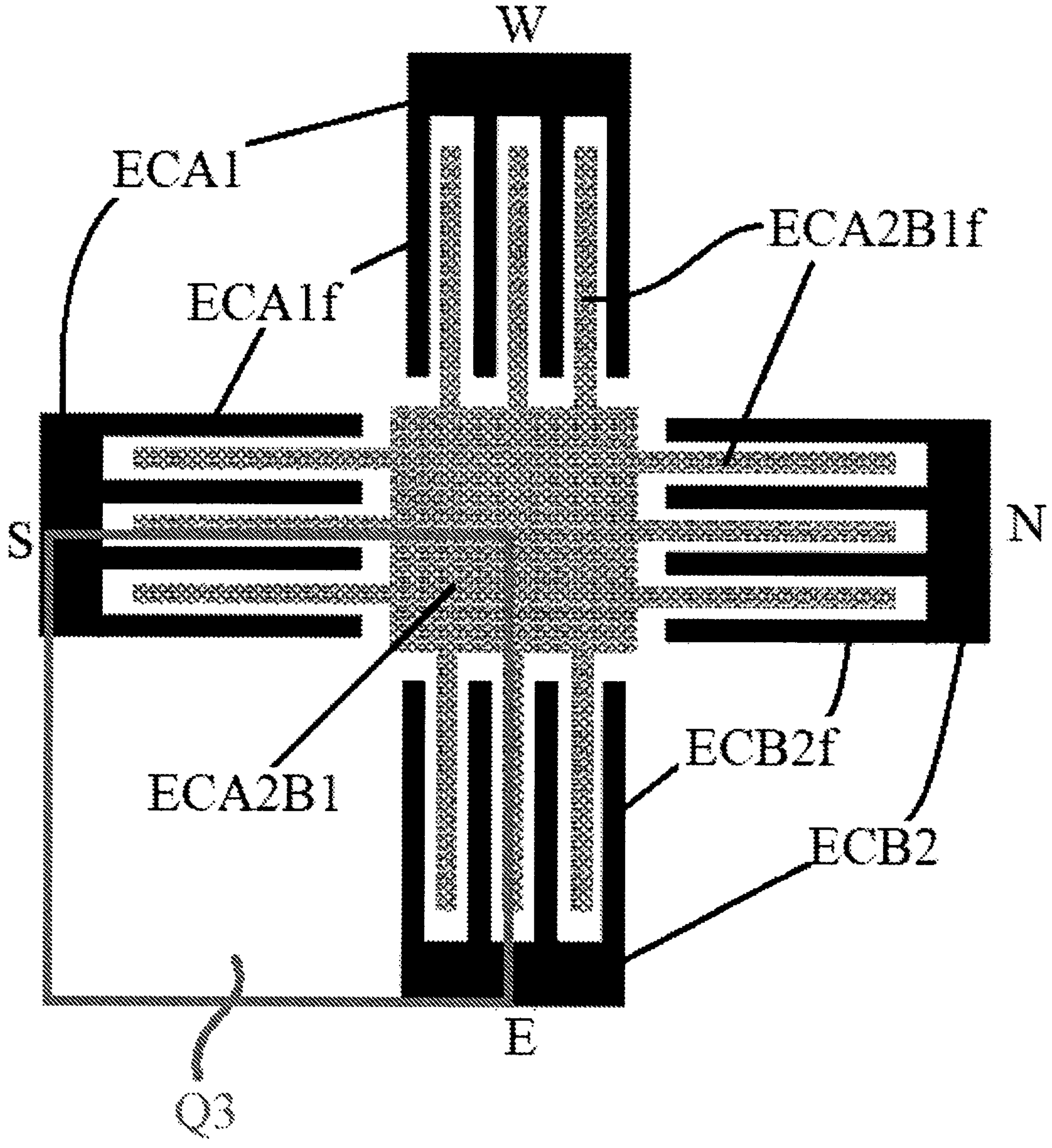
FIG. 35A shows a same product of FIG. 11 but rotated 90° clockwise.

Fabrication of Microphone with Moveable Single Conductor and Stationary Composite Conductor In the following FIGS. 35B-59, an exemplary process for fabricating the capacitive microphone of the invention with a moveable single conductor and a stationary composite conductor as shown in FIG. 35A and Panel (a) in FIG. 9 will be illustrated and described in more details. FIG. 35A is the same as FIG. 11 rotated 90° clockwise. In the following FIGS. 36-58, only Quarter Q3 (lower left ¼) of the capacitive microphone in FIG. 35A and Panel (a) in FIG. 9 will be illustrated for simplicity. The process for fabricating other capacitive microphones of the invention with a moveable single conductor and a stationary composite conductor can be accomplished mutatis mutandis, and it will not be illustrated and described here for conciseness. The process for fabricating the capacitive microphone of the invention with a movable composite conductor and stationary single conductor can be accomplished mutatis mutandis, and it will not be illustrated and described here for conciseness.

Figure 35B:
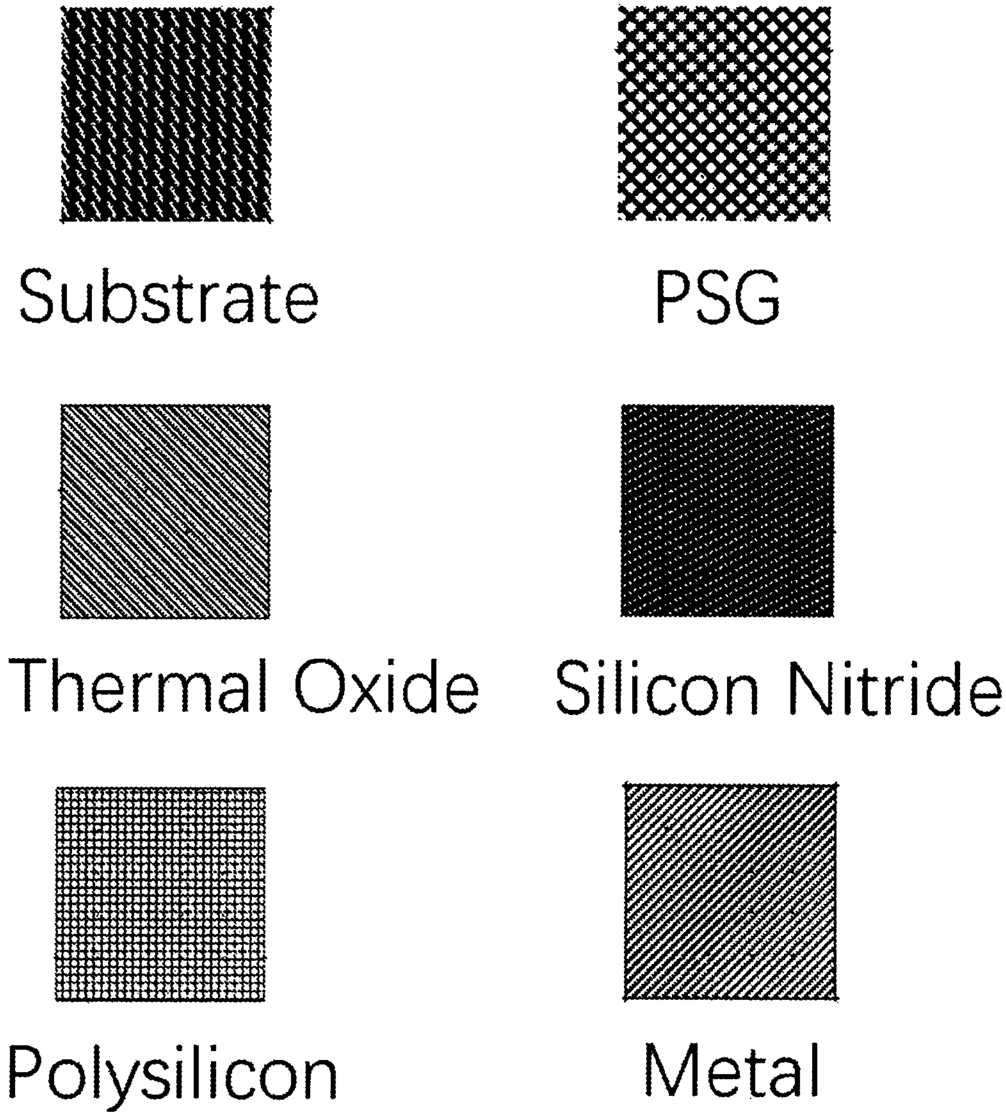
FIG. 35B illustrates texture representations or symbols of the six different materials used in the fabrication process.

Six different materials are used in the fabrication process: substrate 230 (silicon), thermal oxide (e g silicon dioxide), polysilicon for 201, 202 and 242, phosphosilicate glass (PSG), silicon nitride for 63, and metal. The texture representations or symbols of the six different materials are illustrated in FIG. 35B. The process starts with step 1 as shown in FIGS. 36A and 36B, providing a homogeneous substrate 230 having a planar surface, to fabricate a final microphone product as shown in FIGS. 58A, 58B, 58C and 59. FIG. 58A is the top view (in parallel with x-y plane and perpendicular to z axis) of the finished capacitive microphone (only a quarter thereof for simplicity). Referring to FIGS. 36A and 58A, lines A-A, B-B, C-C and D-D represent different cross-sectional planes. Since line C-C has a turning point, it consists of two line-segments. Therefore, the cross-sectional view along planes C-C should be appreciated as the combined cross-sectional views from cutting along two planes or plane-segments, projected on x-z plane. FIG. 36A is the top view (in parallel with x-y plane and perpendicular to z axis) of the unfinished capacitive microphone. FIG. 36B shows the cross-sectional views of the "unfinished" microphone of FIG. 36A along the cutting planes A-A, B-B, C-C and D-D, hereinafter "View A," "View B," "View C" and "View D" for short.

Step 2 as shown in FIGS. 37A-37B is depositing an isolation layer such as a layer of silicon nitride with a thickness of e.g. about 0.5 um. Step 3 as shown in FIGS. 38A-38B is etching/patterning the layer of silicon nitride. Step 4 as shown in FIGS. 39A-39B is opening a trench 243 as shown in FIG. 58B by e.g. deep reactive ion etching (DRIE) Step 5 as shown in FIGS. 40A-40B is growing a layer of thermal oxide with a thickness of e.g. about 2 um. Step 6 as shown in FIGS. 41A-41B is depositing a layer of Poly Silicon (P0) with a thickness of e.g. about 3 um. Step 7 as shown in FIGS. 42A-42B is etching/patterning the layer of Poly Silicon (P0). Step 8 as shown in FIGS. 43A-43B is depositing a layer of phosphosilicate glass (PSG1 or G1) with a thickness of e.g. about 2 um. Step 9 as shown in FIGS. 44A-44B is etching/patterning the layer of phosphosilicate glass (PSG1 or G1), which includes etching PSG1 or G1 on fixed-low electrodes. Step 10 as shown in FIGS. 45A-45B is depositing a layer of Poly Silicon (P1) with a thickness of e.g. about 1 um. Step 11 as shown in FIGS. 46A-46B is etching/patterning the layer of Poly Silicon (P1), which includes etching on fixed-up electrodes.

Step 12 as shown in FIGS. 47A-47B is depositing a layer of phosphosilicate glass (PSG2) with a thickness of e.g. about 1 um. Step 13 as shown in FIGS. 48A-48B is etching/patterning the layer of phosphosilicate glass (PSG2), which includes etching PSG2 to only leave PSG on fixed-up electrodes and membrane. Step 14 as shown in FIGS. 49A-49B is depositing a layer of Poly Silicon (P2) with a thickness of e.g. about 2 um. Step 15 as shown in FIGS. 50A-50B is depositing a thin layer of phosphosilicate glass (PSGthin) with a thickness of e.g. about 0.5 um and etching/patterning it to only leave PSG on movable electrodes. Step 16 as shown in FIGS. 51A-51B is etching/patterning the layer of Poly Silicon (P2), so as to open a membrane area. Step 17 as shown in FIGS. 52A-52B is depositing a layer of Poly Silicon (P3) with a thickness of e.g. about 1 um. Step 18 as shown in FIGS. 53A-53B is etching/patterning the layer of Poly Silicon (P3), which includes etching P3 on the movable electrode area and exposing the 0.5 um PSGthin layer. Step 19 as shown in FIGS. 54A-54B is wet etching away the PSGthin layer on the movable electrode area. Step 20 as shown in FIGS. 55A-55B is depositing a layer of metal with a thickness of e g about 1 um for pad material and etching/patterning the metal layer. Step 21 as shown in FIGS. 56A-56B is etching/patterning the front-side structure, which includes etching and defining fixed-low electrode (ECB2*f*), fixed-up electrode (ECA1*f*), movable electrodes (ECA2B1*f*), membrane within ECA2B1 and springs (202S) as shown in FIGS. 58A-58C. Step 22 as shown in FIGS. 57A-57B is opening a backside cavity. This step may provide access to (or expose) sacrificial materials or removable materials such as thermal oxide and PSG for further processing. Step 23 as shown in FIGS. 58A-58C is HF releasing of the final microphone product, which includes, for example, removing the remaining thermal oxide and PSG materials. Wet etching technique may be used to remove all sacrificial materials or removable materials to release the microphone product.

Figure 59:
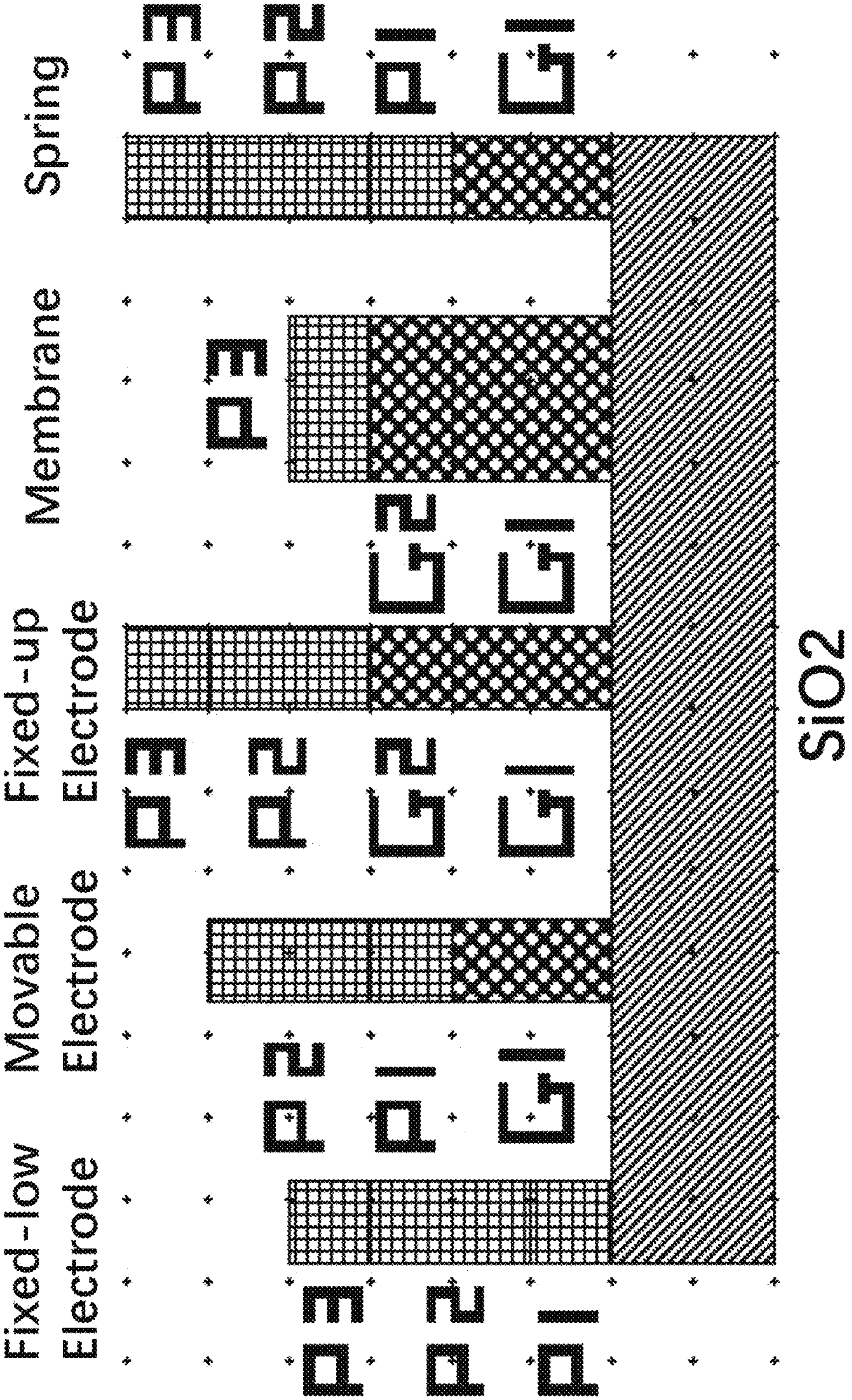
FIG. 59 summarizes a vertical profile of various structural and processing components in the microphone in accordance with an exemplary embodiment of the present invention.

Preferred embodiments of the invention use surface micromachining process for comb finger capacitor sensing application. Two fixed electrodes are separated into 2 sides of the sensor for optimization. The parasitic capacitance is minimized between the 2 fixed electrodes. The product includes three layers of polysilicon and two layers of PSG deposition for sensor spring, membrane thickness, sensor comb finger thickness and overlap optimization. The damping, capacitance, sensor sensitivity and noise of the product can thus be optimized. FIG. 59 shows the vertical profile of the structural and processing components: P1 1 um, P2 2 um, P3 1 um, G1 2 um, G2 1 um, PSGthin 0.5 um, trench refill P0 3 um, and SiO2 2 um. As shown in steps 1-23, the deposition sequence is G1, P1, G2, P2, PSGthin (Gthin), and P3

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A process of fabricating a capacitive microphone comprising:

(A) fabricating a first capacitor and a second capacitor, and configuring the two capacitors so that a signal output S1 of the first capacitor is substantially (±5%) the additive inverse of a signal output S2 of the second capacitor, and a total signal output St is a difference between S1 and S2; and wherein fabricating the first capacitor comprises fabricating a first electrical conductor ECA1, fabricating a second electrical conductor ECA2, and configuring conductors ECA1 and ECA2 in a lateral mode as defined in the following:

wherein conductors ECA1 and ECA2 have a mutual capacitance therebetween;

wherein said mutual capacitance can be varied by an acoustic pressure impacting upon ECA1 and/or ECA2 along a range of impacting directions in 3D space, generating the signal output S1 of the first capacitor;

wherein said mutual capacitance is varied the most by an acoustic pressure impacting upon ECA1 and/or ECA2 along one direction among said range of impacting directions, said one direction being defined as the primary direction;

wherein ECA1 has a first projection along said primary direction on a conceptual plane that is perpendicular to said primary direction; and ECA2 has a second projection along said primary direction on the conceptual plane;

wherein the first projection and the second projection have a shortest distance Dmin therebetween, and Dmin remains greater than zero regardless of that ECA1 and/or ECA2 is (are) impacted by an acoustic pressure along said primary direction or not;

wherein fabricating the second capacitor comprises fabricating a third electrical conductor ECB1 and a fourth electrical conductor ECB2, and configuring the conductors ECB1 and ECB2 in a lateral mode too;

wherein the process further comprises configuring the two capacitors so that the first capacitor and the second capacitor share a same primary direction;

wherein the process further comprises a step (Pre-A) before step (A), providing a substrate, wherein the substrate can be viewed as said conceptual plane; and constructing conductors ECA1 and ECA2 above the substrate side-by-side and constructing conductors ECB1 and ECB2 above the substrate side-by-side too;

wherein the process further comprises configuring one of conductors ECA1 and ECA2 so that it is electrically connected to one of conductors ECB1 and ECB2 to form a single shared conductor;

wherein the process further comprises configuring both conductors ECA1 and ECB2 so that they are fixed relative to the substrate, and fabricating single conductor ECA2B1 so that it comprises a membrane that is movable relative to the substrate, and said primary direction is perpendicular to the membrane plane; and wherein the process further comprises:

fabricating conductor ECA1 so that it comprises a flat layer in parallel to the substrate and having a thickness ECA1*t* and a height ECA1*h* along the primary direction as measured from the substrate;

fabricating conductor ECB2 so that it comprises a flat layer in parallel to the substrate and having a thickness ECB2*t* and a height ECB2*h* along the primary direction as measured from the same substrate;

fabricating single conductor ECA2B1 so that it comprises a portion ECA2* facing conductor ECA1, wherein portion ECA2* comprises a flat layer parallel to the substrate and having a thickness ECA2**t* and a height ECA2**h* along the primary direction as measured from the same substrate; and fabricating single conductor ECA2B1 so that it comprises a portion ECB1* facing conductor ECB2, wherein portion ECB1* comprises a flat layer in parallel to the substrate and having a thickness ECB1**t* and a height ECB1**h* along the primary direction as measured from the same substrate.

2. The process according to claim 1, further comprising configuring the two capacitors so that a noise of the signal output S1 partially or completely cancels off a noise of the signal output S2, when the total signal output St is generated.

3. The process according to claim 1, wherein thickness ECA1*t* and thickness ECA2**t* are equal, and/or wherein thickness ECB2*t* and thickness ECB1**t* are equal.

4. The process according to claim 1, wherein thickness ECA1*t*, thickness ECA2**t*, thickness ECB2*t*, and thickness ECB1*t are the same, and are equal to ABt.

5. The process according to claim 4, wherein height difference ΔAh is defined as height ECA1*h* minus height ECA2**h*; wherein height difference ΔBh is defined as height ECB1**h* minus height ECB2*h*; ΔAh≠0, ΔBh≠0, and ΔAh=ΔBh.

6. The process according to claim 5, wherein the absolute values of ΔAh and ΔBh are about one third of ABt, |ΔAh|≈|ΔBh|≈⅓ABt.

7. The process according to claim 5, wherein height ECA2**h*=height ECB1**h*.

8. The process according to claim 5, wherein height ECA1*h*=height ECB2*h*.

9. The process according to claim 5, comprising fabricating conductor ECA1 so that it comprises a set of comb fingers ECA1*f*, fabricating conductor ECB2 so that it comprises a set of comb fingers ECB2*f*, fabricating the movable membrane of single conductor ECA2B1 so that it comprises a set of comb fingers ECA2B1*f* around the peripheral region of the membrane, and interleaving comb fingers ECA1*f* and comb fingers ECB2*f* into comb fingers ECA2B1*f*.

10. The process according to claim 9, wherein comb fingers ECA2B1*f* are laterally movable relative to both comb fingers ECA1*f* and comb fingers ECB2*f*, and the resistance from air located within a gap between the membrane and the substrate is lowered.

11. The process according to claim 10, comprising fabricating comb fingers ECA2B1*f*, comb fingers ECA1*f*, and comb fingers ECB2*f* so that they have identical shape and dimension.

12. The process according to claim 1, comprising attaching the movable membrane to the substrate via three or more suspensions; and optionally fabricating each suspension so that it comprises folded and symmetrical cantilevers.

13. The process according to claim 1, comprising fabricating the movable membrane so that it is square shaped.

14. The process according to claim 13, comprising fabricating one, two or more said movable membranes.

* * * * *